(12) United States Patent
Papasakellariou

(10) Patent No.: US 11,729,714 B2
(45) Date of Patent: Aug. 15, 2023

(54) TRANSMISSIONS OF PHYSICAL DOWNLINK CONTROL CHANNELS IN A COMMUNICATION SYSTEM

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 17/306,384

(22) Filed: May 3, 2021

(65) Prior Publication Data
US 2021/0258876 A1 Aug. 19, 2021

Related U.S. Application Data

(63) Continuation of application No. 16/584,657, filed on Sep. 26, 2019, now Pat. No. 11,032,765, which is a
(Continued)

(51) Int. Cl.
*H04W 56/00* (2009.01)
*H04W 52/02* (2009.01)
(Continued)

(52) U.S. Cl.
CPC ....... *H04W 52/0216* (2013.01); *H04L 5/0048* (2013.01); *H04L 5/0053* (2013.01);
(Continued)

(58) Field of Classification Search
CPC ........... H04W 52/0216; H04W 72/042; H04W 72/0446; H04W 72/0453; H04L 5/0048; H04L 5/0053; H04L 5/0096
(Continued)

(56) References Cited

U.S. PATENT DOCUMENTS

2010/0254268 A1* 10/2010 Kim ................ H04L 5/001
370/328
2012/0076078 A1 3/2012 Han et al.
(Continued)

FOREIGN PATENT DOCUMENTS

CN 103701564 A 4/2014
CN 104469804 A 3/2015
(Continued)

OTHER PUBLICATIONS

The Second Office Action dated Jul. 15, 2021, in connection with Chinese Application No. 201780047788.3, 13 pages.
(Continued)

*Primary Examiner* — Sai Ming Chan

(57) ABSTRACT

A method of a user equipment (UE) for controlling a signal comprises receiving configuration information for enabling or disabling a signal transmission, receiving a first physical downlink control channel (PDCCH) conveying a first downlink control information (DCI) format, decoding the first DCI format, determining whether the first DCI format is correctly decoded; and transmitting the signal or suspending a transmission of the signal according to the configuration information when the first DCI format is not correctly decoded.

20 Claims, 25 Drawing Sheets

Related U.S. Application Data continuation of application No. 15/617,852, filed on Jun. 8, 2017, now Pat. No. 10,462,739.

(60) Provisional application No. 62/472,088, filed on Mar. 16, 2017, provisional application No. 62/456,760, filed on Feb. 9, 2017, provisional application No. 62/449,232, filed on Jan. 23, 2017, provisional application No. 62/424,637, filed on Nov. 21, 2016, provisional application No. 62/411,079, filed on Oct. 21, 2016, provisional application No. 62/401,526, filed on Sep. 29, 2016, provisional application No. 62/363,969, filed on Jul. 19, 2016, provisional application No. 62/352,614, filed on Jun. 21, 2016.

(51) Int. Cl.
| | |
|---|---|
| *H04L 5/00* | (2006.01) |
| *H04W 72/23* | (2023.01) |
| *H04W 72/0446* | (2023.01) |
| *H04W 72/0453* | (2023.01) |
| *H04L 5/14* | (2006.01) |

(52) U.S. Cl.
CPC ....... *H04L 5/0096* (2013.01); *H04W 72/0446* (2013.01); *H04W 72/0453* (2013.01); *H04W 72/23* (2023.01); *H04L 5/0023* (2013.01); *H04L 5/0035* (2013.01); *H04L 5/0051* (2013.01); *H04L 5/14* (2013.01); *Y02D 30/70* (2020.08)

(58) Field of Classification Search
USPC .......................................................... 370/311
See application file for complete search history.

(56) References Cited

U.S. PATENT DOCUMENTS

| | | | |
|---|---|---|---|
| 2012/0115485 A1 | 5/2012 | Narasimha et al. | |
| 2013/0077523 A1 | 3/2013 | Ko et al. | |
| 2013/0114532 A1 | 5/2013 | Choi et al. | |
| 2014/0064214 A1 | 3/2014 | Papasakellariou et al. | |
| 2014/0064216 A1 | 3/2014 | Agiwal et al. | |
| 2014/0092829 A1 | 4/2014 | Han et al. | |
| 2014/0254483 A1 | 9/2014 | Zisimopoulos | |
| 2014/0269451 A1 | 9/2014 | Papasakellariou et al. | |
| 2014/0293843 A1* | 10/2014 | Papasakellariou | H04L 5/0053 370/280 |
| 2014/0341092 A1* | 11/2014 | Chu | H04L 5/1469 370/280 |
| 2015/0208398 A1 | 7/2015 | Pan et al. | |
| 2015/0256403 A1* | 9/2015 | Li | H04W 72/042 370/235 |
| 2015/0312071 A1* | 10/2015 | Chen | H04L 1/0003 370/329 |
| 2016/0226637 A1* | 8/2016 | Nory | H04W 72/0446 |
| 2017/0230994 A1* | 8/2017 | You | H04L 5/0053 |
| 2017/0289966 A1 | 10/2017 | Islam et al. | |
| 2018/0007707 A1 | 1/2018 | Rico Alvarino et al. | |
| 2019/0281499 A1* | 9/2019 | Larsson | H04W 28/16 |

FOREIGN PATENT DOCUMENTS

| | | |
|---|---|---|
| CN | 104604314 A | 5/2015 |
| CN | 105264995 A | 1/2016 |
| EP | 2642810 A1 | 9/2013 |
| EP | 2966917 A1 | 1/2016 |
| WO | 2014161142 A1 | 10/2014 |

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.2.0, Jun. 2016, 168 Pages.

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.2.0, Jun. 2016, 140 Pages.

"3rd Generation Partnership Project; Technical Specification Group Radio Access Network; Evolved Universal Terrestrial Radio Access (E-UTRA); Physical layer procedures (Release 13)", 3GPP TS 36.213 V13.2.0, Jun. 2016, 381 Pages.

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.2.0, Jun. 2016, 91 Pages.

"3rd Generation Partnership ProjectTechnical Specification Group Radio Access Network; Evolved Universal Terrestrial Radio Access (E-UTRA); Radio Resource Control (RRC);Protocol specification(Release 13)", 3GPP TS 36.331 V13.2.0 Jun. 2016, 623 Pages.

Intel Corporation, "Downlink control signaling design for shorten TTI," R1-164160, 3GPP TSG-RAN WG1 #85, Nanjing, China, May 23-27, 2016, 7 pages.

LG Electronics, "Discussions on DCI and sPDCCH for latency reduction," R1-164542, 3GPP TSG RAN WG1 Meeting #85, Nanjing, China, May 23-27, 2016, 8 pages.

ISA/KR, "International Search Report," Application No. PCT/KR2017/006471, dated Oct. 17, 2017, 3 pages.

ISA/KR, "Written Opinion of the International Searching Authority," Application No. PCT/KR2017/006471, dated Oct. 17, 2017, 14 pages.

Extended European Search Report regarding Application No. 17815690.7, dated Apr. 16, 2019, 8 pages.

China National Intellectual Property Administration, the First Office Action, dated Dec. 21, 2021, regarding Application No. 201780047788.3, 19 pages.

Qualcomm Incorporated, "Clarification on UE Antenna Port Based CRC Masking", 3GPP TSG RAN WG1 #74, R1-133570, Aug. 2013, 2 pages.

"Examination report under sections 12 & 13 of the Patents Act", dated Aug. 12, 2021, in connection with Indian Patent Application No. 201937001709, 7 pages.

* cited by examiner

TRANSMISSIONS OF PHYSICAL DOWNLINK CONTROL CHANNELS IN A COMMUNICATION SYSTEM

CROSS-REFERENCE TO RELATED APPLICATIONS AND CLAIM OF PRIORITY

This application is a continuation of U.S. Non-Provisional patent application Ser. No. 16/584,657 filed Sep. 26, 2019 and entitled TRANSMISSIONS OF PHYSICAL DOWNLINK CONTROL CHANNELS IN A COMMUNICATION SYSTEM, which is a continuation of U.S. Non-Provisional patent application Ser. No. 15/617,852 filed Jun. 8, 2017 and entitled TRANSMISSIONS OF PHYSICAL DOWNLINK CONTROL CHANNELS IN A COMMUNICATION SYSTEM, and claims priority to U.S. Provisional Patent Application No. 62/352,614 filed on Jun. 21, 2016 and entitled SIGNALING OF DYNAMIC TRANSMISSION STRUCTURES IN A COMMUNICATION SYSTEM, U.S. Provisional Patent Application No. 62/363,969 filed on Jul. 19, 2016 and entitled SIGNALING OF DYNAMIC TRANSMISSION STRUCTURES IN A COMMUNICATION SYSTEM, U.S. Provisional Patent Application No. 62/401,526 filed on Sep. 29, 2016 and entitled SIGNALING OF DYNAMIC TRANSMISSION STRUCTURES IN A COMMUNICATION SYSTEM, U.S. Provisional Patent Application No. 62/411,079 filed on Oct. 21, 2016 and entitled UE POWER REDUCTION FOR RECEIVING DL CONTROL CHANNELS, U.S. Provisional Patent Application No. 62/424,637 filed on Nov. 21, 2016 and entitled SIGNALING OF DYNAMIC TRANSMISSION STRUCTURES IN A COMMUNICATION SYSTEM, U.S. Provisional Patent Application No. 62/449,232 filed on Jan. 23, 2017 and entitled SIGNALING OF DYNAMIC TRANSMISSION STRUCTURES IN A COMMUNICATION SYSTEM, U.S. Provisional Patent Application No. 62/456,760 filed on Feb. 9, 2017 and entitled SIGNALING OF DYNAMIC TRANSMISSION STRUCTURES IN A COMMUNICATION SYSTEM, and U.S. Provisional Patent Application No. 62/472,088 filed on Mar. 16, 2017 and entitled SIGNALING OF DYNAMIC TRANSMISSION STRUCTURES IN A COMMUNICATION SYSTEM. The content of the above-identified patent documents is incorporated herein by reference.

TECHNICAL FIELD

The present application relates generally to gNB transmissions of physical downlink control channels in a communication system. More specifically, this disclosure relates to transmissions of physical downlink control channels that configure transmission and reception functionalities of user equipments and enable power savings for user equipments.

BACKGROUND

A user equipment (UE) is commonly referred to as a terminal or a mobile station, can be fixed or mobile, and can be a cellular phone, a personal computer device, or an automated device. A gNB is generally a fixed station and can also be referred to as a base station, an access point, or other equivalent terminology. A communication system includes a downlink (DL) that refers to transmissions from a base station or one or more transmission points to UEs and an uplink (UL) that refers to transmissions from UEs to a base station or to one or more reception points.

SUMMARY

The present disclosure relates to a pre-$5^{th}$-generation (5G) or 5G communication system to be provided for supporting higher data rates beyond $4^{th}$-generation (4G) communication system such as long term evolution (LTE). The present disclosure relates to enabling a base station (gNB) to inform user equipments (UEs) of a number of slot symbols for downlink (DL) signaling and a number of slot symbols for uplink (UL) signaling in one or more slots. The present disclosure also relates to enabling a gNB to perform multi-slot scheduling for a physical downlink shared channel (PDSCH) transmission to a UE or for a physical uplink shared channel (PUSCH) transmission from a UE. The present disclosure further relates to enabling a UE to avoid performing a maximum number of decoding operations for physical downlink control channels (PDCCHs) in every slot during a non-DRX state for the UE. The present disclosure additionally relates to enabling multiplexing in a time domain of transmissions of data transport blocks (TBs) requiring low latency and transmissions of data TBs not requiring low latency. The present disclosure also relates to enabling a use of a slot symbol for PDCCH transmissions in some bandwidth (BW) and for PDSCH transmissions in other BW parts of a DL BW. The present disclosure additionally relates to configuring to a UE a maximum number of time/frequency resources for PDCCH transmissions in a slot, varying an actual number of time/frequency resources used for PDCCH transmissions in the slot and utilizing remaining time/frequency resources for PDSCH transmissions. The present disclosure further relates to enabling a UE to receive PDSCH transmissions over a different DL BW than the DL BW where the UE receives PDCCH transmissions without negatively impacting a system spectral efficiency. The present disclosure also relates to dynamically varying a DL BW where a UE receives PDCCH transmissions. The present disclosure additionally relates to enabling link adaptation for PDCCH transmissions to a UE.

In one embodiment, a UE for controlling a signal is provided. The UE comprises a receiver configured to receive configuration information for enabling or disabling a signal transmission and a first PDCCH conveying a first DCI format. The UE further comprises a decoder configured to decode the first DCI format, a controller configured to determine whether the first DCI format is correctly decoded, and a transmitter configured to transmit the signal or to suspend a transmission of the signal according to the configuration information when the first DCI format is not correctly decoded.

In another embodiment, base station for controlling a signal is provided. The base station comprises an encoder configured to encode a first DCI format. The base station further comprises a transmitter configured to transmit a first PDCCH conveying the encoded first DCI format and configuration information for enabling or disabling a signal transmission when the first DCI format is not correctly decoded.

In yet another embodiment, a method of a UE for controlling is provided. The method comprises receiving configuration information for enabling or disabling a signal transmission, receiving a first PDCCH conveying a first DCI format, decoding the first DCI format, determining whether the first DCI format is correctly decoded, and transmitting the signal or suspending a transmission of the signal according to the configuration information when the first DCI format is not correctly decoded.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, both frequency division duplexing (FDD) and time division duplexing (TDD) are considered as the duplex method for DL and UL signaling.

Although exemplary descriptions and embodiments to follow assume orthogonal frequency division multiplexing (OFDM) or orthogonal frequency division multiple access (OFDMA), this present disclosure can be extended to other OFDM-based transmission waveforms or multiple access schemes such as filtered OFDM (F-OFDM) or OFDM with zero cyclic prefix.

This present disclosure covers several components which can be used in conjunction or in combination with one another, or can operate as standalone schemes

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 30, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation" (REF1); 3GPP TS 36.212 v13.2.0, "E-UTRA, Multiplexing and Channel coding" (REF2); 3GPP TS 36.213 v13.2.0, "E-UTRA, Physical Layer Procedures" (REF3); 3GPP TS 36.321 v13.2.0, "E-UTRA, Medium Access Control (MAC) protocol specification;" (REF4) and 3GPP TS 36.331 v13.2.0, "E-UTRA, Radio Resource Control (RRC) Protocol Specification" (REF5).

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
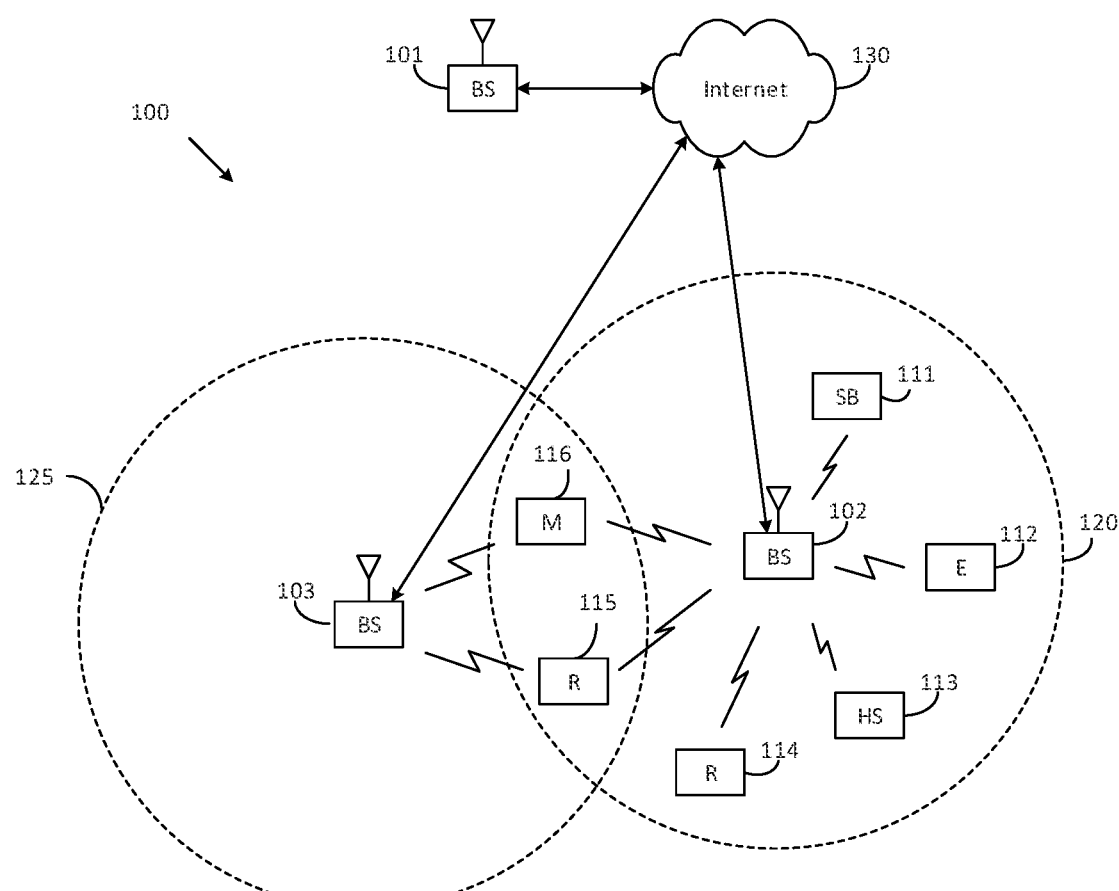
FIG. 1 illustrates an example wireless network according to embodiments of the present disclosure.
Figure 2:
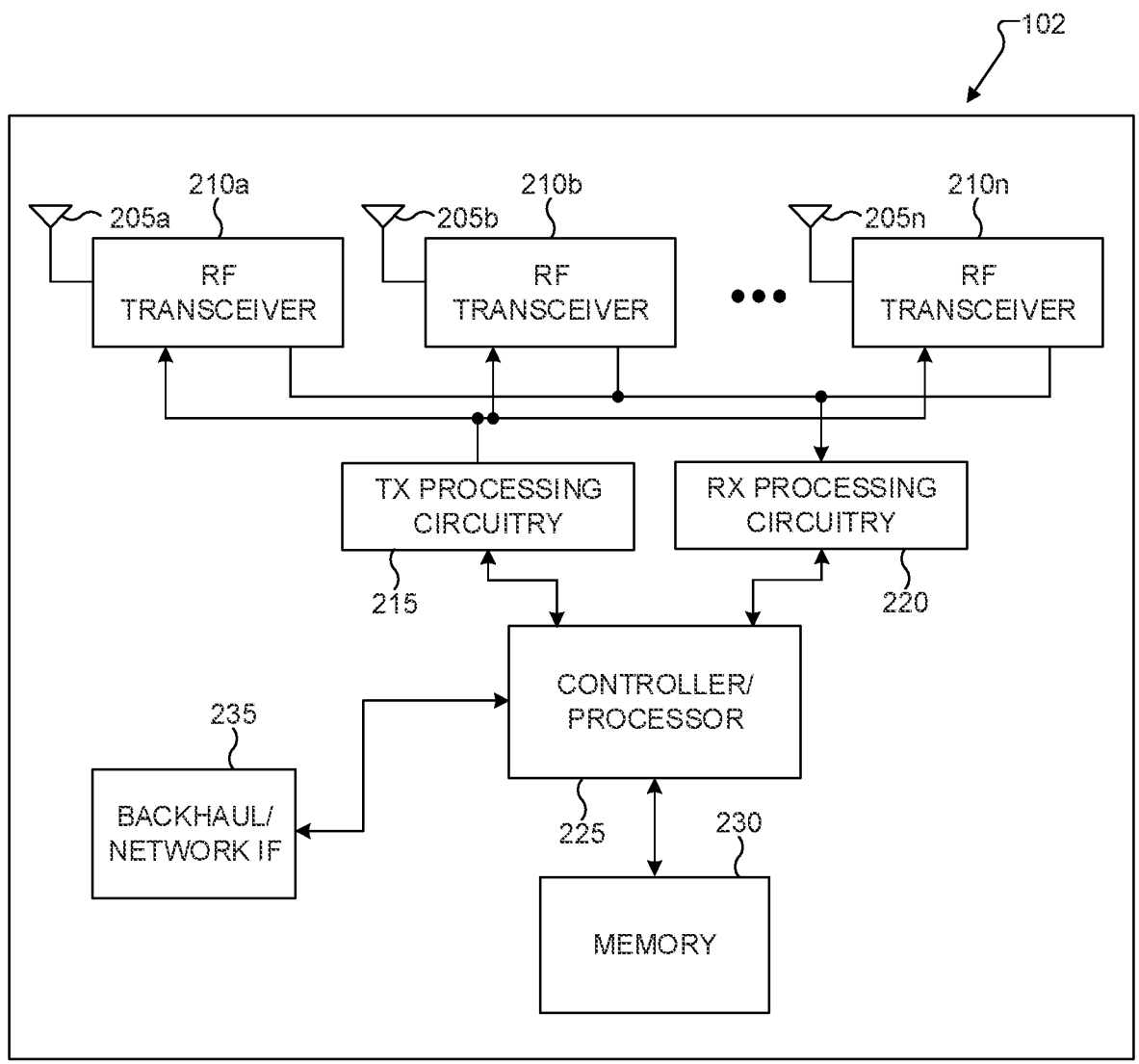
FIG. 2 illustrates an example gNB according to embodiments of the present disclosure.
Figure 3:
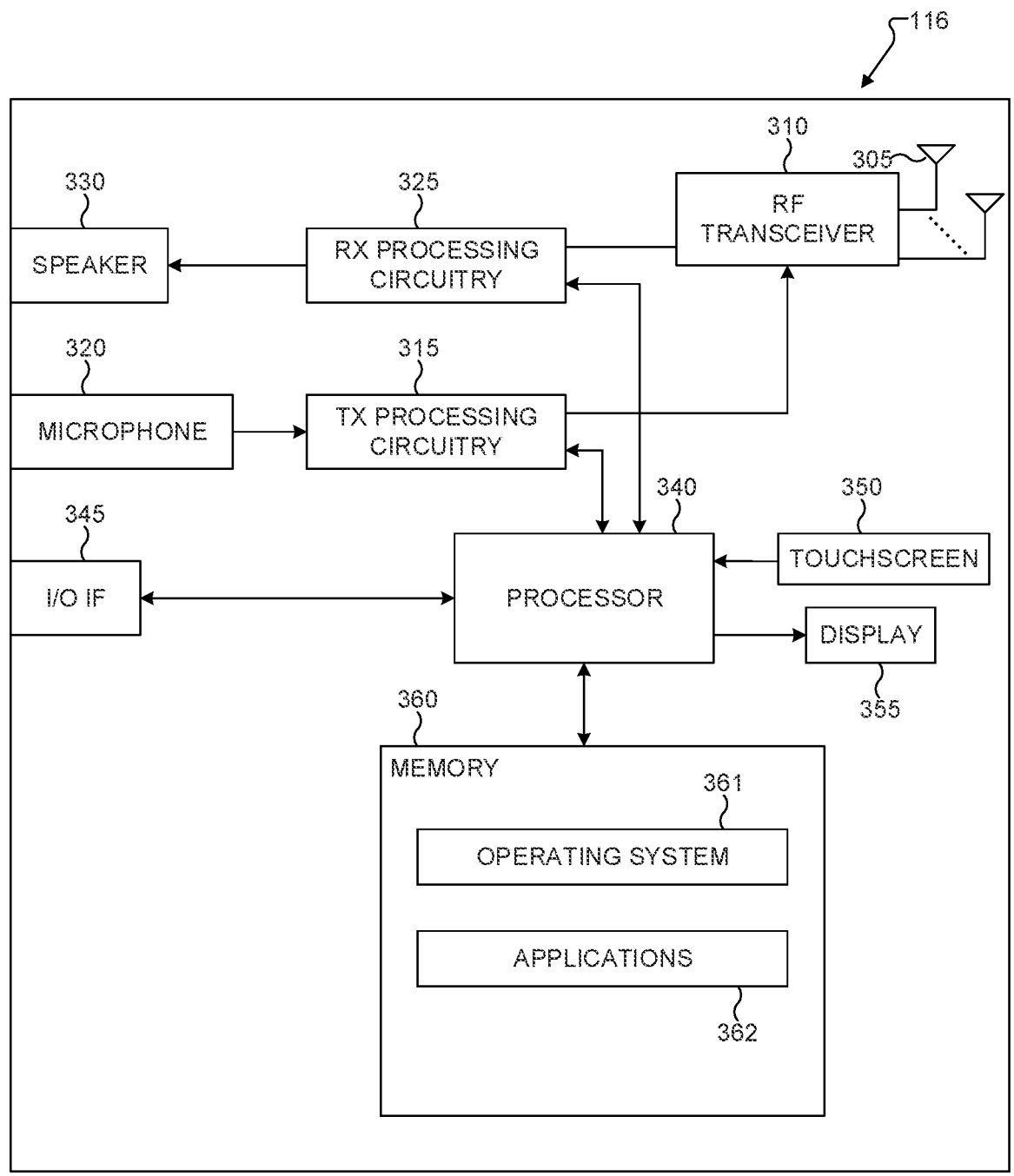
FIG. 3 illustrates an example UE according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "B S" can refer to any component (or collection of components) configured to provide wireless access to a network, such as transmit point (TP), transmit-receive point (TRP), an enhanced base station (eNodeB or gNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "eNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient CSI reporting on an uplink channel in an advanced wireless communication system. In certain embodiments, and one or more of the gNBs 101-103 includes circuitry, programming, or a combination thereof, for receiving efficient CSI reporting on an uplink channel in an advanced wireless communication system.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiment, the RF transceivers 210a-210n is capable of transmitting a PDCCH conveying the encoded first DCI format and configuration information for enabling a signal transmission or disabling the signal transmission when the first DCI format is not detected.

In such embodiments, the first DCI format is transmitted periodically over a number of slots and includes a field that indicates a combination from a set of combinations of slot configurations and the set of combinations of slot configurations includes a number of slot configurations equal to the number of slots.

In some embodiments, the RF transceivers 210a-210n are capable of transmitting first signaling in a slot. In such embodiments, the first DCI format includes a field indicating the slot and a number of slot symbols in the slot in which the first signaling is punctured by second signaling.

In some embodiments, the RF transceivers 210a-210n are capable of transmitting a PDCCH conveying a second DCI format according to a number of candidate locations in a set of time and/or frequency resources. In such embodiments, the first DCI format includes a field indicating scaling information for the number of the candidate locations.

In such embodiments, the first DCI format includes a field indicating, for each part from a number of parts of a downlink system bandwidth, a first symbol in a slot for transmission of PDSCHs.

In such embodiments, the first DCI format includes a field indicating configuration information for a transmission of channel state information reference signals (CSI-RS) in a slot.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

In some embodiments, the controller/processor 225 includes at least one microprocessor or microcontroller. As described in more detail below, the gNB 102 may include circuitry, programming, or a combination thereof for processing of an uplink channel and/or a downlink channel. For example, controller/processor 225 can be configured to execute one or more instructions, stored in memory 230, that are configured to cause the controller/processor to process the signal.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of encoding a first DCI format.

In such embodiments, the first DCI format is transmitted periodically over a number of slots and includes a field that indicates a combination from a set of combinations of slot configurations and the set of combinations of slot configurations includes a number of slot configurations equal to the number of slots.

In such embodiments, the first DCI format includes a field indicating the slot and a number of slot symbols in the slot in which the first signaling is punctured by second signaling.

In such embodiments, the first DCI format includes a field indicating, for each part from a number of parts of a downlink system bandwidth, a first symbol in a slot for a transmission of PDSCHs.

In such embodiments, the first DCI format includes a field indicating configuration information for a transmission of channel state information reference signals (CSI-RS) in a slot.

In some embodiments, the controller/processor 225 is capable of encoding a second DCI format according to a number of candidate locations in a set of time and/or frequency resources. In such embodiments, the first DCI format includes a field indicating scaling information for the number of the candidate locations.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving configuration information for enabling a signal transmission or disabling the signal transmission and a PDCCH conveying a first DCI format.

In some embodiments, the RF transceiver 310 is capable of transmitting the signal or of suspending a transmission of the signal according to the configuration information when the first DCI format is incorrectly decoded.

In such embodiments, the first DCI format is decoded periodically over a number of slots and includes a field that indicates a combination from a set of combinations of slot configurations and the set of combinations of slot configurations includes a number of slot configurations equal to the number of slots.

In some embodiments, the RF transceiver 310 is capable of receiving first signaling in a slot. In such embodiments, the first DCI format includes a field indicating the slot and a number of slot symbols in the slot in which the first signaling is punctured by second signaling.

In some embodiments, the RF transceiver 310 is capable of transmitting the signal in a slot and the first DCI format includes a field indicating the slot and a number of slot symbols in the slot in which the UE suspends a transmission.

In some embodiments, the RF transceiver 310 is capable of receiving a PDCCH conveying a second DCI format according to a number of candidate locations in a set of time and/or frequency resources. In such embodiments, the first DCI format includes a field indicating scaling information for the number of the candidate locations.

In such embodiments, the first DCI format includes a field indicating, for each part from a number of parts of a downlink system bandwidth, a first symbol in a slot for a reception of PDSCHs.

In such embodiments, the first DCI format includes a field indicating, for each part from a number of parts of a downlink system bandwidth, a last symbol in a slot for a reception of physical uplink shared channels (PUSCHs).

In such embodiments, the first DCI format includes a field indicating the configuration information for a reception of channel state information reference signals (CSI-RS) in a slot.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for reference signal on a downlink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of decoding the first DCI format.

In some embodiments, the processor 340 is capable of determining if the first DCI format is correctly decoded.

In such embodiments, the first DCI format is decoded periodically over a number of slots and includes a field that indicates a combination from a set of combinations of slot configurations and the set of combinations of slot configurations includes a number of slot configurations equal to the number of slots.

In such embodiments, the first DCI format includes a field indicating, for each part from a number of parts of a downlink system bandwidth, a first symbol in a slot for a reception of PDSCHs.

In such embodiments, the first DCI format includes a field indicating, for each part from a number of parts of a downlink system bandwidth, a last symbol in a slot for a reception of PUSCHs.

In such embodiments, the first DCI format includes a field indicating the configuration information for a reception of CSI-RS in a slot.

In such embodiments, the first DCI format includes a field indicating scaling information for a number of candidate locations for a PDCCH conveying a second DCI format.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
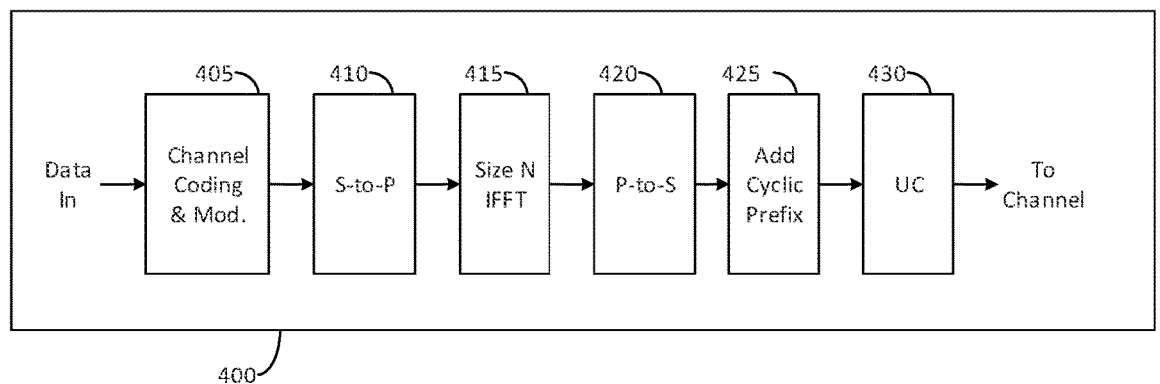
FIG. 4A illustrates a high-level diagram of an orthogonal frequency division multiple access transmit path according to embodiments of the present disclosure.
Figure 4B:
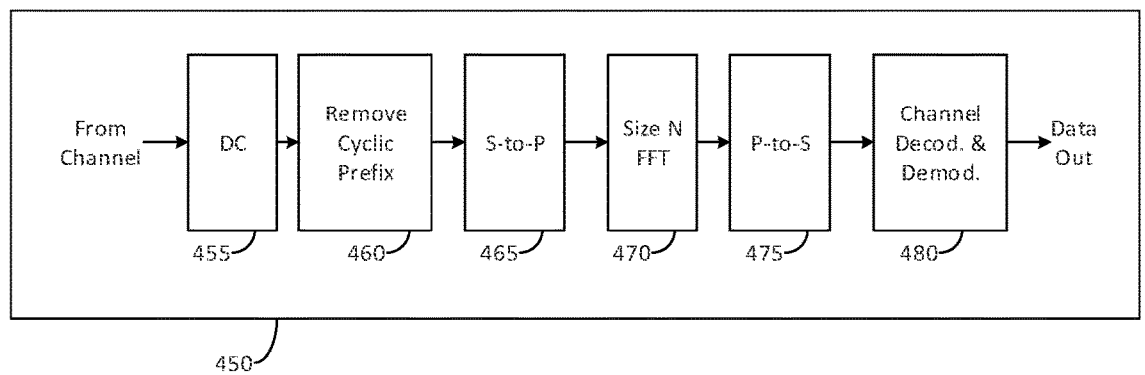
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (gNB) 102 or a relay station, and the receive path circuitry 450 may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry 400 may be implemented in a user equipment (e.g., user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A reference time unit for DL signaling or for UL signaling on a cell is referred to as a slot and can include one or more slot symbols. A bandwidth (BW) unit is referred to as a resource block (RB). One RB includes a number of sub-carriers (SCs). For example, a slot can have duration of half millisecond or of one millisecond, include 7 symbols or 14 symbols, respectively, and an RB can have a BW of 180 kilo-Hertz (KHz) and include 12 SCs with inter-SC spacing of 15 KHz. A BW reception capability or a BW transmission for a UE can be smaller than a DL system BW or an UL system BW, respectively, and different UEs can be configured DL receptions or UL transmissions in different parts of a DL system BW or of an UL system BW, respectively, per slot.

DL signals include data signals conveying information content, control signals conveying DCI, and reference signals (RS) that are also known as pilot signals. A gNB transmits data information or DCI through respective PDSCHs or PDCCHs. A gNB transmits one or more of multiple types of RS including CSI-RS and demodulation RS (DMRS). A CSI-RS is intended for UEs to measure channel state information (CSI). A DMRS is transmitted only in the BW of a respective PDCCH or PDSCH and a UE can use the DMRS to demodulate DCI or data information.

Figure 5:
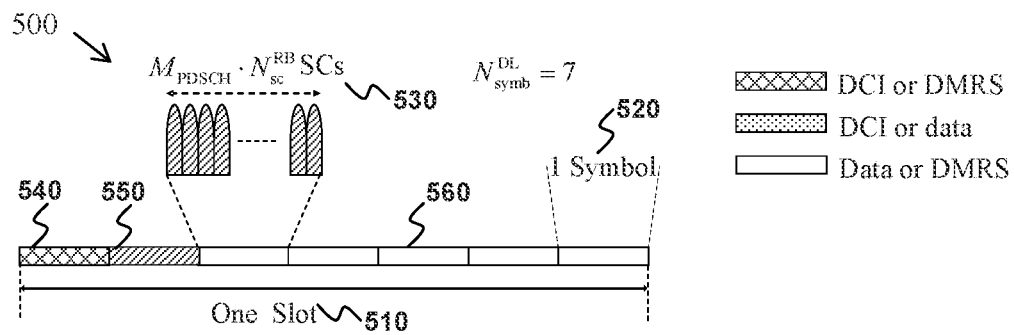
FIG. 5 illustrates an example DL slot structure for a PDSCH transmissions or PDCCH transmissions according to embodiments of the present disclosure.

FIG. 5 illustrates an example DL slot structure 500 for PDSCH transmissions or PDCCH transmissions according to embodiments of the present disclosure. An embodiment of the DL slot structure 500 for PDSCH transmissions or PDCCH transmissions shown in FIG. 5 is for illustration only. Other embodiments may be used without departing from the scope of the present disclosure.

A slot 510 includes $N_{symb}^{DL}=7$ symbols 520 where a gNB transmits data information, DCI, or DMRS. A DL system BW includes $N_{RB}^{DL}$ RBs. Each RB includes $N_{sc}^{RB}$ SCs. For example, $N_{sc}^{RB}$. A UE is assigned $M_{PDSCH}$ RBs for a total of $M_{sc}^{PDSCH}=M_{PDSCH} \cdot N_{sc}^{RB}$ SCs 530 for a PDSCH transmission BW. A PDCCH conveying DCI is transmitted over control channel elements (CCEs) that can be mapped in a localized BW or be substantially spread across a BW configured for PDCCH transmissions. A first slot symbol 540 can be used by the gNB to transmit DCI and DMRS. A second slot symbol 550 can be used by the gNB to transmit DCI, DMRS, or data information. Remaining slot symbols 560 can be used by the gNB to transmit data information, DMRS, and possibly CSI-RS. In some slots, the gNB can also transmit synchronization signals and system information.

UL signals also include data signals conveying data information, control signals conveying UL control information (UCI), and RS. A UE transmits data information or UCI through a respective PUSCH or a physical UL control channel (PUCCH). When a UE simultaneously transmits data information and UCI, the UE can multiplex both in a PUSCH. UCI includes hybrid automatic repeat request acknowledgement (HARQ-ACK) information, indicating correct or incorrect detection of data transport blocks (TBs) for one or more PDSCH receptions, scheduling request (SR) indicating whether a UE has data in the UE's buffer, and CSI reports enabling a gNB to select appropriate parameters for PDSCH or PDCCH transmissions to a UE.

A CSI report from a UE can include a channel quality indicator (CQI) informing a gNB of a maximum modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmissions. An UL DMRS or SRS can be constructed by a Zadoff-Chu (ZC) sequence or a pseudo-noise (PN) sequence.

Figure 6:
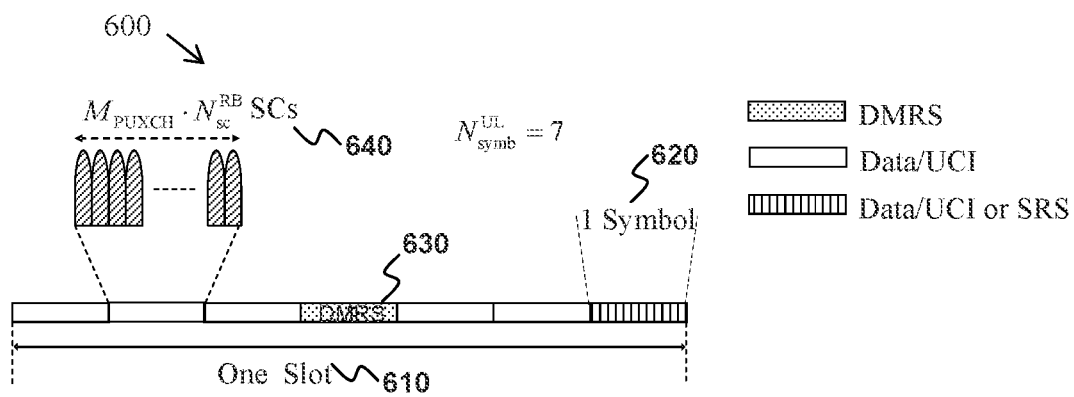
FIG. 6 illustrates an example UL slot structure for a PUSCH transmission or a PUCCH transmission according to embodiments of the present disclosure.

FIG. 6 illustrates an example UL slot structure 600 for a PUSCH transmission or a PUCCH transmission according to embodiments of the present disclosure. An embodiment of the UL slot structure 600 for the PUSCH transmission or the PUCCH transmission shown in FIG. 6 is for illustration only. Other embodiments may be used without departing from the scope of the present disclosure.

A slot 610 includes $N_{symb}^{UL}=7$ symbols 620 where a UE transmits data information, UCI, or RS including at least one symbol where the UE transmits DMRS 630. An UL system BW includes $N_{RB}^{UL}$ RBs. Each RB includes $N_{sc}^{RB}$ SCs. A UE is assigned $M_{PUXCH}$ RBs for a total of $M_{sc}=M_{PUXCH} \cdot N_{sc}^{RB}$ SCs 640 for a PUSCH transmission BW ("X"="S") or for a PUCCH transmission BW ("X"="C"). One or more last slot symbols can be used to multiplex SRS transmissions 650 (or PUCCH transmissions) from one or more UEs. A number of UL slot symbols available for data/UCI/DMRS transmission is $N_{symb}^{PUXCH}=2 \cdot (N_{symb}^{UL}-1)-N_{SRS} \cdot N_{SRS}>0$ when $N_{SRS}$ last slot symbols are used SRS transmissions (or PUCCH transmissions) from UEs that overlap at least partially in BW with a PUXCH transmission BW; otherwise, $N_{SRS}=0$ Therefore, a number of total SCs for a PUXCH transmission is $M_{sc}^{PUXCH} \cdot N_{symb}^{PUXCH}$.

A hybrid slot includes a DL transmission region, a guard period region, and an UL transmission region, similar to a special subframe in LTE. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions.

Figure 7:
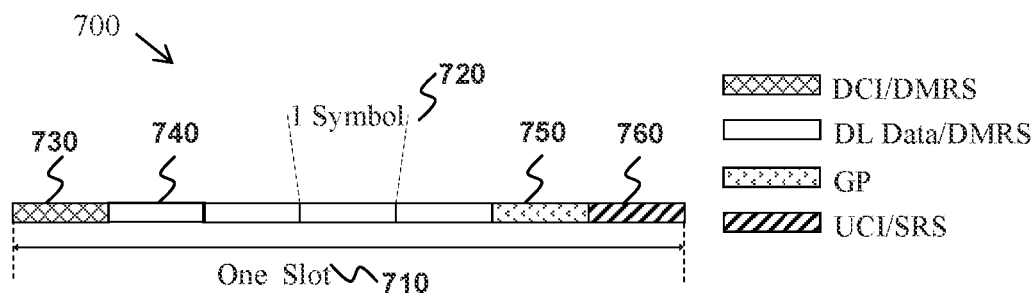
FIG. 7 illustrates an example hybrid slot structure for DL transmissions and UL transmissions according to embodiments of the present disclosure.

FIG. 7 illustrates an example hybrid slot structure 700 for DL transmissions and UL transmissions according to embodiments of the present disclosure. An embodiment of the hybrid slot structure 700 for the DL transmissions and UL transmissions shown in FIG. 7 is for illustration only. Other embodiments may be used without departing from the scope of the present disclosure.

A slot 710 consists of a number of symbols 720 that include a symbol for DCI transmissions and DMRS in respective PDCCHs 730, four symbols for data transmissions in respective PDSCHs 740, a gap period (GP) symbol 750 to provide a guard time for switching from DL transmission to UL transmission, and an UL symbol for transmitting UCI on a PUCCH 760. In general, any partitioning between DL symbols and UL symbols of a hybrid slot is possible by sliding the location of the GP symbol from the second symbol of a slot to the second to last symbol of the slot. The GP can also be shorter than one slot symbol and the additional time duration can be used for DL transmissions or for UL transmissions with larger SC spacing.

DL transmissions and UL transmissions can be based on an orthogonal frequency division multiplexing (OFDM) waveform including a variant using DFT precoding that is known as DFT-spread-OFDM that is typically applicable to UL transmissions.

A UE typically monitors multiple candidate locations to decode respective potential PDCCH transmissions to decode multiple DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier. For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format providing TPC commands to a group of UEs, the RNTI can be a TPC-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A gNB can configure a UE one or more sets of time/frequency (T/F) resources, referred to as DL control resource sets where each DL control resource set is defined by a set of RBs and slot symbols, for the UE to decode PDCCH transmissions. A configuration of T/F resources can be separate for each DL control resource set.

Figure 8:
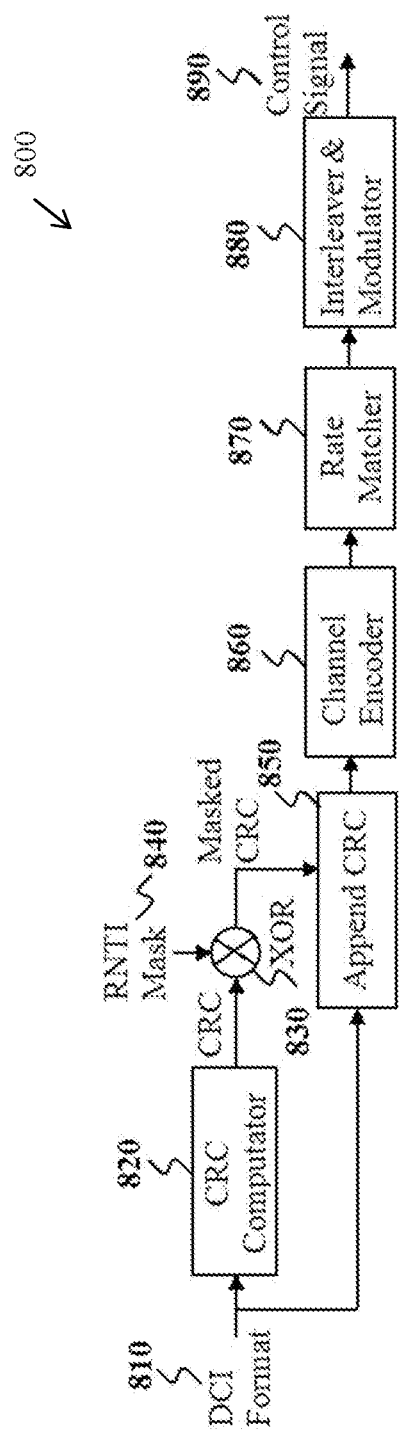
FIG. 8 illustrates an example encoding and transmission process for a DCI format according to embodiments of the present disclosure.

FIG. 8 illustrates an example encoding and transmission process 800 for DCI format according to embodiments of the present disclosure. An embodiment of the encoding process 800 for the DCI format shown in FIG. 8 is for illustration only. Other embodiments may be used without departing from the scope of the present disclosure.

A gNB separately encodes and transmits each DCI format in a respective PDCCH. When applicable, a RNTI for a UE that a DCI format is intended for masks a CRC of the DCI format codeword in order to enable the UE to identify the DCI format. For example, the CRC and the RNTI can include 16 bits. Otherwise, when a RNTI is not included in a DCI format, a DCI format type indicator field can be included in the DCI format. The CRC of (non-coded) DCI format bits 810 is determined using a CRC computation unit 820, and the CRC is masked using an exclusive OR (XOR) operation unit 830 between CRC bits and RNTI bits 840. The XOR operation is defined as XOR(0,0)=0, XOR(0,1)=1, XOR(1,0)=1, XOR(1,1)=0. The masked CRC bits are appended to DCI format information bits using a CRC append unit 850. An encoder 860 performs channel coding (such as tail-biting convolutional coding or polar coding), followed by rate matching to allocated resources by rate matcher 870. Interleaving and modulation units 880 apply interleaving and modulation, such as QPSK, and the output control signal 890 is transmitted.

Figure 9:
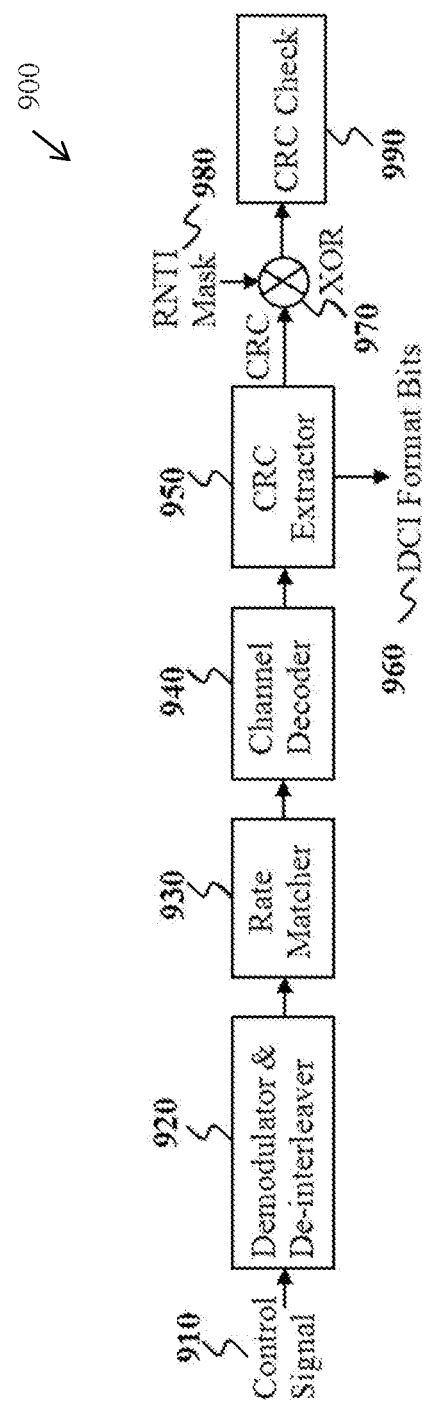
FIG. 9 illustrates an example reception and decoding process for a DCI format for use with a UE according to embodiments of the present disclosure.

FIG. 9 illustrates an example reception and decoding process 900 for a DCI format for use with a UE according to embodiments of the present disclosure. An embodiment of the decoding process 900 for the DCI format for use with the UE shown in FIG. 9 is for illustration only. Other embodiments may be used without departing from the scope of the present disclosure.

A received control signal 910 is demodulated and de-interleaved by a demodulator and a de-interleaver 920. A rate matching applied at a gNB transmitter is restored by rate matcher 930, and resulting bits are decoded by decoder 940. After decoding, a CRC extractor 950 extracts CRC bits and provides DCI format information bits 960. The DCI format information bits are de-masked 970 by an XOR operation with a RNTI 980 (when applicable) and a CRC check is performed by unit 990. When the CRC check succeeds (check-sum is zero), the DCI format information bits are considered to be valid. When the CRC check does not succeed, the DCI format information bits are considered to be invalid.

A PDCCH is transmitted using an aggregation of one or several consecutive control channel elements (CCEs). Each CCE includes a predetermined or configured number of resource element groups (REGs). A CCE-to-REG mapping can be frequency-first where a CCE is first mapped to REGs across RBs of a same symbol, or time-first where a CCE is mapped to REGs first across symbols of a DL control resource set. Unless explicitly noted otherwise, descriptions in the present disclosure assume time-first mapping.

A block of encoded and modulated symbols of a DCI format are mapped in sequence to resource elements (k,l), across SC index k and slot symbol l, on an associated antenna port that are part of the REGs assigned for the PDCCH transmission. For example, $l \in \{0, 1\}$. A PDCCH search space can be common to UEs or can be UE-specific when a UE is configured a C-RNTI equal to $n_{RNTI}$. For example, for the common search space $Y_k$ is set to 0 for two CCE aggregation levels L=4 and L=8, while for the UE-specific search space $S_k^{(L)}$ at CCE aggregation level L, $Y_k$ is defined by $Y_k = (A \cdot Y_{k-1}) \mod D$ where $Y_{-1} = n_{RNTI} \neq 0$, A=39827, D=65537 and k is a slot number.

One objective of 5G based systems operating with flexible duplex in a cell is an adaptive use of a slot structure that can include a variable number of DL symbols and UL symbols. This enables a network to instantaneously adapt to traffic characteristics thereby optimizing spectral utilization. Moreover, a length for a PDSCH or a PUSCH transmission to a UE can be adaptive depending on a size of respective data TBs. For example, a UE can be scheduled to receive a PDSCH over 0.5 msec at one scheduling instance and be scheduled to receive PDSCH over 1 msec at another scheduling instance. A DCI format scheduling a PDSCH or a PUSCH transmission can indicate a number of DL symbols or UL symbols in a respective slot. However, this introduces signaling overhead in each DCI format and it is not possible for UL slots unless a scheduler commits in advance to a slot type (UL slot or hybrid slot).

Another objective of 5G based systems is a minimization or elimination of periodically transmitted signals in order to enable a network to dynamically adapt a signaling direction (DL or UL) and avoid power consumption and interference from DL signaling or UL signaling when such signaling is not necessary. For example, an always present common RS (CRS) supported in systems using LTE radio access technology can be eliminated in a 5G-based system. Dynamic or periodic CSI-RS or SRS transmissions can be supported through control signaling indicating a presence and a location of CSI-RS or SRS transmissions in a slot to a UE. The control signaling can be provided by higher layers or by the physical layer.

Yet another objective of 5G based systems is to reduce power consumption for UEs. Although this objective can be achieved by a variety of means, such as configuring discontinuous reception (DRX) cycles to a UE, PDCCH decoding is an important component when a UE is not in a DRX state as the UE needs to have the UE's RF and digital baseband turned on shortly prior and during PDCCH transmissions and can turn them off only after completing PDCCH decoding and processing until prior to the next PDCCH transmission timing. Since slot duration can be over a small number of symbols, associated power savings are limited even when PDCCH transmissions are in one or two first symbols of a slot. A UE needs to have the UE's RF and digital baseband turned on for PDCCH decoding even in slots where a gNB does not transmit PDCCH to the UE as the UE cannot be aware in advance of when the gNB schedules PDSCH transmissions to the UE or PUSCH transmissions from the UE.

To enable operation with reduced power consumption at a UE, a gNB can also configure the UE to decode PDCCH transmissions over a BW that is smaller than a maximum UE reception BW. This can save RF power consumption as an analog-to-digital converter (ADC) at the UE can operate over a smaller BW. When the UE is scheduled to receive a PDSCH transmission over a BW that is larger than the BW where the UE receives PDCCH transmissions, the gNB can schedule the PDSCH transmission to occur at a later slot than the slot of the associated PDCCH transmission. This can enable the UE to retune the UE's RF over a wider BW for receiving the PDSCH transmission by providing sufficient time for the UE to retune prior to the PDSCH reception. In addition to reducing a BW for a UE to decode PDCCH transmissions, another factor that can result to reduced UE power consumption is a number of PDCCH decoding operations the UE needs to perform in a slot. Reducing the number of PDCCH decoding operations can result to reduced UE power consumption.

UE power consumption also depends on a time required for a UE to transmit or receive data packets in a UE buffer or a gNB buffer, respectively. This time does not only depend on a number of transmissions the UE requires for transmitting or receiving the data packets but also depends on a number of PDCCH transmissions the UE fails to detect. Link adaptation for transmissions of PDCCHs to a UE is therefore important for UE power consumption and for overall system spectral efficiency as for each failure from a UE to detect a PDCCH, there is an associated failure to detect a PDSCH transmitted by a gNB and an associated gNB power and DL BW waste or an associated failure to transmit a PUSCH and an associated UL BW waste or possibly a data buffer corruption at the gNB when the gNB fails to detect an absence of PUCCH or PUSCH transmission. Typically, a wideband CSI or a sub-band CSI from a UE can be associated with both transmissions of PDCCHs and PDSCHs but this does not hold when a transmission BW of PDSCHs is different than a transmission BW of PDCCHs.

Yet another objective of 5G based systems is to support multiplexing of different traffic types such as a first traffic type that is latency tolerant and a second traffic type that requires with high reliability and low latency. For time division duplexing (TDM) between the two traffic types, a gNB needs to be able to puncture transmissions of the first traffic type, practically at any slot symbol, in order to enable transmissions of the second traffic type.

In existing communication systems, a UE can be informed of a number of slot symbols used for PDCCH transmission either through a physical control format indicator channel (PCFICH) transmitted in a first slot symbol or by higher layer signaling. In either case, a number of slot symbols for PDCCH transmissions is informed to a UE and a PDCCH transmission spans the number slot symbols (time-first CCE to REG mapping). In case a PCFICH transmission is not supported, a configuration by higher layers of a number of slot symbols used for PDCCH transmissions is wasteful when not all configured slot symbols need to actually be used for PDCCH transmissions in a slot. For example, for a slot that includes 7 symbols and for configuration of 2 symbols for PDCCH transmissions, a resource waste is 1/7=14% when resources only in a first slot symbol need to be used for PDCCH transmissions.

Further, although an integer number of slot symbols is allocated to PDCCH transmissions, the full number of slot symbols is often not used. For example, UEs can be configured to receive PDCCH transmissions only in BW parts of a DL system BW in order to avoid the UEs operating with a wideband RF and increase power consumption or because a BW reception capability for some UEs can be smaller than the DL system BW. For example, when 2 slot symbols are allocated for PDCCH transmissions in some parts of a DL system BW, an actual utilization can be between 1 slot symbol and 2 slot symbols and, on average, it can be assumed to be 1.5 slot symbols. Failing to utilize 0.5 slot symbols for PDSCH transmissions in a slot that has available 5 slot symbols for PDSCH transmissions results to 10% in spectral efficiency when the DL control resource sets span the whole DL system BW. The actual loss can be higher when a presence of DMRS or CSI-RS is also considered in slot symbols used for PDSCH transmissions.

Therefore, there is a need to enable a gNB to inform a UE of a number of slot symbols for DL signaling and a number of slot symbols for UL signaling in a slot for one or more slots.

There is another need to enable a gNB to perform multi-slot scheduling for a PDSCH transmission to a UE or for a PUSCH transmission from a UE.

There is another need to enable a UE to reduce, when possible, a number of PDCCH decoding operations during a non-DRX state for the UE.

There is another need to enable multiplexing in a time domain of transmissions of data TBs requiring low latency and transmissions of data TBs not requiring low latency.

There is another need to enable a use of a slot symbol for PDCCH transmissions in some BW parts and for PDSCH transmissions in other BW parts of a DL BW.

There is another need to configure a UE a maximum number of time/frequency resources for PDCCH transmissions in a slot, vary an actual number of time/frequency resources used for PDCCH transmissions in the slot, and use remaining time/frequency resources for PDSCH transmissions.

There is another need to enable a UE to receive PDSCH transmissions over a different DL BW than the DL BW where the UE receives PDCCH transmissions without negatively impacting a system spectral efficiency.

There is another need to dynamically vary a number of sub-bands in a DL BW where a UE receives PDCCH transmissions.

Finally, there is another need to enable link adaptation for PDCCH transmissions to a UE.

The present disclosure relates to enabling a gNB to inform UEs of a number of slot symbols for DL signaling and a number of slot symbols for UL signaling in a slot for one or more slots. The present disclosure also relates to enabling a gNB to perform multi-slot scheduling for a PDSCH transmission to a UE or for a PUSCH transmission from a UE. The present disclosure further relates to enabling a UE to reduce, when possible, a number of PDCCH decoding operations during a non-DRX state for the UE. The present disclosure additionally relates to enabling multiplexing in a time domain of transmissions of data TBs requiring low latency and transmissions of data TBs not requiring low latency. The present disclosure also relates to enabling a use of a slot symbol for PDCCH transmissions in some band-width (BW) and for PDSCH transmissions in other BW parts of a DL BW. The present disclosure additionally relates to configuring a UE a maximum number of time/frequency resources for PDCCH transmissions in a slot, varying an actual number of time/frequency resources used for PDCCH transmissions in a slot, and using remaining time/frequency resources for PDSCH transmissions. The present disclosure further relates to enabling a UE to receive PDSCH transmissions over a different DL BW than the DL BW where the UE receives PDCCH transmissions without negatively impacting a system spectral efficiency. The present disclosure also relates to dynamically varying a DL BW where a UE receives PDCCH transmissions. The present disclosure additionally relates to enabling link adaptation for PDCCH transmissions to a UE.

In the following, for simplicity, a GP for switching from DL transmission to UL transmission is assumed to be one slot symbol. Nevertheless, any other duration for a GP can also apply. For example, a gNB can configure a GP duration to UEs by system information signaling or by RRC signaling.

In some embodiments, a slot structure in a cell, in terms of a number of slot symbols supporting DL transmissions and a number of slot symbols supporting UL transmissions, can dynamically vary per slot and is indicated by a gNB through a DCI format that can be detected by UEs in a group of UEs (UE-common DCI format). For brevity, this DCI format is referred to as DCI format A. The DCI format A can be associated with a Slot-RNTI or a group-corn on RNTI (GC-RNTI) that a gNB configures to UEs for scrambling a CRC of DCI format A. It is also possible to avoid using a separate RNTI configuration and use a field in DCI formats to indicate a DCI format type/purpose and differentiate DCI format A from other DCI formats having different functionalities such as for scheduling unicast PDSCH or unicast PUSCH transmissions. Then, DCI format A becomes a UE-specific DCI format that conveys UE-specific information that does not schedule a PDSCH transmission to the UE or a PUSCH transmission from the UE. When a search space for a PDCCH conveying DCI format A does not depend on a C-RNTI, for example $Y_k$ does not depend on $n_{RNTI}$, transmission of a PDCCH conveying DCI format A can be at predetermined CCE locations in a first slot symbol and with predetermined candidate CCE aggregation levels such as for example 8 CCEs. The candidate CCE aggregation levels for a GC-PDCCH transmission can also be configured to a UE by a gNB such as, for example, two candidates for respective aggregation levels of 8 CGEs and 16 CCEs. The candidate CCE aggregation levels for a GC-PDCCH transmission can be same as candidate CCE aggregation levels for a PDCCH transmission conveying a DCI format that a UE monitors in the same DL control resource set that has a same size as DCI format A, such as for example a fallback DCI format or a DCI format as format 3/3A.

A gNB can transmit a PDCCH conveying a DCI format A over a set of CCEs in a first slot symbol, for example in case of frequency-first CCE-to-REG mapping, or over all slot symbols, for example for time-first CCE to REG mapping, of a DL control resource set a UE is configured for reception of a PDCCH conveying DCI format A, The configuration can be UE-specific and different UEs can be configured to decode a PDCCH conveying DCI format A at different time or frequency resources (different DL control resource sets).

DCI format A can include one or more of the following fields (also referred to as information elements (IEs)). In some embodiments, DCI format A can include a slot configuration field indicating a partitioning of slot symbols for DL transmissions and for UL transmissions over a number of one or more slots. Equivalently, for a predetermined number of slot symbols, DCI format A can indicate a number of slot symbols for DL transmissions when GP duration is configured by higher layer signaling. In one example, for a slot with 7 symbols and for GP of 1 symbol, the possible combinations for a slot configuration can be limited to four and can be represented by two bits. The four possible configurations are: A: {all DL symbols}; B: {5 DL symbols, 1 GP symbol, 1 UL symbol}; C:{1 DL symbol, 1 GP symbol, 5 UL symbols}, and D: {all UL symbols}. A UE can be configured a transmission periodicity for DCI format A. In a first example, a UE can be configured to assume a same slot configuration over a number of slots corresponding to the transmission periodicity of DCI format A. In a second example, a slot configuration field can indicate a combination of slot configurations, from a set of predetermined combinations, over the transmission periodicity of DCI format A, similar to an indication of an U/DL configuration, from a set of predetermined configurations over a period of ten subframes, in LTE enhanced interference mitigation and traffic adaptation (eIMTA). A number of bits for a slot configuration field can depend on a transmission periodicity of DCI format A with more bits being used when a transmission periodicity is longer in order to indicate more possible combinations of slot configurations over a longer period. For example, DCI format A can include three bits to indicate one of eight predetermined combinations of slot configurations over five slots and include four bits to indicate one of sixteen predetermined combinations of slot configurations over ten slots. For example, a first combination for slot configurations over a period of 5 slots can be {A, B, D, A, A}, a second combination can be {A, B, D, D, A}, a third combination can be {A, A, A, A, A}, and so on. The first slot over a period of slots can be assumed to always have the A structure (full DL slot) or the B structure (DL-dominant hybrid slot). It is also possible that, at least for short transmission periodicities, DCI format A indicates the slot structure configuration for the next period of slots, that is, for the next period of slots.

Figure 10:
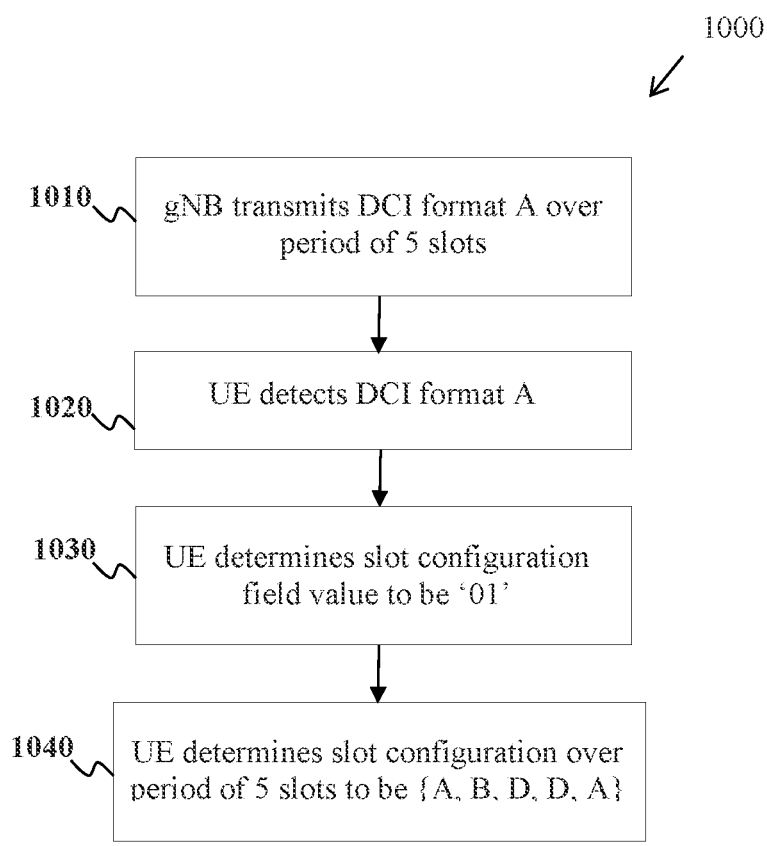
FIG. 10 illustrates an example process for determining a slot structure for a number of slots based on a DCI format A according to embodiments of the present disclosure.

FIG. 10 illustrates an example process 1000 for determining a slot structure for a number of slots based on a DCI format A. An embodiment of the process 1000 for determining a slot structure for a number of slots based on a DCI format A shown in FIG. 10 is for illustration only. Other embodiments may be used without departing from the scope of the present disclosure.

A gNB transmits, in step 1010, a DCI format A in a first slot over a period of 5 slots. A UE detects the DCI format A in step 1020. The LE determines, in step 1030, that a slot configuration field in DCI format A has a binary value of '01'. The UE was previously configured a mapping for the slot configuration field values where, over the period of 5 slots, a binary value '00' maps to a slot configuration of {A, A, A, A, A}, a binary value '01' maps to a slot configuration of {A, B, D, D, A}, a binary value '10' maps to a slot configuration of {A, C, D, A, A} and a binary value of '11' maps to a slot configuration of {A, A, B, D, D}. Based on the configured mapping of slot configuration field values to slot structure, the UE, determines, in step 1040, that the slot configuration over 5 slots is {A, B, D, A}.

In some embodiments, DCI format A can include a DL control resource indicator field indicating a number of first slot symbols used for PDCCH transmissions in different BW parts of a DL system BW. For example, for two possible values of the first one slot symbol or the first two slot symbols per BW part, the DL control resource indicator field can be represented by 1 bit per BW part. In one example, to enable fractional use of slot symbols for PDCCH transmissions, through use of a fraction of a DL system BW configured for PDCCH transmissions in the slot symbols, when three DL control resource sets are configured to span a DL system BW a DL control resource indicator field of 2 bits can indicate use of T/F resources of 1 slot symbol, 1 and 1/3 slot symbols, 1 and 2/3 slot symbols, and 2 slot symbols in the DL system BW. Then, all three DL control resource sets span one symbol, one DL control resource set spans two symbols, two DL control resource sets span two symbols, and all three DL control resource sets span two symbols, respectively. Larger granularity for fractional use of slot symbols used for PDCCH transmissions can be possible by increasing a number of bits for the DL control resource indicator field. This can be useful for localized PDCCH transmissions that can span only a part of a BW part for a respective DL control resource set. The DL system BW configured for PDCCH transmissions can be contiguous or non-contiguous.

The indication of BW not used for PDCCH transmissions and can be used for PDSCH transmissions (or, equivalently, used for PDCCH transmissions and cannot be used for PDSCH transmissions) can be through an indication of a configuration for a mapping between number of slot symbols available for PDSCH transmissions in a slot and respective configured DL BW parts. For example, consider two DL BW parts and that 0, 1, or 2 symbols can be used for PDCCH transmissions (or not be used for PDSCH transmissions) in a DL BW part. Without loss of generality, also consider than a PDCCH transmission conveying DCI format A is in the first BW part. A LIE can be configured PDCCH transmissions in only the first BW part or in both BW parts. The first BW part can be used with priority for PDCCH transmissions over the second BW part. This implies that when a UE is indicated that a second BW part is used for PDCCH transmissions, the UE assumes that the first BW part is also used but not the reverse. When the first BW part is indicated as being used for PDCCH transmissions, all configured symbols are assumed to be used for PDCCH transmissions (tune-first mapping of CCEs to REGs). A binary value for the DL control resource indicator field can indicate the following combinations for a number of symbols used for PDCCH transmissions in a BW part: (a) '00' indicates no PDCCH transmissions in all BW parts (except for the PDCCH transmission conveying DCI format A in the first BW part), '01' indicates that the first BW part is used and no symbol in second BW part is used, '10' indicates that the first BW part is used and one symbol in second BW part is used, and '11' indicates that the first BW part is used and two symbols in the second BW part are used. When a transmission periodicity of DCI format A is over a number of slots than is larger than one, a UE can assume that a DL control indicator value is valid for the number of slots.

A gNB can also indicate by UE-common higher layer signaling, for example in a system information block (SIB), configured DL control resource sets including a BW part, and symbol per slot. The configuration can also include a periodicity for the existence of each DL control resource set. This can reduce a signaling overhead in a DCI format for indicating a BW available for PDSCH transmissions from a first symbol in each slot as the DCI format needs to indicate only a starting symbol for PDSCH transmissions in BW parts that are in DL control resource sets (in the remaining DL system BW, PDSCH transmissions can exist in any slot symbol that is not configured for other DL transmissions). Moreover, a configuration of a DL control resource set to a UE can be relative to the DL control resource sets indicated by UE-common higher layer signaling. For example, the DL control resource sets indicated by UE-common higher layer signaling can form a set of DL control resource sets and a UE can be configured one or more DL control resource sets by being configured one or more indexes in the set of DL control resource sets.

Figure 11:
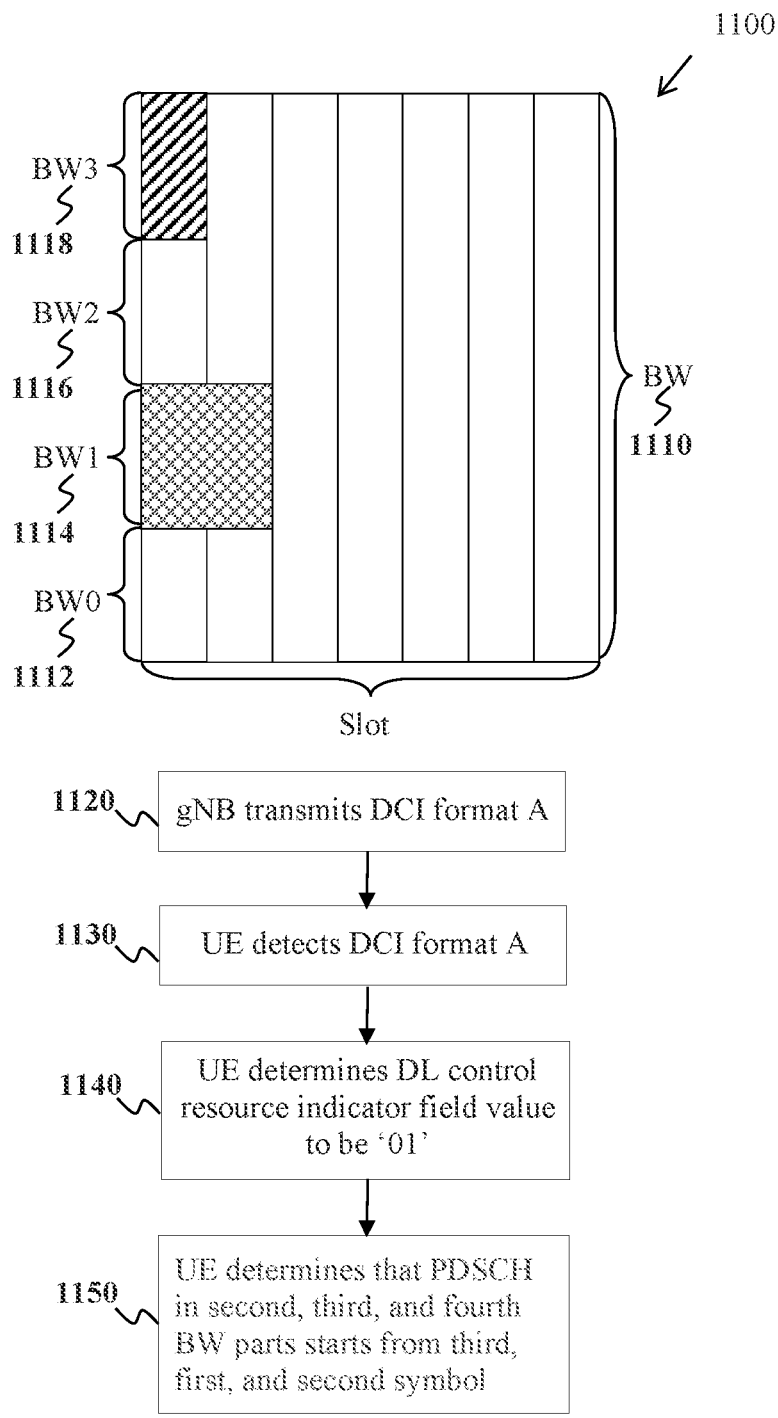
FIG. 11 illustrates an example process for a UE to determine a first symbol for a PDSCH reception based on a DCI format A according to embodiments of the present disclosure.

FIG. 11 illustrates an example process 1100 for a UE to determine a first symbol for a PDSCH reception based on a DCI format A. An embodiment of the process 1100 for a UE to determine a first symbol for a PDSCH reception based on a DCI format A shown in FIG. 11 is for illustration only. Other embodiments may be used without departing from the scope of the present disclosure.

In a DL system BW 1110, a UE is configured by a gNB four BW parts 1112, 1114, 1116, and 1118 where a PDSCH transmission in the first BW part 1112 and third BW part 1116 starts at a first slot symbol and a PDSCH transmission in the second BW part 1114 and the fourth BW part 1118 starts either from the first slot symbol or from third slot symbol for the second BW part or from the second slot symbol for the fourth BW part. The UE is also configured to receive a PDCCH conveying DCI format A in the second BW part. The LTE is also configured a mapping for the DL control resource indicator field values such that a binary value of '00' indicates that PDSCH starts from the first symbol in the second and fourth BW parts (excluding the PDCCH resources for reception of DCI format A in the second BW part), a binary value of '01' indicates that PDSCH starts from the third symbol in the second BW part and from the first symbol in the fourth BW part, a binary value of '10' indicates that PDSCH starts from the first symbol in the second BW part and from the second symbol in the fourth BW part, and a binary value of '11' indicates that PDSCH starts from the third symbol in the second BW part and from the second symbol in the fourth BW part. The gNB transmits, in step 1120, a DCI format A in a slot. The LIE detects the DCI format A in step 1130. The UE determines, in step 1140, that a DL control resource indicator field in DCI format A has a binary value of '11'. The UE determines, in step 1150, that a PDSCH reception, scheduled over the second, third, and fourth BW parts start from the third, first, and second symbol, respectively.

In some embodiments, DCI format A can include an LT control resource indicator field indicating a number of last slot symbols used for PUCCH or for SRS transmissions. For example, for two possible values of no slot symbol or 1 slot symbol for the number of last slot symbols, the LTL control resource indicator field can be represented by 1 bit. For example, for four possible values of no slot symbol, half slot symbol, 1 slot symbol, or 2 slot symbols; the LT control resource indicator field can be represented by 2 bits. As for a DL control resource indicator field, larger granularity for fractional use of slot symbols used for PUCCH transmissions can be possible by increasing a number of bits for the UL control resource indicator field and defining a mapping between UT control resource indicator field values and number of symbols used for PUCCH or SRS transmissions in respective BW parts of an UL system BW. Similar to UE-common higher layer signaling indicating configured DL control resource sets in a slot, UE-common higher layer signaling can indicate configured UL BW parts and symbols for PUCCH or SRS transmissions in a slot and an UL control resource indicator can be relative to the UL BW parts and symbols for PUCCH or SRS transmissions.

In some embodiments, DCI format A can include a CSI-RS transmission field indicating whether or not CSI-RS is transmitted in a slot and can be represented by 1 bit.

In some embodiments, DCI format A can include a CSI-RS location field (or CSI-RS configuration field) indicating SCs or slot symbols in a slot used for CSI-RS transmission (or indicating a CSI-RS configuration). When the DCI format A transmission period is a number of slots larger than one, the CSI-RS location field can include a location (CSI-RS configuration) either for each slot in the number of slots or for a configured number of slots in the number of slots such as one slot that can be configured by higher layers or indicated in the CSI-RS location field. DCI format A can also indicate a slot for the CSI-RS transmission at least when a DCI format A transmission period is not one slot. The CSI-RS location field can indicate a super-set of SCs and slot symbols that are used for CSI-RS transmission in the slot (a super-set of CSI-RS configurations in the slot) so that a UE can perform appropriate rate matching for a PDSCH reception. The indication can be through associated CSI-RS configurations used in the slot for all UEs. The UE can be configured a sub-set of the SCs and slot symbols that are used for CSI-RS transmission as a UE-specific CSI-RS configuration. For example, when one or more first UEs are indicated a first CSI-RS configuration through respective UE-specific DCI formats and one or more second UEs are indicated a second CSI-RS configuration through respective UE-specific DCI formats, the CSI-RS location field (or CSI-RS configuration field) can indicate the composite of the first and second CSI-RS configurations that includes the SCs and symbols of the first and second CSI-RS configurations. When a CSI-RS transmission field is not included in DCI format A, one value of the CSI-RS location field can indicate that 0 SCs are used in the slot for CSI-RS transmission, that is, indicate no CSI-RS transmission in the slot.

In some embodiments, DCI format A can include a SRS transmission field indicating whether or not SRS is transmitted in a slot and can be represented by 1 bit.

In some embodiments, a DCI format A can include a SRS location field (or SRS configuration field) that functions similar to the CSI-RS location field and indicates SCs or slot symbols in a slot used for SRS transmission. When a SRS transmission field is not included in DCI format A, one value of the SRS location field can indicate that 0 SCs are used in the slot for SRS transmission, that is, indicate no SRS transmission in the slot. The SRS location field can also be combined with the UL control resource indicator field that was previously described.

In some embodiments, DCI format A can include a reserved time/frequency (T/F) resource field indicating reserved DL symbols or SCs or reserved UL symbols or SCs. When a DCI format A transmission period is multiple slots, DCI format A the reserved time/frequency (T/F) resource field indicates one or more slots and reserved DL symbols or SCs or reserved UL symbols or SCs in the one or more slots. For example, reserved DL symbols or SCs in a slot can be ones that UEs do not use for mapping PDSCH receptions or CSI-RS receptions. In one example, when a gNB transmits synchronization signals or broadcast signals in an aperiodic manner in predetermined slot symbols or SCs, the gNB can signal the slot symbols or SCs in a slot as reserved resources and a UE receiving PDSCH or CSI-RS in the slot can exclude, when applicable, from PDSCH reception or CSI-RS reception the slot symbols or SCs that were signaled as reserved. Either rate matching or puncturing can apply for PDSCH transmissions or PUSCH transmissions in SCs corresponding to reserved resources. When reserved resources are not also indicated by a UE-specific DCI format scheduling a PDSCH transmission to a UE or a PUSCH transmission to the UE then, in order to minimize data buffer corruption at a gNB or at the UE when the UE fails to detect a DCI format A informing of reserved resources, the UE punctures receptions or transmissions in reserved SCs; otherwise, the UE rate matches receptions or transmissions in reserved SCs.

In some embodiments, when a gNB transmits low latency data in PDSCHs or schedules transmission of low latency data in PUSCHs, the gNB can puncture a PDSCH transmission at slot symbols and SCs of a slot or can indicate to UEs a slot and slot symbols and SCs in the slot for the UEs to puncture PUSCH transmissions in order to avoid interference on the low latency transmissions. Therefore, the gNB can indicate to a UE a slot and symbols or SCs in the slot for DL transmissions that were punctured by the gNB or can indicate a slot and slot symbols of SCs in the slot for UL transmissions to be punctured by the UE. For example, as low latency transmissions typically require a large BW, the indication can be only in number of slot symbols of an indicated slot and for a minimum granularity of two consecutive symbols and a slot of seven symbols, DCI format A can include a DL puncturing field of 3 bits that indicates one of the seven combinations of punctured symbol pairs (0, 1), (1, 2), (2, 3), (3, 4), (4, 5), (5, 6), and (6, 7). The eighth state can indicate that all slot symbols were punctured. This provides a tradeoff between signaling overhead and spectral efficiency gains from indicating punctured resources as an indicating of multiple pairs of slot symbols required increased signaling overhead but offers reduced spectral efficiency gains relative to indicating all slot symbols as punctured. Similar, for a slot of fourteen symbols, DCI format A can include a DL puncturing field of 4 bits that indicates one of the fourteen combinations of punctured symbol pairs with a fifteenth state, such as '1110', indicating puncturing for all slot symbols.

The signaling design for indicating punctured DL transmissions by indicating respective slots and symbols in the slots can apply for the UL. However, unlike the DL where the indication can be by DCI format A that is transmitted after punctured DL transmissions, the indication for the UL needs to be transmitted prior to the punctured UL transmissions. Consequently, a transmission periodicity for DCI format A needs to be according to timing requirements for information provided by DCI format A and different transmission periodicities can be associated with different contents of DCI format A. A gNB can configure a UE to detect with a first periodicity a first DCI format A that includes a first number of fields and has a first size and to detect with a second periodicity a second DCI format A that includes a second number of fields and has a second size. For example, a first DCI format A can include both a field for indicating slots and respective slot symbols for punctured DL transmissions and for indicating slots and respective slot symbols for punctured UL transmissions and be transmitted every ten slots while a second DCI format A can include only a field for indicating slots and respective slot symbols for punctured UL transmissions and be transmitted every two slots. When the first DCI format includes all contents of the second DCI format and transmissions of the first DCI format A and the second DCI format A coincide in a same slot, a UE can be configured to decode only the first DCI format A.

In some embodiments, a gNB can null a number of DL or UL symbols or SCs in a slot in order to support interference measurements or different transmission types and can indicate to UEs nulled DL or UL symbols or SCs that do not convey other transmissions from the gNB or other transmissions from UEs served by the gNB. An indication can be similar to an indication for reserved symbols or SCs or for punctured symbols or SCs.

In some embodiments, DCI format A can include a null DL slots field indicating a number of subsequent slots without DL transmissions. For example, a 2-bit field can indicate absence of DL transmissions for up to four subsequent slots. This can be beneficial, for example, for supporting different applications, potentially using different numerologies, in a TDM manner without requiring a UE receiver to be turned on during a time period where no DL transmissions can occur for the UE. In one example, unicast traffic in a slot can be followed by multicast-broadcast traffic in subsequent slots where a UE not receiving multicast-broadcast traffic can avoid receiving DL transmissions. Subsequent slots without DL transmissions can also be UL slots. It is also possible that null DL slots are interpreted as UL slots and a UE can determine whether to transmit signaling such as periodic signaling, when any, or HARQ-ACK signaling when a respective slot is not explicitly indicated by a DCI format.

In some embodiments, DCI format A can include a next slot numerology field indicating a numerology, from a set of possible numerologies, for a next slot in order for a UE to be able to receive DL transmissions, including DCI format A, in the next slot. For example, when two different traffic types using different numerologies are TDM and a UE is configured to receive DL transmissions with one of two different numerologies, the UE needs to be informed of the numerology used in a particular slot prior to the slot; otherwise, the UE needs to receive DL transmissions by considering both potential numerologies in each slot and this can result to a more complex UE implementation.

For any field, DCI format A can be configured to include multiple values of the field for a configured set of respective multiple cells (or BW parts). For example, DCI format A can be configured to include a slot configuration field for each cell from a configured set of cells. For example, DCI format A can include a set of {slot configuration field 1, slot configuration field 2, slot configuration field 3, slot configuration field 4} for a set of cells {Cell 1, Cell 2, Cell 3, Cell 4}. DCI format A can also include a slot configuration field for multiple numerologies for operation on respective cells (or BW parts). For a DCI format A transmission period of $P_S$ slots for a first numerology with a first slot duration that is larger than a second slot duration for a second numerology by an integer factor $N_{PS}$, the slot configuration field for the second numerology can include a larger number of bits, such as $\lceil \log_2(N_{PS}) \rceil$ bits, to indicate a configuration over $N_{PS} \cdot P_S$ slots, or the slot configuration field can have $\lceil \log_2(P_S) \rceil$ bits for each numerology and the combination for the slot configuration over $P_S$ slots for the second numerology repeats $N_{PS}$ times within a DCI format A transmission period of $P_S$ slots for the first numerology. When a UE supports multiple numerologies in the same cell and full-duplex operation is not supported, a slot configuration is same for the multiple numerologies and a single slot configuration field suffices.

Table 1 summarizes candidate fields for a DCI format A. As an alternative, the DL control resource indicator field can be transmitted through a separate channel, such as a PCFICH, and not be included in the UE-common PDCCH conveying DCI format A. In general, the fields in a DCI format A can be configurable and DCI format A can include one or more of the field(s) summarized in TABLE 1.

TABLE 1

Candidate Fields for DCI format A-First Exemplary Realization

| DCI Format A Field | Number of Bits (per cell) | Functionality |
|---|---|---|
| DCI Format Type | 2 | Determines functionality of DCI Format-not needed when separate RNTI is configured for DCI format A-not needed per cell |
| Slot Configuration | 3 | Indicates a combination of slot configurations over a number of slots |
| DL Control Resource Indicator | 2 | Indicates time/frequency resources for PDCCH transmissions (or for PDSCH transmissions) |
| UL Control Resource Indicator | 2 | Indicates time/frequency resources for PUCCH transmissions (or for PUSCH transmissions) |
| CSI-RS Transmission | 1 | Indicates whether or not CSI-RS is transmitted in a slot |
| CSI-RS location/configuration | 3 | Slot SCs or symbols for CSI-RS transmission |
| SRS Transmission | 1 | Indicates whether or not SRS is transmitted in a slot |
| SRS location/configuration | 2 | Slot SCs or symbols for SRS transmission |
| Reserved T/F Resources | 2 | Indicates a combination of reserved time/frequency resources (SCs or slot symbols) |
| DL Punctured T/F Resources | 3 | Indicates punctured time/frequency resources for DL transmissions |
| UL Punctured T/F Resources | 3 | Indicates punctured time/frequency resources for UL transmissions |
| Null DL Slots | 2 | Indicates number of subsequent slots without DL transmissions |
| Next Slot numerology | 1 | Indicates a numerology for a next slot |
| Padding Bits | As needed | For DCI format size to equal another DCI format size |
| CRC | 16 | CRC |

The contents for DCI format A can be simplified for example when the possible combinations for the number of DL slot symbols and the number of UL slot symbols and the associated signaling types in a hybrid slot are restricted. For example, a hybrid slot can be predetermined to support only PDCCH transmissions in the DL (UL-dominant hybrid slot) or support only UL control signaling or SRS in the UL (DL-dominant hybrid slot). A time/frequency resource for CSI-RS transmission or for SRS transmission can also be associated with a presence of such transmission (null resource). Then, candidate fields for DCI format A can be as in TABLE 2.

TABLE 2

Candidate Fields for DCI format A-Second Exemplary Realization

| DCI Format A Field | Number of Bits (per cell) | Functionality |
|---|---|---|
| DCI Format Type | 2 | Determines functionality of DCI Format-not needed when separate RNTI is configured for DCI format A-not needed per cell |
| Slot Configuration | 2 | Indicates a combination of slot configurations over a number of slots where a slot is DL-dominant, or UL-dominant |
| DL Control Resource Indicator | 2 | Indicates time/frequency resources for PDCCH transmissions (or for PDSCH transmissions) |
| UL Control Resource Indicator | 2 | Indicates time/frequency resources for PUCCH transmissions (or for PUSCH transmissions) |
| CSI-RS location or SRS location | 2 | Indicates slot symbols for CSI-RS transmission and for SRS transmission, including no transmission |
| Reserved T/F Resource | 2 | Indicates a combination of reserved time/frequency resources (SCs or slot symbols) |
| DL Punctured T/F Resources | 3 | Indicates punctured time/frequency resources for DL transmissions |
| UL Punctured T/F Resources | 3 | Indicates punctured time/frequency resources for UL transmissions |
| Null DL Slots | 2 | Indicates number of subsequent slots without DL transmissions |
| Next Slot numerology | 2 | Indicates a numerology for a next slot |
| Padding Bits | As needed | For DCI format size to equal another DCI format size |
| CRC | 16 | CRC |

TABLE 1 and TABLE 2 are only intended to provide exemplary contents for a DCI format A, need not include all indicated fields, and can include additional fields. Also, first one or more fields can be transmitted in a first DCI format A and second one or more fields can be transmitted in a second DCI format A that can be distinguished by a DCI format type, or by a RNTI, or by a DL control resource set used for a respective PDCCH transmission, or by CCEs in a same DL control resource set used for a respective PDCCH transmission.

Figure 12:
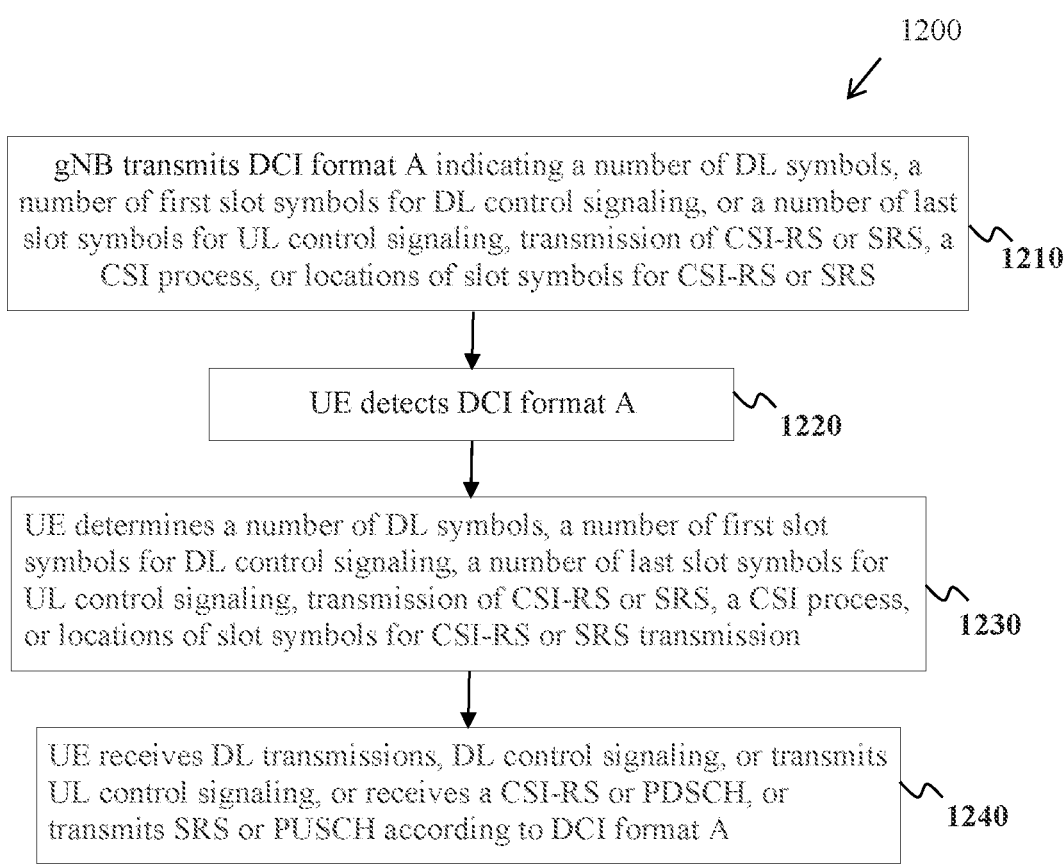
FIG. 12 illustrates an example process for determining a slot type and contents based on a DCI format A according to embodiments of the present disclosure.

FIG. 12 illustrates an example process 1200 for determining a slot type and contents based on a DCI format A according to embodiments of the present disclosure. An embodiment of the process 1200 for determining a slot type and contents based on a DCI format A shown in FIG. 12 is for illustration only. Other embodiments may be used without departing from the scope of the present disclosure.

A gNB transmits, in step 1210, a DCI format A in a slot. The DCI format A does not include scheduling information for a PDSCH transmission or a PUSCH transmission. The DCI format A includes a field indicating a number of DL symbols in the slot, or a field indicating a number of first slot symbols, that can also include fractional symbols, used for PDCCH transmissions in the slot, or a field indicating a number of last slot symbols, that can also include fractional symbols, used for UL control signaling or SRS in the slot, or a field indicating whether or not the gNB transmits CSI-RS or SRS in the slot, or a field indicating locations of SCs and slot symbols for CSI-RS or SRS transmission, for example by indicating a super-set of UE-specific CSI-RS configurations or SRS configurations. When a transmission periodicity of DCI format A is configured to a UE to be a number of slots larger than one, DCI format A can include a combination of configurations for the number of slots. A UE detects the DCI format A in step 1220. Based on the DCI format A detection, the UE determines, in step 1230, a number of first slot symbols, that can include fractional symbols over a DL BW, used for reception of DL channels in the slot, a number of last slot symbols, that can include fractional symbols over an UL BW, used for transmission of UL channels or SRS in the slot, whether or not the gNB transmits CSI-RS or SRS in the slot, or locations of SCs and slot symbols for CSI-RS or SRS transmission. The UE receives DL channels, or transmits UL channels, or receives a CSI-RS, or transmits an SRS according to the information in DCI format A in step 1240.

Figure 13:
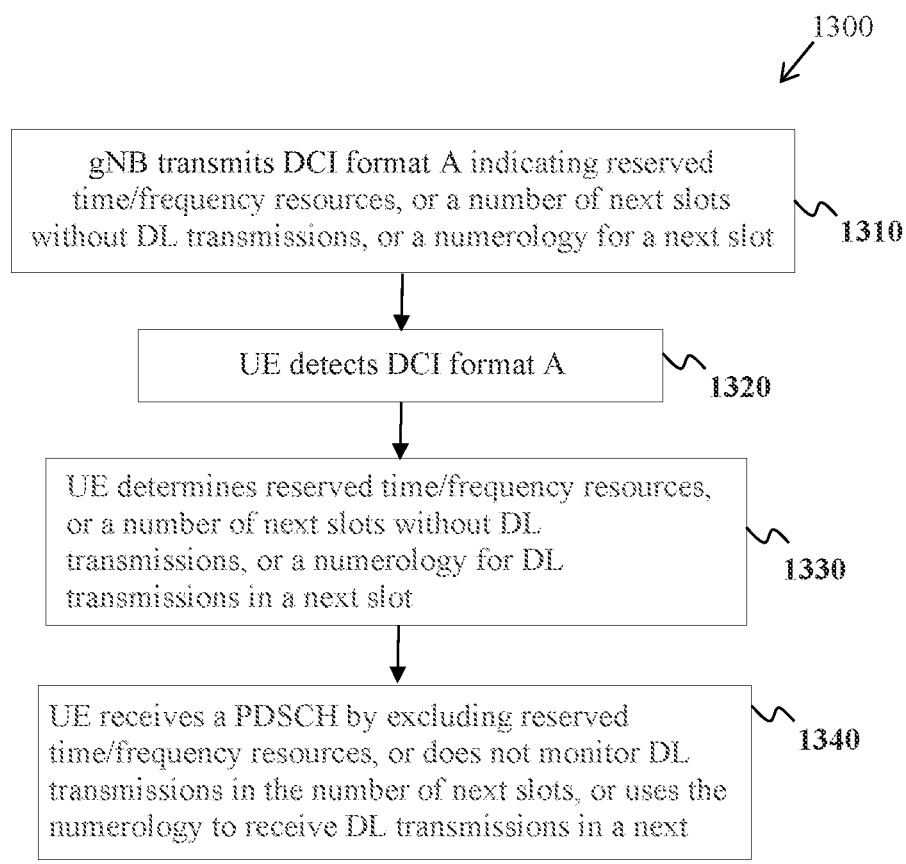
FIG. 13 illustrates an example process for determining present and future slot characteristics based on a DCI format A according to embodiments of the present disclosure.

FIG. 13 illustrates an example process 1300 for determining present and future slot characteristics based on a DCI format A according to embodiments of the present disclosure. An embodiment of the process 1300 for determining present and future slot characteristics based on the DCI format A shown in FIG. 13 is for illustration only. Other embodiments may be used without departing from the scope of the present disclosure.

A gNB transmits, in step 1310, a DCI format A in a slot. The DCI format A includes a field indicating reserved time/frequency resources in the slot, or a field indicating punctured time/frequency resources in the slot, or a field indicating a number of next slots without DL transmissions, and so on. A UE detects the DCI format A in step 1320. Based on the detected DCI format A, the UE determines, in step 1330, reserved time/frequency resources to exclude from a PDSCH reception or a PUSCH transmission, punctured time/frequency resources for previous DL receptions such for PDSCH or CSI-RS or next UL transmissions such as for PUSCH or PUCCH, or a number of next slots without DL transmissions to avoid receptions, and so on. In step 1340, the UE receives a PDSCH by excluding reserved time/frequency resources, or processes a PDSCH or CSI-RS reception or a PUSCH or PUCCH transmission considering punctured time/frequency resources, or the UE does not receive DL transmissions in the number of next slots, and so on.

Mapping of a PDSCH transmission to time/frequency resources in a slot can be according to a CSI-RS transmission configuration as indicated by DCI format A. An exception can be when a UE detects a unicast DCI format scheduling a respective PDSCH transmission and indicating a mapping to time/frequency resources. To ensure correct resource mapping by the UE, a unicast DCI format can also indicate some of the aforementioned configurations. When a slot structure or a CSI-RS transmission configuration are only provided by a UE-common DCI format such as DCI format A, a correct reception by a UE of a PDSCH transmission is conditioned on a correct detection by the UE of DCI format A in addition to a correct detection by the UE of a UE-specific DL DCI format scheduling the PDSCH transmission to the UE. To avoid having a PDSCH reception by a UE depend on a correct detection of the UE-common DCI format by the UE, necessary information for the UE to receive the PDSCH can also be included in the UE-specific DL DCI format scheduling the PDSCH transmission to the UE. Therefore, information such as a slot structure, or a CSI-RS configuration, or other fields from Table 1 or Table 2, can be included in a UE-specific DL DCI format in addition to a UE-common DCI format such as DCI format A. In general, a UE can prioritize an indication for a parameter by a UE-specific DCI format over an indication for the parameter by DCI format A.

A same principle can also apply for UE-specific UL DCI formats scheduling a PUSCH transmission from a UE where information such as SRS transmission or existence of an UL control region over a number of symbols (or a number of symbols available for PUSCH transmission) can be included in a UE-specific DCI format scheduling a PUSCH transmission. Then, a main functionality for a DCI format A is to provide associated information to UEs without scheduled PDSCH transmissions in a slot or without scheduled PUSCH transmission in a slot or a subsequent slot, that is, to UEs that have no associated UE-specific DL DCI format or UL DCI format transmissions in a slot. Such information can be used, for example, for a UE to determine whether or not a slot, or subsequent slots in a number of slots, includes UL symbols to support transmission for previously configured CSI report on a PUCCH, or SRS transmission, or to puncture resources for a PDSCH reception in a previous slot or for a PUSCH transmission in a next slot, and so on.

Further, when a DCI format A includes an indication for a number of symbols, including fractional symbols, used for PDCCH transmissions in a slot, a UE can use this indication to determine a number of decoding operations to perform in the number of symbols in the slot. This is because, as is subsequently described, a number of decoding operations can depend on an actual number of symbols used for PDCCH transmissions in a slot and not on a (maximum) number of symbols configured by higher layer signaling for PDCCH transmissions in a slot.

Figure 14:
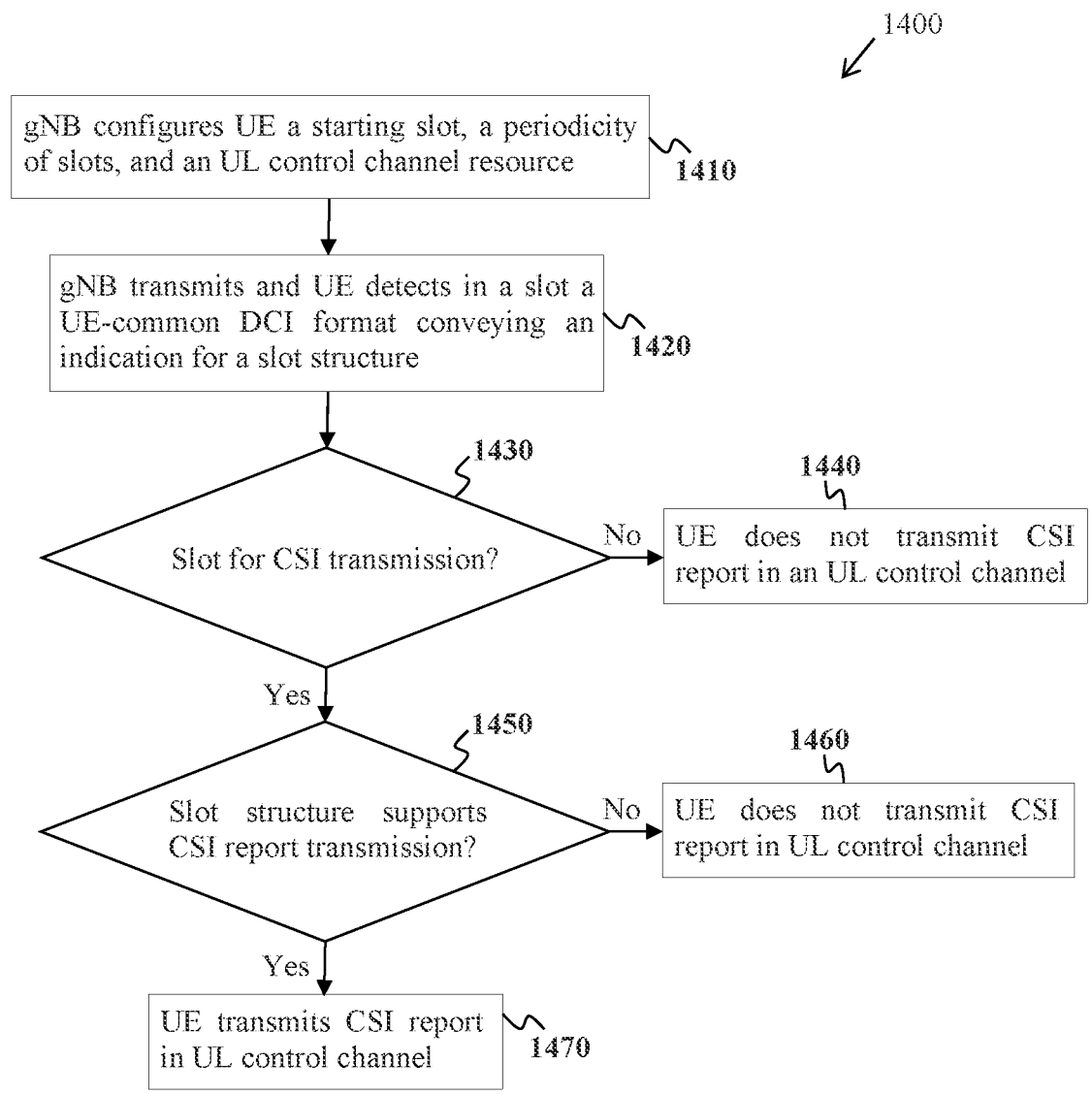
FIG. 14 illustrates an example process for a UE to transmit a CSI report in a PUCCH according to embodiments of the present disclosure.

FIG. 14 illustrates an example process 1400 for a UE to transmit a CSI report in a PUCCH according to embodiments of the present disclosure. An embodiment of the process 1400 for the UE to transmit CSI report in a PUCCH shown in FIG. 14 is for illustration only. Other embodiments may be used without departing from the scope of the present disclosure.

In step 1410, a gNB configures a UE, using higher layer signaling, a starting slot, a periodicity of slots, and a resource for a PUCCH transmission for the UE to transmit a signaling such as a CSI report. In step 1420, the gNB transmits and the UE detects in a slot a DCI format A indicating a slot structure (or subsequent slot structures over a number of slots). The DCI format A can indicate subsequent slot structures, by indicating a combination of slot structures over a number of slots, at least when a subsequent slot is a full UL slot or an UL-dominant slot. In step 1430, the UE examines whether or not the slot (or the subsequent slot) is a slot for CSI report transmission, as determined by the starting slot and the periodicity of slots, for CSI report transmission.

When the slot (or the subsequent slot) is not a slot for CSI report transmission from the UE, the UE does not transmit, in step 1440, a PUCCH conveying a CSI report. In step 1450, when the slot (or the subsequent slot) is a slot for CSI report transmission from the UE, the UE determines, based on information in DCI format A, whether or not the slot (or the subsequent slot) structure supports transmission of a CSI report in a PUCCH.

When the slot (or the subsequent slot) structure does not support transmission of a CSI report in a PUCCH (for example, the slot is a full DL slot), the UE does not transmit a CSI report in step 1460. When the slot (or the subsequent slot) supports transmission of a CSI report in a PUCCH (for example, the slot includes symbols for transmissions of PUCCHs), the UE transmits a CSI report in a PUCCH in step 1470. As a UE needs to know a slot structure for transmitting a periodic CSI report in a PUCCH, the UE does not transmit such signaling in a slot when the UE fails to detect DCI format A informing of the slot structure even when the slot is a slot where the UE is configured to transmit CSI reports. For example, a network can use the slot as a full DL slot. The above description regarding a (periodic or semi-persistent) CSI report transmission from a UE is also directly applicable for a (periodic or semi-persistent) SRS transmission or SR transmission.

Although the operation in FIG. 14 assumes that a UE does not transmit a preconfigured signal, such as a CSI-RS or an SRS, in a slot when the UE does not detect a DCI format A providing information about the slot structure, the UE behavior can also be configured by a gNB. For example, a gNB can configure a UE to either skip a transmission of a preconfigured signal when the UE does not detect a DCI format A or transmit the preconfigured signal. The former behavior can be beneficial when the gNB transmits the DCI format A in order to dynamically adapt a slot structure. The latter behavior can be beneficial, for example, to enable the gNB to not transmit the DCI format A in every slot where a UE is configured to decode DCI format A while the gNB can maintain the slot structure to be compatible with the preconfigured signal transmissions such as for example maintain as a DL symbol a symbol configured for CSI-RS transmissions or maintain as an UL symbol a symbol configured for SRS transmissions.

In some embodiments, a UE is configured for multi-slot scheduling of PDSCH transmissions or of PUSCH transmissions. A maximum number of slots, $N_{max,D}$, for multi-slot PDSCH scheduling or a maximum number of slots, $N_{max,U}$, for multi-slot PUSCH scheduling is configured in advance to a UE by a gNB through higher layer signaling or is predetermined in a system operation and a field with $\lceil \log_2(N_{max,D}) \rceil$ or with $\lceil \log_2(N_{max,U}) \rceil$ bits can be configured in a DL DCI format or in an UL DCI format, respectively, to indicate a number of slots for a PDSCH transmission or a PUSCH transmission.

When a slot structure can change per slot and a UE is configured with multi-slot scheduling for PDSCH transmissions, the UE needs to be informed of slots where CSI-RS is transmitted, the associated CSI process numbers, the associated CSI-RS locations for SCs or symbols, the null DL slots and, in case the number of slot symbols for PDCCH transmissions can vary per slot, including fractional slot symbols over a DL BW, of the time/frequency resources for PDCCH transmissions or, equivalently, for PDSCH transmissions. When a gNB transmits a DCI format A per DL slot, this information can be provided by DCI format A. When a gNB transmits a DCI format A with periodicity larger than one slot, this information can be provided by a DCI format scheduling the multi-slot PDSCH transmissions. Similar, a number of symbols or RBs for PDCCH transmissions in a slot can be obtained from DCI format A or can be provided by a DCI format scheduling the multi-slot PDSCH transmissions and can either be assumed to be same in all slots, or the indication in the DCI format can be applicable only for a first slot and time/frequency resources configured by higher layers for DL control resource sets can be assumed for PDCCH transmissions in remaining slots, or separate DL control resource fields can be included for each of the slots of the multi-slot PDSCH transmission. For example, when a DCI format scheduling a PDSCH transmission over two slots indicates to a UE that a PDSCH transmission in the first slot starts from a third symbol in a first BW part and from a first symbol in a second BW part and the UE is configured by higher layers the first two slot symbols for PDCCH transmissions in each BW part, the UE can assume that the PDSCH transmission in the second slot starts from the third symbol in each of the two BW parts.

In one example, CSI-RS transmissions are restricted to occur in at most one slot of the slots associated with a multi-slot PDSCH scheduling. Then, a CSI-RS slot offset field, $n_{offset}$, of $\lceil \log_2(N_{max,D}) \rceil$ bits can be included in a DCI format for multi-slot PDSCH scheduling to indicate a slot for CSI-RS transmission. The CSI process number, or the SCs or slot symbols for the CSI-RS transmission can also be indicated through respective field in the DCI format for multi-slot PDSCH scheduling. It is also possible to configure SCs and symbols for a CSI-RS transmission by higher layers by configuring an association of a CSI-RS configuration and a CSI process number.

In another example, a CSI-RS transmission can occur in an arbitrary number of slots associated with a multi-slot PDSCH scheduling. A DCI format scheduling the multi-slot PDSCH transmissions can include a bitmap indicating slots where CSI-RS is transmitted. A bitmap size is equal to $N_{max,D}$. A bitmap value of '0' indicates no CSI-RS transmission in a slot and a bitmap value of '1' indicates CSI-RS transmission in the slot. Similar, a field indicating a CSI process number or a field indicating slot symbols for a CSI-RS transmission can be expanded by a factor of $N_{max,D}$.

To avoid an overhead increase in a DCI format for multi-slot PDSCH scheduling, in case of more than one CSI-RS transmissions in the slots associated with a multi-slot PDSCH scheduling, the CSI process number can be implicitly derived from a single CSI process number indicated by the DCI format. For example, for $N_{CSI}$ CSI processes and an indicated $n_{CSI}$ CSI process number by the DCI format, a second CSI-RS transmission (when any) can be associated with CSI process $(n_{CSI}+1) \mod(N_{CSI})$, a third CSI-RS transmission (when any) can be associated with CSI process $(n_{CSI}+2) \mod(N_{CSI})$, and so on. The SCs or slot symbols used for CSI-RS transmission can be same for all CSI-RS transmissions in the slots associated with the multi-slot PDSCH scheduling or can be derived by a predetermined/configured mapping among CSI process numbers and respective CSI-RS configurations.

In some embodiments of multi-slot PUSCH transmissions, SRS transmissions or PUCCH transmissions can be informed in a similar manner as CSI-RS transmissions in case of multi-slot PDSCH scheduling and respective descriptions are not repeated for brevity.

In one example, a field indicating reserved, punctured, or null DL slots in each of the slots associated with multi-slot PDSCH scheduling can be included in a DCI format for multi-slot PDSCH transmissions. For example, a field of $N_{max,D}$ elements with each element including 2 bits and corresponding to each of $N_{max,D}$ slots can indicate 0, 1, 2, or 3 null DL slots after a slot of a PDSCH transmission or a field indicating null DL slots applies after a last slot of multi-slot PDSCH transmissions that are associated with consecutive DL slots.

In another example, for a mapping of PDSCH transmissions associated with multi-slot scheduling, a UE assumes that a maximum configured number of slot symbols per DL control resource set are used in each slot for PDCCH transmissions. In yet another example, for a mapping of PDSCH transmissions associated with multi-slot scheduling, a UE assumes that a same number of slot symbols, as in a slot where the UE detects a DCI format scheduling the multi-slot PDSCH transmissions, are used for PDCCH transmissions per DL control resource set in each slot. In yet another example, a field indicating a number of slot symbols for PDCCH transmissions per DL control resource set in each slot associated with multi-slot PDSCH scheduling can be included in a DCI format for multi-slot PDSCH transmissions. For example, a field of $N_{max,D}$ bits per DL control resource set, with each bit associated with a slot for multi-slot PDSCH scheduling, can indicate 1 or 2 slot symbols for PDCCH transmissions in a DL control resource set in a respective slot. In yet another example, a UE determines a number of slot symbols, including partial/fractional slot symbols over a DL BW, used for PDCCH transmissions in each slot based on DCI format A as described in the aforementioned embodiments of the present disclosure.

Figure 15:
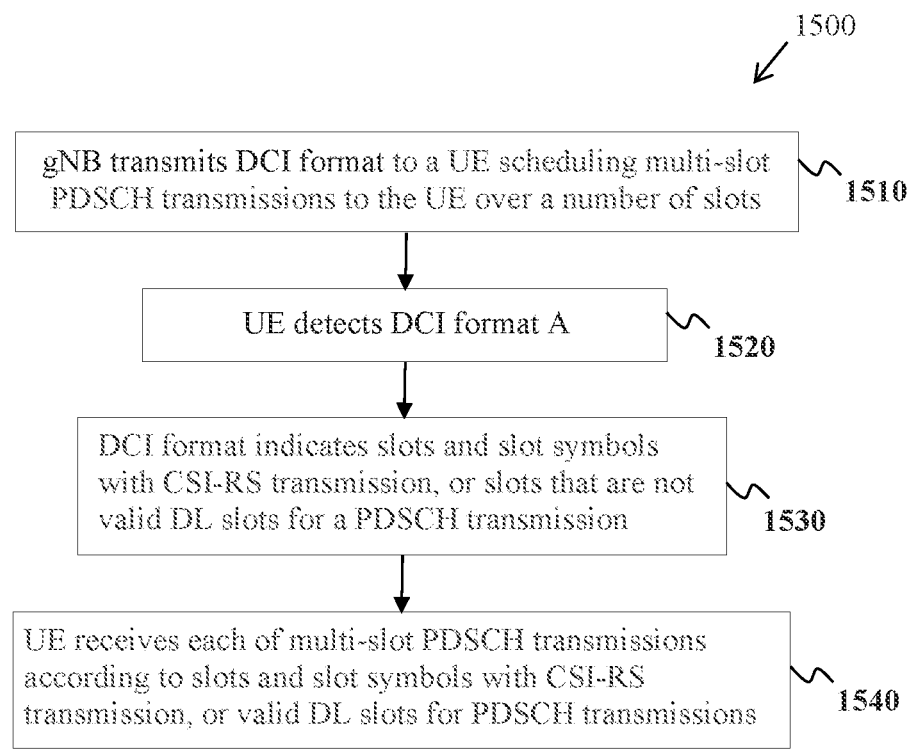
FIG. 15 illustrates an example process for signaling of information associated with multi-slot scheduling for PDSCH transmissions according to embodiments of the present disclosure.

FIG. 15 illustrates an example process 1500 for signaling of information associated with multi-slot scheduling for PDSCH transmissions according to embodiments of the present disclosure. An embodiment of the process 1500 for signaling of information associated with the multi-slot scheduling for the PDSCH transmissions shown in FIG. 15 is for illustration only. Other embodiments may be used without departing from the scope of the present disclosure.

A gNB transmits, in step 1510, to a UE a DCI format scheduling multi-slot PDSCH transmissions over a number of slots. The UE detects the DCI format in step 1520. In step 1530, the DCI format includes a field indicating slots, from the number of slots, and slot symbols in the slots where the gNB transmits CSI-RS, or the DCI format includes a field indicating slots, before the last slot from the number of slots, that are not valid DL slots for a PDSCH transmission, or indicating reserved time/frequency resources, or indicating punctured resources. The UE receives, in step 1540, each of the multi-slot PDSCH transmissions according to the information indicated by the fields of the DCI format.

A gNB scheduler can dynamically adapt slot utilization for different applications that can require different numerologies and have different characteristics. For example, a gNB can use some slots for multicast-broadcast traffic that can require slot symbols with longer CP length or longer duration than slot symbols of a slot used for unicast traffic. For example, a gNB can puncture PDSCH transmission in some slot symbols to accommodate scheduling of PDSCH transmissions requiring low scheduling latency. In general, it is beneficial to provide a gNB a capability to reserve some slots for different applications in a dynamic manner including for supporting forward compatibility when new applications requiring different numerologies can be introduced.

In one example, a gNB can inform a UE of subsequent null slots through a respective field in DCI format A as described in the first embodiment of this disclosure for the UE to skip DL receptions or UL transmissions in the null slots. This is also applicable for UL slots as a UE can turn off the RF and digital baseband components in an UL slot where the UE does not transmit.

In another example, a null DL slot field can be included in a DCI format scheduling a PDSCH transmission to a UE or a PUSCH transmission from the UE. This can also be beneficial in case different numerologies in a slot are supported in a FDM manner.

When a gNB multiplexes in a slot PDSCH transmissions conveying data TBs with low latency requirements (LL PDSCH) over a subset of slot symbols with other, normal latency, PDSCH transmissions (NL PDSCH) over slot symbols, the gNB can puncture NL PDSCH transmissions over the subset of slot symbols in order to avoid interference on LL PDSCH transmissions. As it was previously described, it is beneficial for the gNB to inform the puncturing to UEs receiving NL PDSCH transmissions in the slot as, otherwise, the UEs receive incorrect data symbols that can result to HARQ buffer corruption. Similar descriptions apply when a gNB schedules, in a slot, LL PUSCH transmissions over a subset of slot symbols with NL PUSCH over the slot symbols, although an objective is to avoid interference on the LL PUSCH transmission rather than HARQ buffer corruption, and are not repeated for brevity.

When LL PDSCH transmissions occur over a predetermined number of slot symbols, such as two symbols, at predetermined slot symbols locations, such as pairs of consecutive symbols, a gNB can indicate to UEs receiving NL PDSCHs in the slot one or more of the locations as punctured. For example, when a LL PDSCH transmission can occur over two slot symbols then, for 7 slot symbols and excluding a first slot symbol that can be used for PDCCH transmissions, a gNB can indicate to UEs that either the second and third slot symbols, or the fourth and fifth slot symbols, or the sixth and seventh slot symbols are punctured for respective NL PDSCH transmissions. Therefore, three states of a slot symbol puncturing field of 2 bits can indicate puncturing of NL PDSCH transmissions in one of three respective pairs of slot symbols with a fourth state indicating no puncturing. As it was previously described, it is also possible to indicate more than one pairs of slot symbols as punctured by increasing a number of bits for the slot symbol puncturing field or indicate a DL transmission (or an UL transmission) over a whole slot as punctured (regardless of whether or not the DL transmission is actually punctured over the whole slot).

Partial overlapping of LL PDSCH transmissions with NL PDSCH transmissions can also occur in a frequency domain and a RB puncturing field can also be introduced in a DCI format in a similar manner as for a time domain. A granularity can be per group of RBs where the group of RBs includes a predetermined number of consecutive RBs. However, as a number of RBs in a system BW is typically much larger than a number of slot symbols and as partial RB overlapping can be from one RB to all RBs in the system BW, an introduction of a RB puncturing field in a DCI format can also be avoided and a gNB can then decide whether an overlapping between LL PDSCH transmissions and NL PDSCH transmissions in a frequency domain is large enough in order for the gNB to indicate respective slot symbols as punctured for the latter PDSCH transmissions regardless of whether or not the puncturing occurs over for all RBs.

When a gNB does not determine scheduling of LL PDSCH transmissions over a subset of DL symbols in a slot prior to or simultaneously with scheduling of NL PDSCH transmissions over DL symbols in the slot, the gNB cannot indicate punctured slot symbols for NL PDSCH transmissions as such indication is typically not possible when scheduling of LL PDSCH transmissions occurs after scheduling of NL PDSCH transmissions. In general, as LL PDSCH transmissions need to have low latency, LL PDSCH transmissions can occur after the beginning of NL PDSCH transmissions. Then, the gNB cannot indicate punctured slot symbols in DCI formats scheduling respective NL PDSCH transmissions. Instead of a DCI format indicating punctured slot symbols, the DCI format can indicate only whether or not puncturing occurred in a previous slot and indicate the previous slot and, in such case, the UE can apply different processing for data receptions in symbols indicated as punctured, such as for example disregard all data symbols for the PDSCH reception in the previous slot for the HARQ process. Similar, the UE can ignore a CSI measurement when at least some of the resources used for a respective CSI-RS reception are indicated as punctured.

When a UE correctly detects data TBs conveyed by respective NL PDSCH transmissions, an indication of punctured slot symbols is immaterial. When a UE does not correctly detect data TBs conveyed by respective NL PDSCH transmissions, as it is likely since an effective code rate can approach or exceed one in addition to a corruption of presumed NL PDSCH data by LL PDSCH data, an indication of punctured slot symbols to the UE can be relative either to a last NL PDSCH transmission to the UE, or relative to a last NL PDSCH transmission for a same HARQ process to the UE, or by explicit indication of a slot where the puncturing occurred. Then, the UE can know punctured slot symbols for a previous NL PDSCH transmission to the UE and can decide to possibly discard from the HARQ buffer some or all of the data symbols that were received in punctured slot symbols or, for a simpler implementation, to possibly even discard all data symbols corresponding to the NL PDSCH transmission with punctured slot symbols.

An existence of a puncturing indicator field, as well as of other fields, in a DCI format A can be configurable. For example, when a network does not support puncturing of NL PDSCH transmissions to transmit LL PDSCH transmissions, for example because corresponding transmissions can be FDM, a puncturing indicator field is unnecessary. Conversely, when such puncturing can be expected to occur during a time period, a network can configure an existence for a puncturing indicator in a DCI format scheduling a PDSCH transmission. When a DCI format A is transmitted with a periodicity of P slots, DCI format A can include a puncturing indication of slot symbols for each of the previous P slots and include a respective set of P puncturing indicators.

Figure 16:
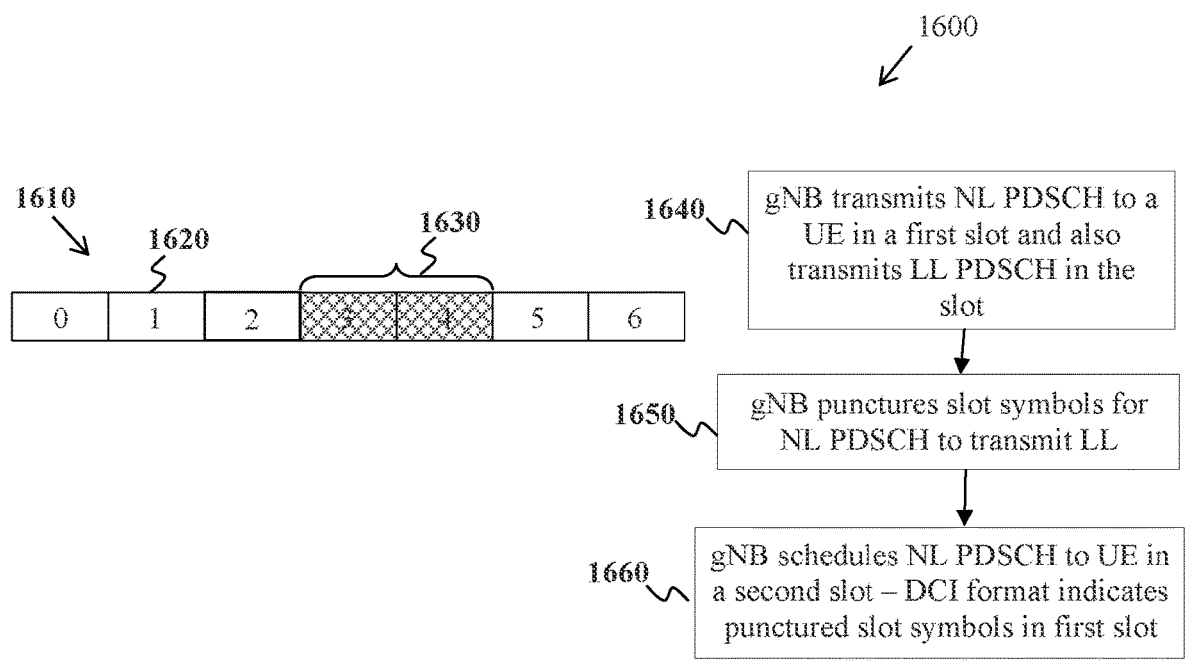
FIG. 16 illustrates an example process for an indication from a gNB to a UE of punctured slot symbols for a normal latency PDSCH (NL PDSCH) transmission according to embodiments of the present disclosure.

FIG. 16 illustrates an example process 1600 for an indication from a gNB to a UE of punctured slot symbols for a normal latency PDSCH (NL PDSCH) transmission according to embodiments of the present disclosure. An embodiment of the process 1600 for the indication from the gNB to the UE of punctured slot symbols for the normal latency NL PDSCH transmission shown in FIG. 16 is for illustration only. Other embodiments may be used without departing from the scope of the present disclosure.

A first slot 1610 includes 7 symbols 1620. Specifically, LL PDSCHs 1630 are transmitted in two slot symbols, and NL PDSCHs and PDCCHs are transmitted in remaining slot symbols. A gNB transmits, in step 1640, a NL PDSCH to a UE in a slot and also transmits LL PDSCHs. The gNB punctures, in step 1650, the NL PDSCH transmission in slot symbols where the gNB transmits LL PDSCHs. The gNB schedules, in step 1660, a NL PDSCH to the UE in a second slot, after the first slot, and in a respective DCI format, or in a DCI format A, the gNB indicates to the UE, through a punctured symbols indicator field, the first slot and the punctured symbols in the first slot. For example, in the second slot, the gNB can schedule a PDSCH transmission conveying data TBs for a same HARQ process as in the first slot.

An indication by a gNB to a UE for a number of slot symbols, including fractional slot symbols, for PDCCH transmissions in a slot is not necessary when the gNB configures UEs to decode PDCCH candidates that span each possible number of symbols, such as one slot symbol or two slot symbols for a maximum of two symbols for a PDCCH transmission. Extensions to more than two slot symbols, when applicable, can be in a similar manner and are not considered for brevity.

A gNB can configure a UE with a first number of PDCCH candidates per CCE aggregation level corresponding to PDCCH transmissions in the first slot symbol and with a second number of PDCCH candidates per CCE aggregation level corresponding to PDCCH transmissions in both the first and second slot symbols. It is also possible that the first number PDCCH candidates per CCE aggregation level and the second number of candidates per CCE aggregation level are predetermined in a system operation and are not configured by the gNB. For example, as a PDCCH transmission with a small CCE aggregation level, such as 2 CCEs, is likely to be fully accommodated in a first slot symbol for a DL control set duration, more respective PDCCH candidates can be configured for a first slot symbol than for both first and second slot symbols. Conversely, as a PDCCH transmission with a large CCE aggregation level, such as 8 CCEs, is less likely to be fully accommodated in a first slot symbol for a DL control set duration, more respective PDCCH candidates can be configured for PDCCH transmission in both first and second slot symbols.

It is also possible that a PDCCH transmission is always over a single slot symbol. This can be applicable, for example, for PDCCH transmissions in small cells where DL coverage limitations are unlikely to occur and few UEs are scheduled per slot, or for multi-beam operation where PDCCH transmissions can be from different beams in different slot symbols. In such cases, a gNB can configure a UE with a first number of PDCCH candidates per CCE aggregation level corresponding to PDCCH transmissions in the first slot symbol and with a second number of PDCCH candidates per CCE aggregation level corresponding to PDCCH transmissions in the second slot symbol.

A first DL control resource set for transmission in a first slot symbol can also be configured to occur with different periodicity than a second DL control resource set for transmission in a second slot symbol. For example, a first DL control resource set can be configured to occur every slot while a second DL control resource set can be configured to occur every five slots. A UE configured with $M_{L,1}$ PDCCH decoding candidates for CCE aggregation level L in the first DL control resource set and with $M_{L,2}$ PDCCH decoding candidates for CCE aggregation level L in the second DL control resource set can be assumed to be configured with $M_{L,1}+M_{L,2}$ PDCCH decoding candidates for CCE aggregation level L in the first DL control resource set in slots where the UE is not configured to receive PDCCH transmissions in the second DL control resource set. A functionality provided by a configuration for a number of PDCCH candidates for a UE to decode per number of slot symbols, such as over a first slot symbol or over first two slot symbols, can capture a functionality provided by a configuration of a total number of slot symbols for a UE to assume for a PDCCH transmission in a slot when a UE is scheduled a PDSCH reception. For example, configuring all PDCCH candidates for PDCCH transmissions over the first two slots symbols is equivalent to configuring the first two slot symbols for PDCCH transmissions without any partitioning of PDCCH candidates between ones for PDCCH transmissions over only the first slot symbol and ones for PDCCH transmissions over the first two slot symbols.

A configuration for a number of PDCCH candidates for a UE to decode per number of slot symbols provides additional flexibility for a gNB to dynamically adjust a number of slot symbols used for PDCCH transmissions by configuring a number of PDCCH candidates for each possible number, such as for the first slot symbol or for both the first and second slot symbols. For example, for each CCE aggregation level, a gNB can configure a UE to decode 0%, 33% 67%, or 100% of a predetermined (previously configured) number of PDCCH candidates for PDCCH transmissions only in the first slot symbol, with rounding up or down being applicable when 33% or 67% of the number of candidates is not an integer number (a UE can then use remaining PDCCH candidates assuming PDCCH transmissions in both first and second slot symbols).

As a use of the second slot symbol for PDCCH transmissions can be dynamic per slot, a UE scheduled a PDSCH transmission in a slot needs to be informed whether the PDSCH transmission starts at a second slot symbol or at a third slot symbol. This can be achieved either by implicit signaling or by explicit signaling.

Implicit signaling is possible when the PDSCH transmission BW fully overlaps with a BW that a UE is configured to receive PDCCH transmissions, a gNB transmits a PDCCH conveying a DCI format A in a slot, and a UE detects the PDCCH either only in a first slot symbol (when only the first slot symbol is used for PDCCH transmissions in the slot), or in both the first slot and second slot symbols (when both the first and second slot symbols are used for PDSCH transmissions in the slot) and then the UE accordingly determines a number of symbols used for PDCCH transmissions in a respective DL control resource set.

Explicit signaling can be supported by including a DL control resource indicator field in DCI format A or in a DCI format scheduling a PDSCH transmission as it was previously described. For example, for a PDSCH transmission over two BW parts and a PDCCH transmission in a first of the two BW parts, a DL control resource indicator field can be 2 bits with a value of '00' indicating that only a first BW part is used for PDCCH transmissions in a slot and values of '01', '10', and '11' respectively indicating that a second BW part uses 1, 2, or 3 slot symbols for PDCCH transmissions in the slot. A UE need not be aware that a second DL control resource set is configured for the second DL BW part. A UE can assume that a first symbol for PDSCH transmissions in a BW part in a slot is the first symbol after a last symbol for PDCCH transmissions in the BW part in the slot, similar to the LTE operation.

It is possible that a number of symbols assigned to a UE for PDCCH transmissions in a slot is configured to the UE by higher layer signaling and does not vary per slot although an actual number of symbols used for PDCCH transmissions in a slot can vary per slot. For example, higher layer signaling can configure a UE to assume two symbols per slot for PDCCH transmissions while an actual number of symbols used for PDCCH transmissions in a slot can be either one or two full symbols or fractional one or two symbols. Then, a field in a DCI format A that indicates a number of symbols used for PDCCH transmissions in a BW part in a slot, or equivalently indicate a first symbol for PDSCH transmissions in the BW part in the slot, can be used by a UE to determine a number of PDCCH decoding operations the UE needs to perform in the slot.

For example, when a DL control resource indicator field in DCI format A indicates that one symbol is used for PDCCH transmissions at a BW part for a respective DL control resource set in a slot, a UE does not need to perform decoding operations for PDCCH candidates with CCEs located in both symbols of the slot or in the second symbol of the slot. Similar, when the field in DCI format A indicates that both symbols (configured by higher layer signaling to the UE) are used for PDCCH transmissions at the BW part in a slot, the UE needs to perform decoding operations for all PDCCH candidates that can be located in a first symbol, a second symbol, or in both a first symbol and a second symbol in the slot.

In some embodiments, a field in DCI format A can indicate a partition of a number of PDCCH decoding operations that a UE needs to perform in a slot. For example, for a maximum number of three symbols for a DL control resource set duration, a field in DCI format A can indicate a percentage of the PDCCH decoding operations per CCE aggregation level for a UE to perform assuming PDCCH transmissions only in the first symbol, or both in the first and second symbols, or in all three symbols.

For example, for a DCI format A field that includes two bits and for percentages of PDCCH decoding operations in [only the first symbol, both first and second symbols, and all three symbols], a value of '00' can map to [100%, 0%, 0%] for a partitioning of PDCCH decoding operations per CCE aggregation level, a value of '01' can map to [66%, 33%. 0%], a value of '10' can map to [33%, 34%, 33%], and a value of '1' can map to [20%, 40/6, 40%] where an actual number of PDCCH decoding operations per CCE aggregation level is rounded after scaling with a percentage value to the lower next integer.

In some embodiments, a field in DCI format A can indicate a scaling for a number of decoding operations a UE needs to perform for PDCCH transmissions per DL control resource set in a slot for a number of slots corresponding to the DCI format A transmission periodicity. For example, for a field that includes two bits and for a UE configured to perform $M_L$ decoding operations for PDCCH candidates transmitted with an aggregation level of L CCEs in a DL control resource set, field values of '00', '01', '10', or '11' can respectively indicate to a UE to perform $\lfloor M_L/4 \rfloor$, $\lfloor M_L/2 \rfloor$, $\lfloor 3 \cdot M_L/4 \rfloor$, or $M_L$ (or $\lfloor M_L/4 \rfloor$, $\lfloor M_L/2 \rfloor$, $\lfloor 3 \cdot M_L/4 \rfloor$, or $M_L$) decoding operations in the DL control resource set in the slot. For example, field values of '00', '01', '10', or '11' can respectively indicate to a UE to perform 0, $\lfloor M_L/3 \rfloor$, $\lfloor 2 \cdot M_L/3 \rfloor$, or $M_L$ decoding operations in the DL control resource set in the slot. When DCI format A is transmitted only in one DL control resource set, an indication for a scaling for a number of PDCCH decoding operations per CCE aggregation level is applicable to all DL control resource sets that a UE is configured by a gNB. When a UE fails to detect DCI format A, the UE performs all $M_L$ decoding operations in the DL control resource set.

In some embodiments, a field in DCI format A can indicate CCE aggregation levels of PDCCH transmissions for a UE to decode in a slot. For example, for a field that includes two bits and for a UE configured to perform decoding operations of PDCCH transmissions for four CCE aggregation levels in a DL control resource set, assumed to be indexed according to a respective number of CCEs, field values of '00', '01', '10', or '11' can respectively indicate to a UE to perform decoding operations for only the first two CCE aggregation levels, for only the last two CCE aggregation levels, for only the middle two CCE aggregation levels, or for all four CCE aggregation levels.

Figure 17:
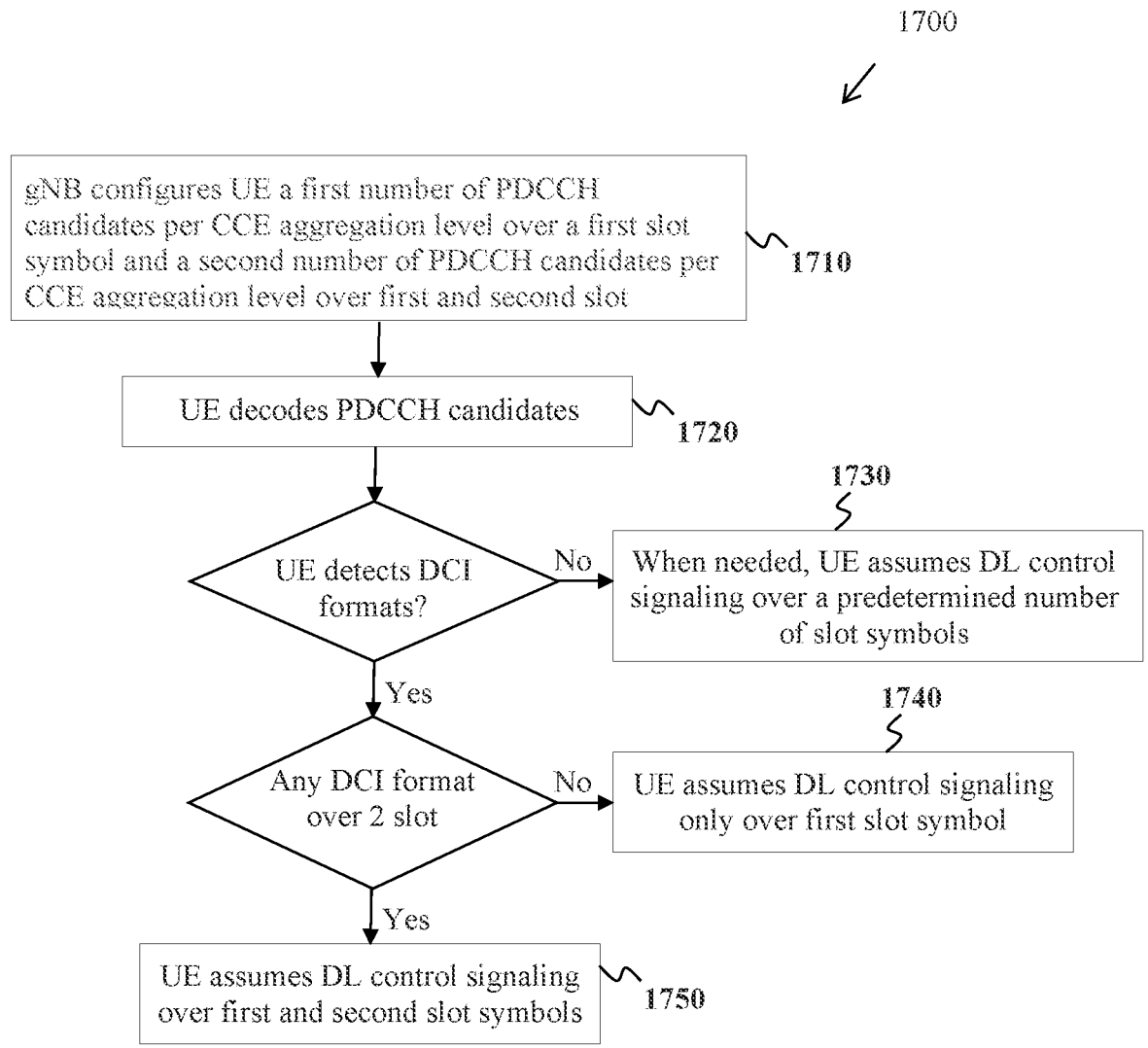
FIG. 17 illustrates an example process for determining a number of slot symbols used for PDCCH transmissions in a slot according to embodiments of the present disclosure.

FIG. 17 illustrates an example process 1700 for determining a number of slot symbols used for PDCCH transmissions in a slot according to embodiments of the present disclosure. An embodiment of the process 1700 for determining a number of slot symbols used for PDCCH transmissions in the slot shown in FIG. 17 is for illustration only. Other embodiments may be used without departing from the scope of the present disclosure.

A gNB, in step 1710, configures by higher layers a UE with a first number of PDCCH candidates per CCE aggregation level for PDCCH transmission over a first slot symbol and with a second number of PDCCH candidates per CCE aggregation level for PDCCH transmission over a first and second slot symbols.

For example, the configuration can be by allocating a percentage for a total number of candidates per CCE aggregation level for PDCCH transmissions over the first slot symbol while a total number of candidates per CCE aggregation level can be either predetermined in a system operation or can be also configured by the gNB to the UE by higher layer signaling where the configuration can further be per DCI format that the UE is configured to decode. The UE decodes, at step 1720, PDCCH candidates in a slot.

When the UE, in step 1730, does not successfully detect any DCI format in the slot, the UE can assume that all symbols of the respective DL control resource set are used for PDCCH transmissions. When the UE successfully detects one or more DCI formats in the slot, the UE considers whether respective PDCCH candidates correspond to PDCCH transmissions over both the first and second slot symbols. When the respective PDCCH candidates do not correspond to PDCCH transmissions over both the first and second slot symbols, the UE assumes that PDCCH transmissions are over only the first slot symbol in step 1740. When the respective PDCCH candidates correspond to PDCCH transmissions over both the first and second slot symbols, the UE assumes in step 1750 that PDCCH transmissions are over the first and second slot symbols, that is, the UE assumes that a respective DL control resource set occupies two symbols in the slot.

Figure 18:
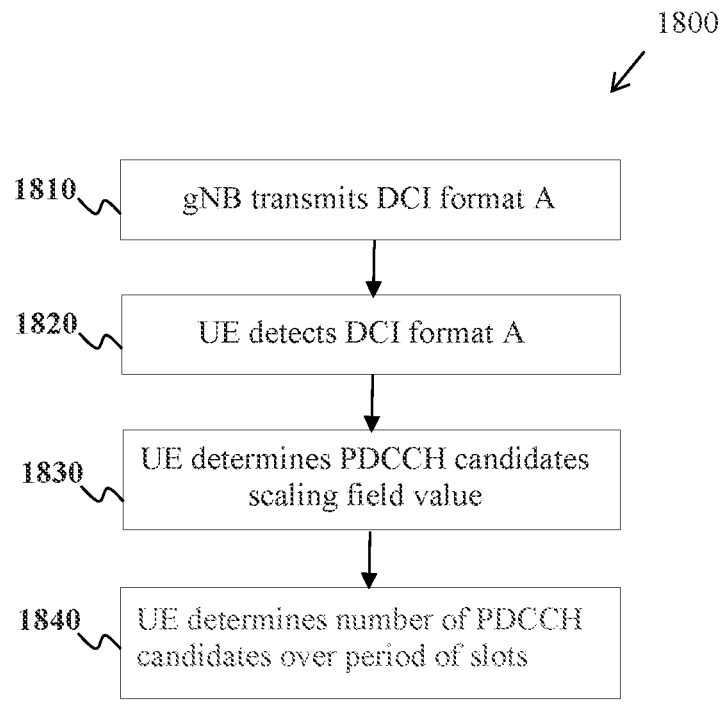
FIG. 18 illustrates an example process for a UE to determine a number of PDCCH candidates over a period of slots based on a DCI format A according to embodiments of the present disclosure.

FIG. 18 illustrates an example process 1800 for a UE to determine a number of PDCCH candidates over a period of slots based on a format A according to embodiments of the present disclosure. An embodiment of the process 1800 for determining a number of PDCCH candidates over a period of slot based on a DCI format A shown in FIG. 18 is for illustration only. Other embodiments may be used without departing from the scope of the present disclosure.

A gNB transmits, in step 1810, a DCI format A in a slot over a period of slots. A UE detects the DCI format A in step 1820. The UE determines a value for a PDCCH candidate scaling field 1830. Based on the value, the UE determines, in step 1840, a number of PDCCH candidates (per CCE aggregation level L) for decoding operations over the period of slots.

To facilitate multiplexing of PDCCH and PDSCH transmissions in a same slot symbol, a REG can be same as a RB. For example, for an RB that includes 12 SCs, a REG can include same 12 SCs where 8 SCs {0, 1, 3, 4, 6, 7, 9, 10} can be used for DCI transmission and 4 SCs {2, 5, 8, 11} can be used for DMRS transmission. Then, whenever a slot symbol is partly occupied by PDCCH transmissions, remaining RBs in the slot symbol can be allocated to PDSCH transmissions such as for example LL PDSCH transmissions or, in general, PDSCH transmissions of small data TBs requiring a few RBs over a slot, or to PDSCH transmissions over multiple slot symbols.

For example, to determine a first slot symbol where a RB is available for a PDSCH transmission, a DCI format scheduling the PDSCH transmission can include a "PDSCH starting symbol" field. For example, even when PDCCH transmissions are configured to span the first two slot symbols, a PDSCH transmission at a BW part can still start from the first slot symbol when respective RBs are not used for PDCCH transmissions, such as for localized PDCCH transmissions in the DL control resource set, and the "PDSCH starting symbol" field can include one bit for each BW part where a PDSCH transmission starts from the first slot symbol when a binary value of the field is '0' or from the third slot symbol when a binary value of the field is '1'. It is also possible to include such information in a DCI format A as it was previously described.

Figure 19:
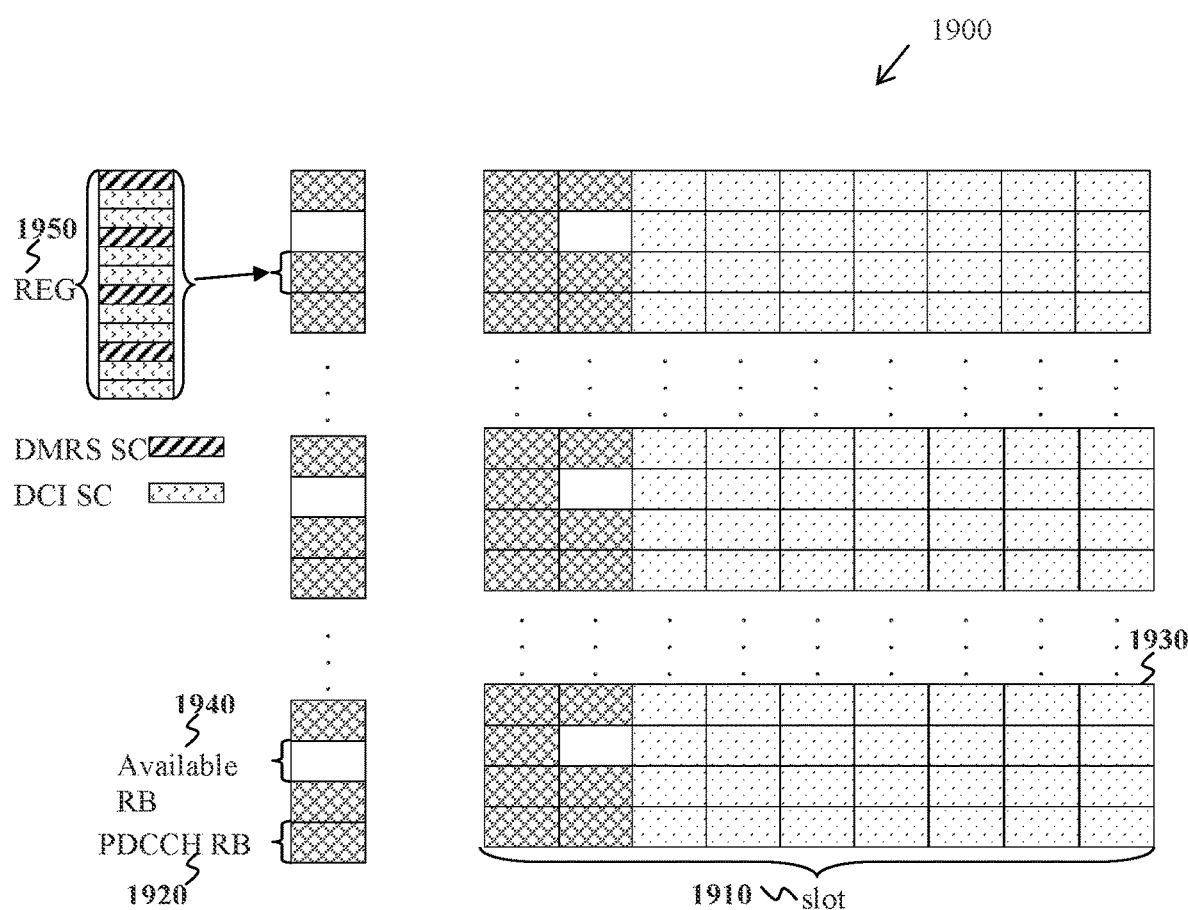
FIG. 19 illustrates an example allocation of RBs over a BW and of symbols during a slot for PDCCH transmissions and for PDSCH transmissions according to embodiments of the present disclosure.

FIG. 19 illustrates an example allocation of RBs 1900 over a BW and of symbols during a slot for PDCCH transmissions and for PDSCH transmissions according to embodiments of the present disclosure. An embodiment of the allocation of the RBs 1900 over the BW and of symbols during the slot for PDCCH transmissions and for PDSCH transmissions shown in FIG. 19 is for illustration only. Other embodiments may be used without departing from the scope of the present disclosure.

A slot 1910 includes RBs for PDCCH transmissions 1920 and PDSCH transmissions 1930 in respective slot symbols. A second slot symbol is partially occupied by PDCCH transmission where one RB out of four RBs remains available 1940. For example, there are two DL control resource sets, a first DL control resource set spans two symbols in the slot, a second DL control resource set spans one symbol in the slot, and the first DL control resource sets spans a BW that is three times larger than a BW of the second DL control resource set. A RB includes 12 SCs. A REG includes same 12 SCs as a RB where 4 SCs are used to transmit DMRS and 8 SCs are used to transmit DCI. The available RBs in the second slot symbol can be allocated to PDSCH transmissions and a "DL control resource indicator" field in respective DCI formats or in DCI format A can indicate whether or not a PDSCH transmission in a DL control resource set starts at a respective BW part from the second slot symbol or the third slot symbol. Even though the first slot symbol is shown as fully occupied by PDCCH transmissions, depending on how REGs are interleaved, available RBs can also exist in the first slot symbol and a size for the "DL control resource indicator" field can indicate RBs in every slot symbol.

Further, even though an allocation of RBs in fractional slot symbols used for PDCCH transmissions is uniform over a DL system BW, the allocation can be of consecutive RBs that start either from a first RB, or from a last RB, or are in a middle of the RBs of a DL system BW that is used for PDCCH transmissions in previous symbols of the slot.

A UE is typically scheduled only in few of the slots where the UE decodes PDCCH. As a consequence, UE power consumption for PDCCH decoding operations is often unnecessary. Particularly for operation in large carrier frequencies, in the range of several GHz, UE power consumption can be significant when a UE receives PDCCH over a large BW. For example, a significant source of UE power consumption can be the analog-to-digital converter (ADC). To reduce UE power consumption, the UE can be configured to decode PDCCH over a localized BW that can be materially smaller than a system BW. However, such restriction is detrimental to PDSCH transmissions as it can result to wasted BW and degraded system throughput. Therefore, upon detecting a DCI format in a PDCCH transmission that schedules a PDSCH transmission over a different BW than the BW where the PDCCH transmission is received, a UE needs to retune the UE's RF frequency to the BW of the scheduled PDSCH transmission. RF retuning is not instantaneous and typically requires a one or more slot symbols depending on the slot symbol duration and the retuning frequency band.

In some embodiments, in order to provide to a UE a time for RF retuning without compromising a spectral efficiency for a system operation, slot symbols used for PDCCH transmissions conveying DL DCI formats are located prior to slot symbols used for PDCCH transmissions conveying UL DCI formats. For example, a gNB can configure a UE a first DL control resource set in first slot symbols for PDCCH transmissions conveying DL DCI formats and a second DL control resource set in second slot symbols, after the first slot symbols, for PDCCH transmissions conveying UL DCI formats. When PDSCH transmissions follow after the PDCCH transmissions in next slot symbols, a UE that is scheduled to receive a PDSCH transmission can perform RF retuning, when needed, during the one or more slot symbols used to transmit PDCCH conveying UL DCI formats.

When PUSCH transmissions follow after PDCCH transmissions in next slot symbols, such as for a TDD system and a hybrid slot structure, a UE that is scheduled to transmit a PUSCH transmission can perform RF retuning, when needed, during one or more gap symbols placed between the slot symbols used for PDCCH transmissions and the slot symbols used for PUSCH transmission and are intended to provide to the UE a time for switching from receiving PDCCH to transmitting PUSCH.

Figure 20:
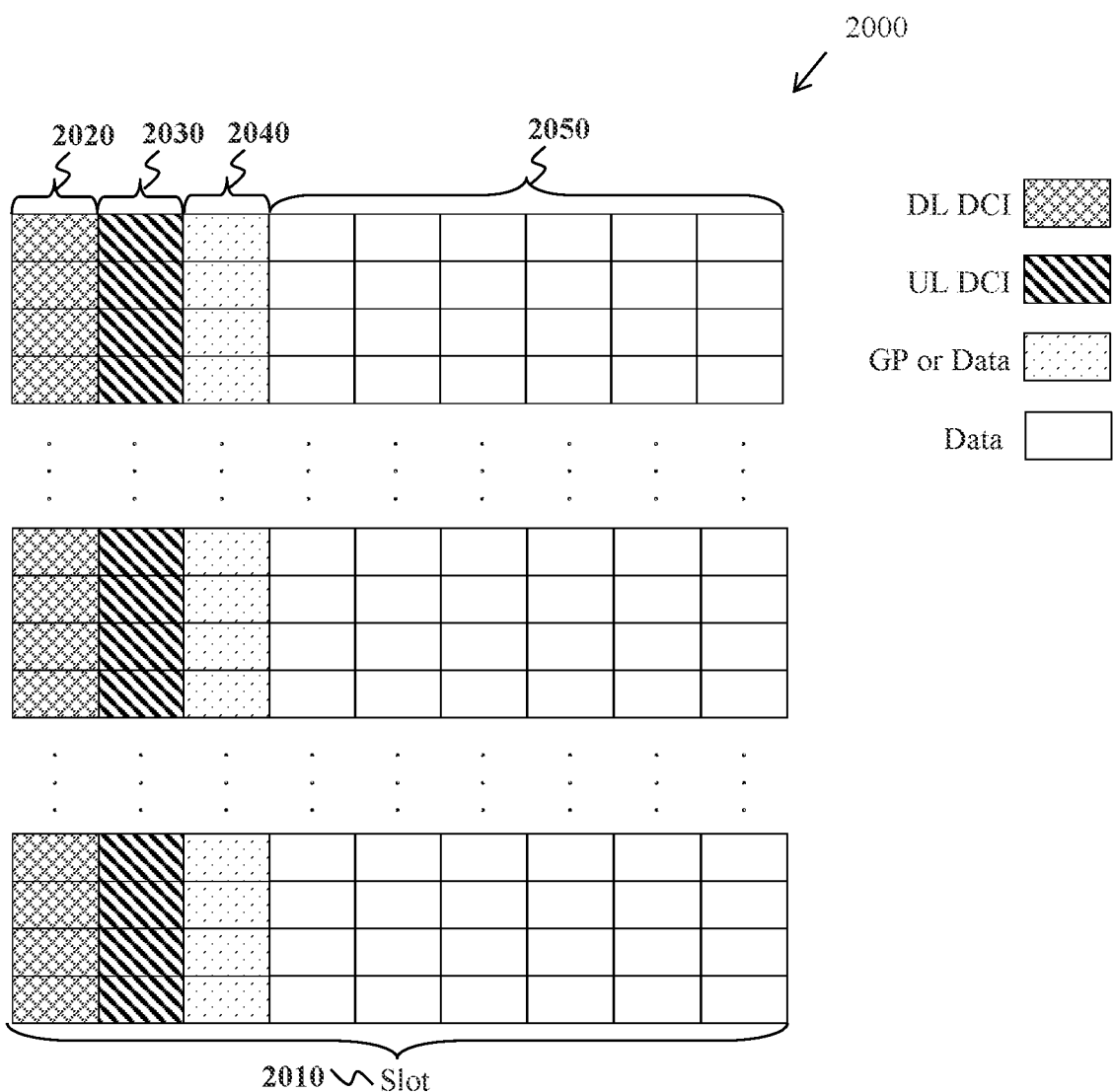
FIG. 20 illustrates an example location of PDCCH transmissions conveying DL DCI formats and a location of PDCCH transmission conveying UL DCI formats according to embodiments of the present disclosure.

FIG. 20 illustrates an example location of PDCCH transmissions 2000 conveying DL DCI formats and a location of PDCCH transmission conveying UL DCI formats according to embodiments of the present disclosure. An embodiment of the location of PDCCH transmissions 2000 conveying DL DCI formats and the location of PDCCH transmission conveying UL DCI formats shown in FIG. 20 is for illustration only. Other embodiments may be used without departing from the scope of the present disclosure.

A slot 2010 includes a number of symbols for PDCCH transmissions and PDSCH or PUSCH transmissions over a BW. A first UE and a second UE can be configured by a gNB to decode PDCCH transmissions over different parts of the BW. PDCCH transmissions conveying DL DCI formats are configured to be in a first DL control resource set located in a first slot symbol 2020. PDCCH transmissions conveying UL DCI formats are configured to be in a second DL control resource set located in a second slot symbol 2030. A third slot symbol 2040 can be used for PDSCH transmissions when a next slot symbol is used for PDSCH transmissions or as a GP when a next slot symbol is used for PUSCH transmissions. Remaining slot symbols 2050 can be used either for PDSCH transmissions or for PUSCH transmissions.

Additional signaling can be included in the slot symbols, such as PUCCH or CSI-RS, but are not material to the functionality in FIG. 20 and respective descriptions are omitted for brevity.

In some embodiments, in order to provide to a UE a time for RF retuning without compromising a spectral efficiency for a system operation, a DL DCI format can schedule a PDSCH transmission in a next slot. In a first approach, the DL DCI format can include a field indicating a slot offset for an associated PDSCH transmission. For example, the DL DCI format conveyed by a PDCCH can include a "PDSCH slot offset" field of 2 bits where a '00' value indicates PDSCH transmission in a same slot as the PDCCH transmission and '01', '10', or '1' values respectively indicates PDSCH transmission one slot, two slots, or three slots after the slot of the PDCCH transmission conveying the DL DCI format.

In some embodiments, in order to provide to a UE a time for RF retuning without compromising a spectral efficiency for a system operation, a slot symbol immediately after a last slot symbol used for PDCCH transmissions can be a GP symbol for the UE followed by one or more symbols used for PUCCH transmissions prior to remaining slot symbols used for PDSCH transmissions. UEs with scheduled PDSCH transmissions can drop potential PUCCH transmissions, when any.

Figure 21:
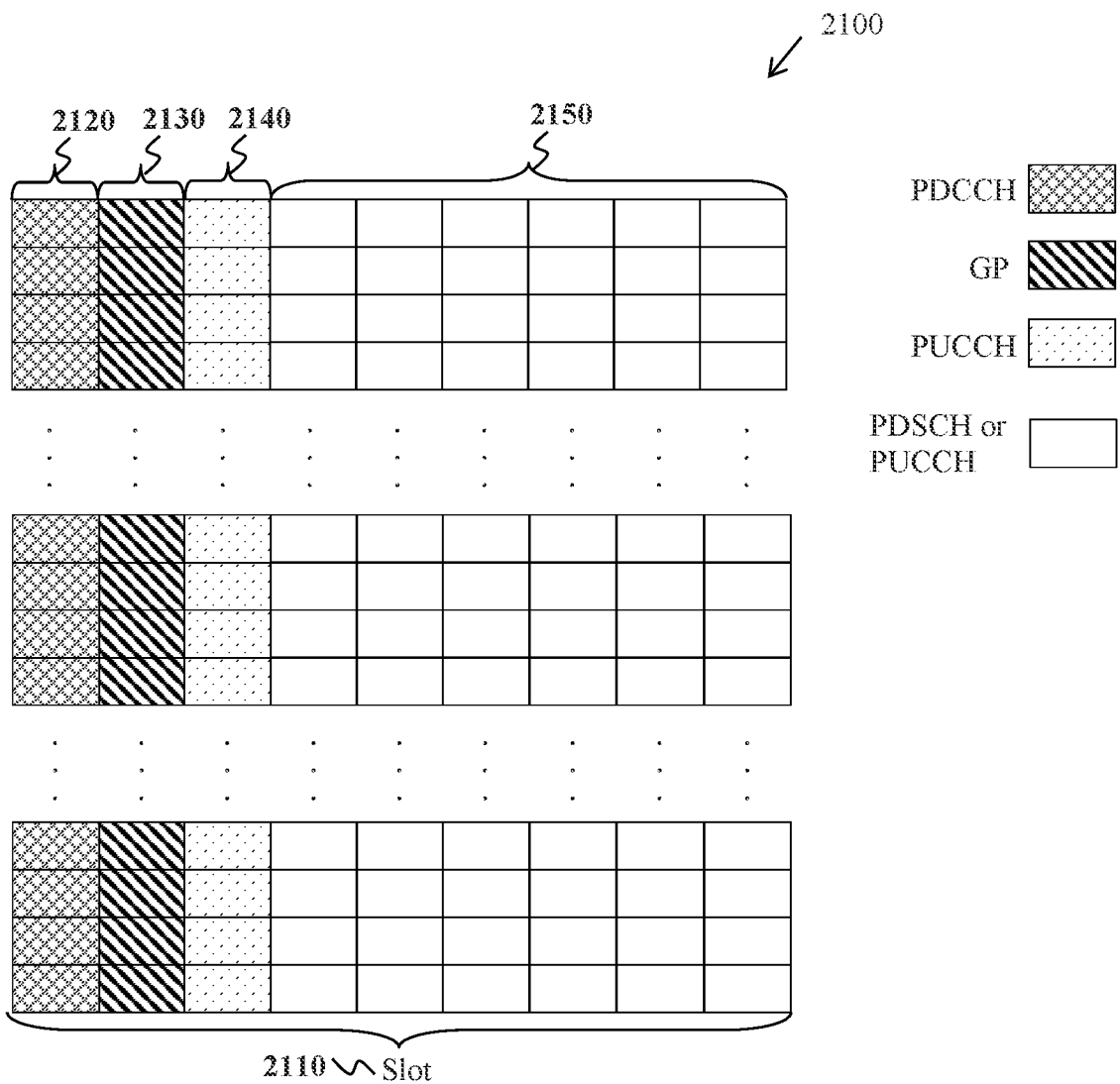
FIG. 21 illustrates an example slot structure enabling a UE to perform RF retuning according to embodiments of the present disclosure.

FIG. 21 illustrates an example slot structure 2100 enabling a UE to perform RF retuning according to embodiments of the present disclosure. An embodiment of the slot structure 2100 enabling the UE to perform RF retuning shown in FIG. 21 is for illustration only. Other embodiments may be used without departing from the scope of the present disclosure.

A slot 2110 includes a number of symbols over a BW. PDCCH transmissions are located in a first slot symbol 2120. A first UE and a second UE can be configured by a gNB to decode PDCCH transmissions over different parts of the BW. A second slot symbol can be used to provide a GP 2130. A third slot symbol can be used for PUCCH transmissions 2140. Remaining slot symbols can be used for PDSCH transmissions or for PUSCH transmissions 2150. Additional signaling can be included in the slot symbols, such as CSI-RS, but are not material to the functionality in FIG. 21 and respective descriptions are omitted for brevity.

In some embodiments, scheduling of PDSCH transmissions over a DL system BW is for a UE that is configured by a gNB to decode PDCCH transmissions over a localized BW in the DL system BW. One approach to provide the UE with sufficient time to retune the UE's reception BW from a localized BW, that can include one or more sub-bands of respective one or more DL control resource sets as is subsequently described, for receiving PDCCH transmissions to a different BW for receiving PDSCH transmissions, is for the gNB to apply cross-slot scheduling. With cross-slot scheduling, the gNB indicates to the UE through a field in a DCI format transmitted through a PDCCH in a slot that a transmission of an associated PDSCH is to occur in a subsequent slot relative to the slot of the PDCCH transmission.

Although cross-slot scheduling for PDSCH transmissions can provide a UE with sufficient time to retune from sub-bands for PDCCH reception to a different or wider BW for PDSCH reception, it also increases a time required for the UE to report HARQ-ACK information for received data TBs. Consequently, the UE needs to support a larger number of HARQ processes in order to support peak data rates and this increases data buffering requirements at the UE leading to increased UE cost. For example, when a UE requires one slot to process data TBs in a PDSCH and generate associated HARQ-ACK information, the UE needs to support four HARQ processes in case of cross-scheduling over one slot (and more than four HARQ processes in case of cross-scheduling over more than one slot). Conversely, for same slot scheduling, the UE needs to support only two HARQ processes.

Figure 22:
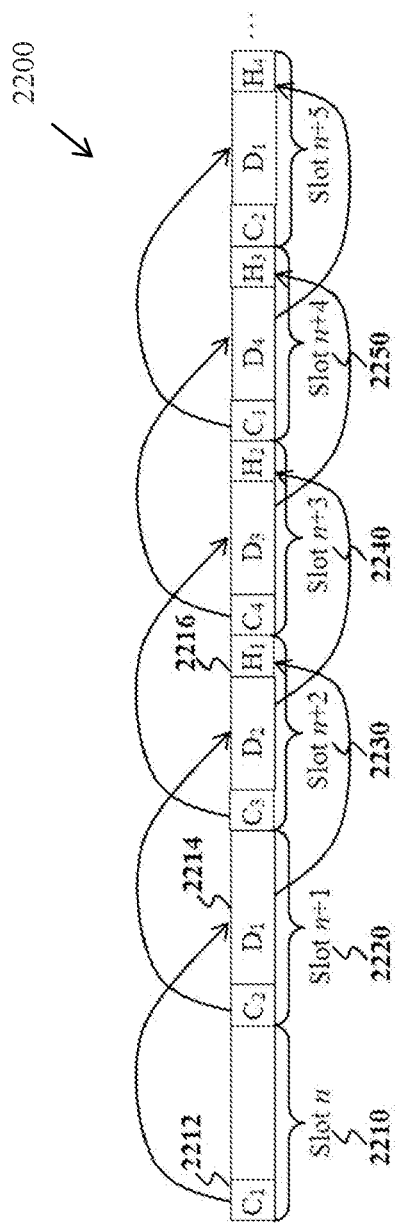
FIG. 22 illustrates an example PDCCH transmission in a slot that schedules a PDSCH transmission in a next slot while enabling a UE to perform BW retuning for receiving the PDSCH according to embodiments of the present disclosure.

FIG. 22 illustrates an example PDCCH transmission 2200 in a slot that schedules a PDSCH transmission in a next slot while enabling a UE to perform BW retuning for receiving the PDSCH according to embodiments of the present disclosure. An embodiment of the PDCCH transmission 2200 in a slot that schedules a PDSCH transmission in a next slot while enabling a UE to perform BW retuning for receiving the PDSCH shown in FIG. 22 is for illustration only. Other embodiments may be used without departing from the scope of the present disclosure.

As shown in FIG. 22, in slot n 2210, a gNB transmits to a UE a PDCCH $C_1$ 2212 conveying a DCI format that schedules a PDSCH transmission $D_1$ 2214 to the UE in slot n+1 2220. The PDSCH is associated with a first HARQ process. Assuming that the UE requires a processing time of one slot to decode a received PDSCH and transmit associated HARQ-ACK information, the UE transmits a PUCCH $H_1$ 2216 conveying HARQ-ACK information in response to the reception of PDSCH $D_1$ in slot n+2 2230. Assuming that the gNB requires one slot processing time to decode a received HARQ-ACK information and schedule a PDSCH transmission to the UE, the gNB schedules a new transmission or a retransmission for the data TBs associated with the first HARQ process in slot n+4 2250. A minimum of four HARQ processes are required and scheduling timelines for other HARQ processes can be as for the first HARQ process. A gap period (not shown for clarity purposes) for DL-to-UL switching can also exist between DL transmissions and UL transmissions.

To reduce a number of HARQ processes that a UE needs to support when the UE is capable for fast processing of DL data TBs, a slot location for symbols used for HARQ-ACK transmissions can be after the slot location for symbols used for PDCCH transmissions. A minimum processing time available to the UE to decode DL data and transmit an associated HARQ-ACK can be equal to a time corresponding to a minimum number of slot symbols used for PDCCH transmissions, such as one slot symbol, and a time corresponding to a minimum GP duration, such as one slot symbol. To increase a processing time available to the UE, additional slot symbols after the GP symbol can be configured for other UL transmissions, such as for SRS or for CSI reports. A processing time available to the gNB to process the HARQ-ACK information from the UE and schedule a new transmission or a retransmission for a same HARQ process to the UE is equal to a number of slot symbols excluding ones used for PDCCH transmissions, GP, and UL transmissions.

Figure 23:
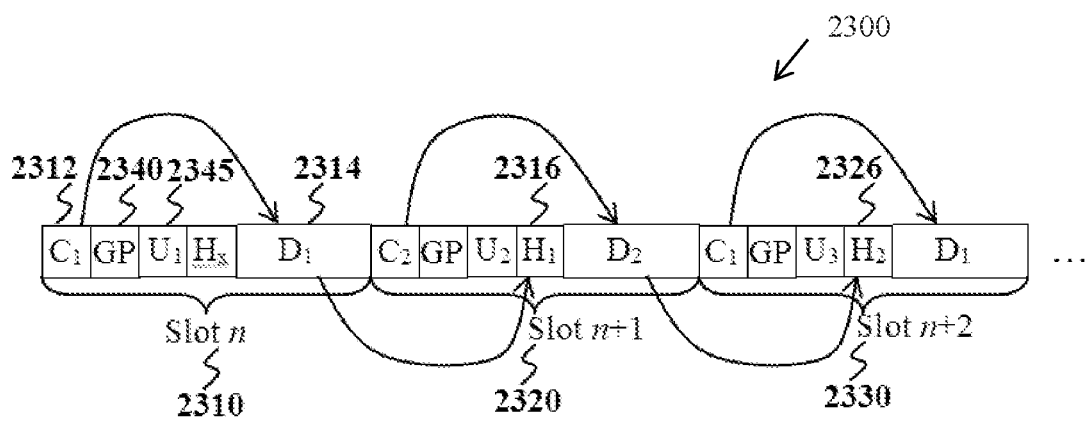
FIG. 23 illustrates an example PDCCH transmission in a slot that schedules a PDSCH transmission in a same slot by locating UL transmissions prior to PDSCH transmissions for enabling a UE to perform BW retuning according to embodiments of the present disclosure.

FIG. 23 illustrates an example PDCCH 2300 transmission in a slot that schedules a PDSCH transmission in a same slot by locating UL transmissions prior to PDSCH transmissions for enabling a UE to perform BW retuning according to embodiments of the present disclosure. An embodiment of the PDCCH 2300 transmitted in the slot scheduling the PDSCH transmission in the same slot by locating UL transmissions prior to PDSCH transmissions for enabling the UE to perform BW retuning shown in FIG. 23 is for illustration only. Other embodiments may be used without departing from the scope of the present disclosure.

In slot n 2310, a gNB transmits to a UE a PDCCH $C_1$ 2312 conveying a DCI format that schedules a transmission of a PDSCH $D_1$ 2314 to the UE. A data TB in the PDSCH $D_1$ is associated with a first HARQ process. In slot n+1 2320, the gNB transmits to the UE a PDCCH $C_2$ 2322 conveying a DCI format that schedules a transmission of a PDSCH $D_2$ 2324 to the UE. A data TB in the DL data $D_2$ is associated with a second HARQ process. In slot n+1, the UE transmits HARQ-ACK information a PUCCH $H_1$ 2316 in response to the reception (when any) of the data TB in the PDSCH $D_1$ in slot n. In slot n+2 2330, the UE transmits HARQ-ACK information in a PUCCH Hz 2326 in response to the reception (when any) of the data TB in the DL data $D_2$ in slot n+1. In each slot, a GP 2340 is placed between PDCCH transmissions from the gNB and PUCCHs for HARQ-ACK transmissions from UEs and, in order to provide the UE with additional processing time to transmit HARQ-ACK, one or more slot symbols after GP ones can be used for other UL transmissions such as for PUCCH conveying CSI or SR or for SRS 2345. With the slot structure and the processing time in FIG. 23, a number of HARQ processes are reduced to two (relative to the four HARQ processes in FIG. 22). It is also possible to use a slot structure as in FIG. 23 for scheduling UL data transmissions instead of DL data transmissions.

For unpaired spectrum operation such as for a TDD system or, in general, for flexible duplex operation, it is beneficial to avoid a UE retuning delay between a BW for HARQ-ACK transmission, on in general for UCI transmission, in a PUCCH and a BW for DCI format reception in a PDCCH. To achieve this objective, a UE needs to tune on a BW that includes both the PUCCH transmission BW and the PDCCH reception BW. In order to minimize a combined BW, it is beneficial for a gNB to configure the UE with a BW for PUCCH transmissions that is a subset of a BW for PDCCH receptions or the reverse. This can enable a UE that does not receive data in a slot of a PDCCH transmission to the UE to retune to the combined BW of the PUCCH transmission BW in a previous slot and the PDCCH transmission BW in the slot. When a BW of DL control resource sets configured to a UE hops over a system BW, a BW configured to the UE for PUCCH or SRS transmissions also hops according to a same pattern as for the BW of the DL control resource sets either prior or after the hopping of the BW of the DL control resource sets.

In one example for enabling a UE to retune from a first DL BW configured for receiving PDCCH transmission to a second DL BW configured for receiving other DL channels or signals, such as PDSCH transmissions, is for a gNB to use only the DL BW that is common between the first DL BW and the second DL BW for a PDSCH transmission to the UE in a second slot symbol after a first slot symbol that is used for PDCCH transmissions. This also requires that DMRS associated with DL data demodulation is not located in the second slot symbol and can instead be located, for example, in a third slot symbol immediately after the second slot symbol.

Figure 24:
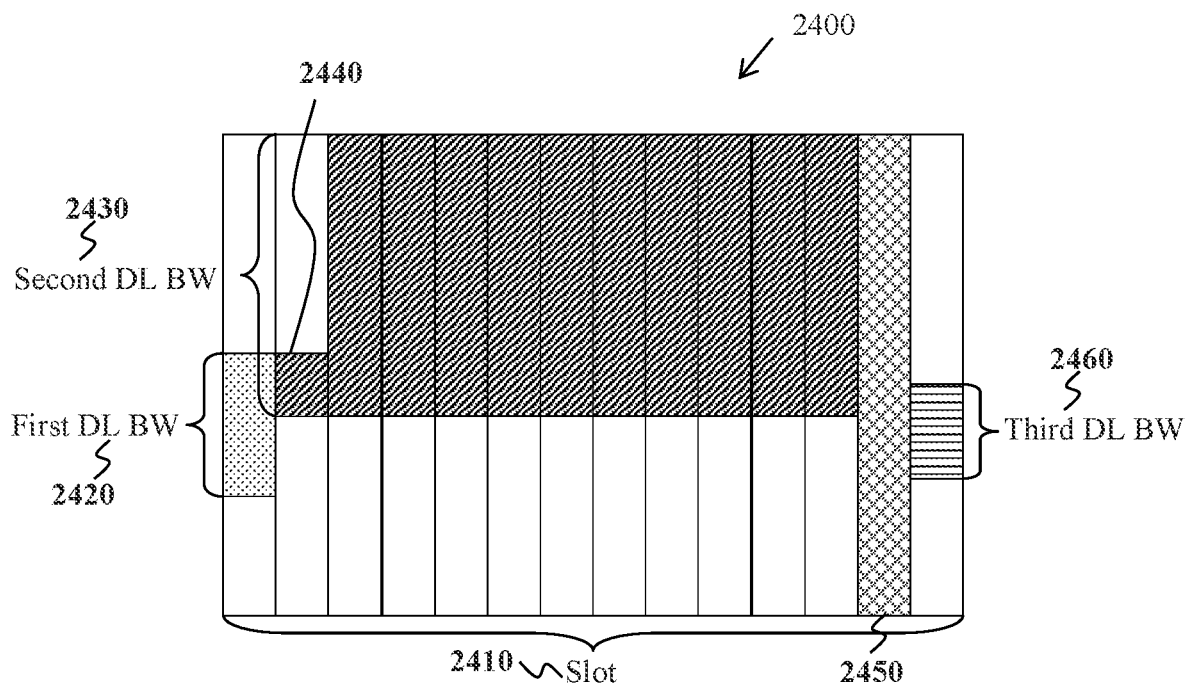
FIG. 24 illustrates an example PDCCH transmission in a slot that schedules a PDSCH transmission in a same slot by utilizing only a common BW between a first DL BW for a DL control resource set that includes the PDCCH transmission and a second BW for the PDSCH transmission to enable a UE to perform frequency retuning according to embodiments of the present disclosure.

FIG. 24 illustrates an example PDCCH transmission 2400 in a slot that schedules a PDSCH transmission in a same slot by utilizing only a common BW between a first DL BW for a DL control resource set that includes the PDCCH transmission and a second BW for the PDSCH transmission to enable a UE to perform frequency retuning according to embodiments of the present disclosure. An embodiment of the PDCCH transmission 2400 in the slot scheduling the PDSCH transmission in the same slot by utilizing only a common BW between the first DL BW for P a DL control resource set that includes the DCCH transmission and the second BW for the PDSCH transmission to enable the UE to perform frequency retuning shown in FIG. 24 is for illustration only. Other embodiments may be used without departing from the scope of the present disclosure.

In a slot that includes fourteen symbols 2410, a gNB transmits in a first slot symbol a PDCCH to a UE over a first DL BW 2420. Upon detecting a DCI format conveyed by the PDCCH and scheduling a PDSCH transmission over a second DL BW in the slot, the UE receives the PDSCH over a DL BW that is common to the first DL BW and the second DL BW in a second slot symbol 2430. During the second slot symbol, the UE retunes the UE's receiver to the second DL BW and receives the PDSCH over the second DL BW starting from a third slot symbol until a last slot symbol that is used for the PDSCH transmission 2440. DMRS associated with PDSCH reception can be transmitted in the third slot symbol. The slot can also include a GP symbol 2450 and a symbol used for UL transmissions such as SRS or PUCCH conveying for example HARQ-ACK over a third BW 2460.

In one example for enabling a UE to retune from a first DL BW configured to the UE for receiving PDCCH transmissions to a second DL BW configured to the UE for receiving transmissions of other DL channels or signals, such as PDSCH or CSI-RS, is for a gNB to configure the UE to retune over a wider DL BW that includes the second DL BW through a DCI format transmitted to the UE prior to the transmission of the other DL channels or signals. The DCI format can include a "retune" field of 1 bit where, for example, a bit value of '0' can indicate no retuning and a bit value of '1' can indicate retuning. For example, a first DCI format can schedule a UE to receive in a first slot a first PDSCH within the first DL BW and the first DCI format or a second DCI format, transmitted after the first DCI format, can schedule the UE to receive in a second slot, after the first slot, a second PDSCH within the second DL BW.

The scheduling of the second PDSCH transmission in the second slot can be by a second DCI format or can be by the first DCI format when the first DCI format schedules a multi-slot transmission for the PDSCH. When the scheduling of the second PDSCH transmission in the second slot is by a second DCI format, the UE can retune over a maximum DL system BW configured to the UE after detecting the first DCI format. When the scheduling of the second PDSCH transmission in the second slot is by the first DCI format, the PDSCH transmission in the first slot can be within a DL BW that is common between the first DL BW and the second DL BW and the transmission in the remaining slots of the multi-slot can be within the second DL BW. In either case, the bit-value of the field in the first DCI format is '1'.

When a same DCI format (first DCI format) simultaneously schedules multiple PDSCH transmissions over different BWs, a resource allocation field in the DCI format can have a first interpretation for scheduling first one or more PDSCH transmissions and have a second interpretation for scheduling second one or more PDSCH transmissions. For example, a granularity for the resource allocation field can have a first RB group (RBG) size for the first one or more PDSCH transmissions and have a second RBG size, larger than the first RBG size, for the second one or more PDSCH transmissions.

Figure 25:
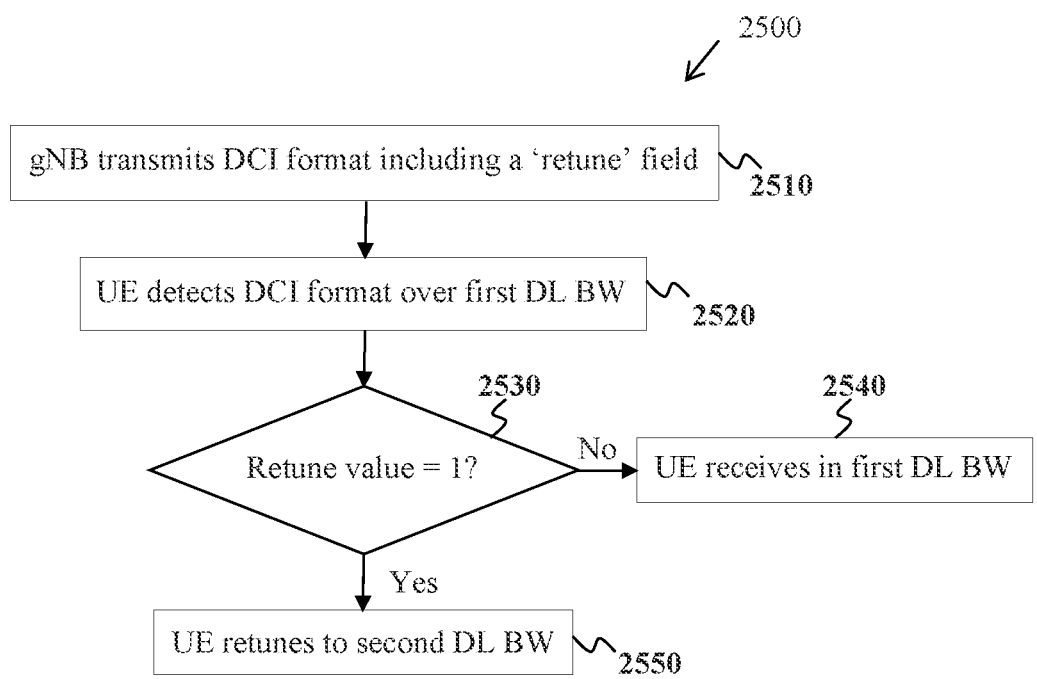
FIG. 25 illustrates an example process for a DCI format, conveyed by a PDCCH transmission in a first DL BW, to configure a UE to retune the UE's receiver to a second DL BW according to embodiments of the present disclosure.

FIG. 25 illustrates an example process 2500 for a DCI format, conveyed by a PDCCH transmission in a first DL BW, to configure a UE to retune the UE's receiver to a second DL BW according to embodiments of the present disclosure. An embodiment of the process 2500 for the DCI format conveyed by the PDCCH transmission in the first DL BW to configure the UE to retune the UE's receiver to the second DL BW shown in FIG. 25 is for illustration only. Other embodiments may be used without departing from the scope of the present disclosure.

In step 2510, A gNB transmits to a UE a DCI format that includes a "retune" field through a PDCCH within a first DL BW. The UE detects, in step 2520, the DCI format and determines whether or not a value for the "retune" field is equal to '1' in step 2530. When the "retune" field is not equal to '1', the UE continues to receive within the first DL BW in step 2540. When the "retune" field is equal to '1', the UE retunes the UE's receiver over a second DL BW in step 2550 that can be different, typically larger, than the first DL BW. The second DL BW can be configured to the UE in advance by the gNB or can be indicated by the DCI format.

A DCI format that includes a "retune" field indicating a UE to retune the UE's receiver can also be common to a number of UEs and not associated with scheduling of a PDSCH. A UE can be configured a separate RNTI for the DCI format and also be configured with a location in the DCI format for a respective "retune" field. Therefore, the DCI format includes a number of "retune" fields corresponding to a number of UEs and depending on a value of a "retune" field in a configured location in the DCI format, a UE can retune or not retune the UE's receiver to a predetermined/configured DL BW for the UE.

A retuning by a UE from a first DL BW that a gNB configures to the UE for receiving PDCCH transmissions in one or more respective DL control resource sets to a second DL BW that is different than the first DL BW can also be linked to a retuning associated with transmissions of signals that are configured by higher layers, such as a CSI-RS transmission, within the second DL BW. Once the UE retunes to receive a signal within the second DL BW in a slot, the UE can maintain the retuning of the UE's receiver to the second DL BW for receiving potential PDCCH transmissions in a next slot or over a configured number of slots.

Figure 26:
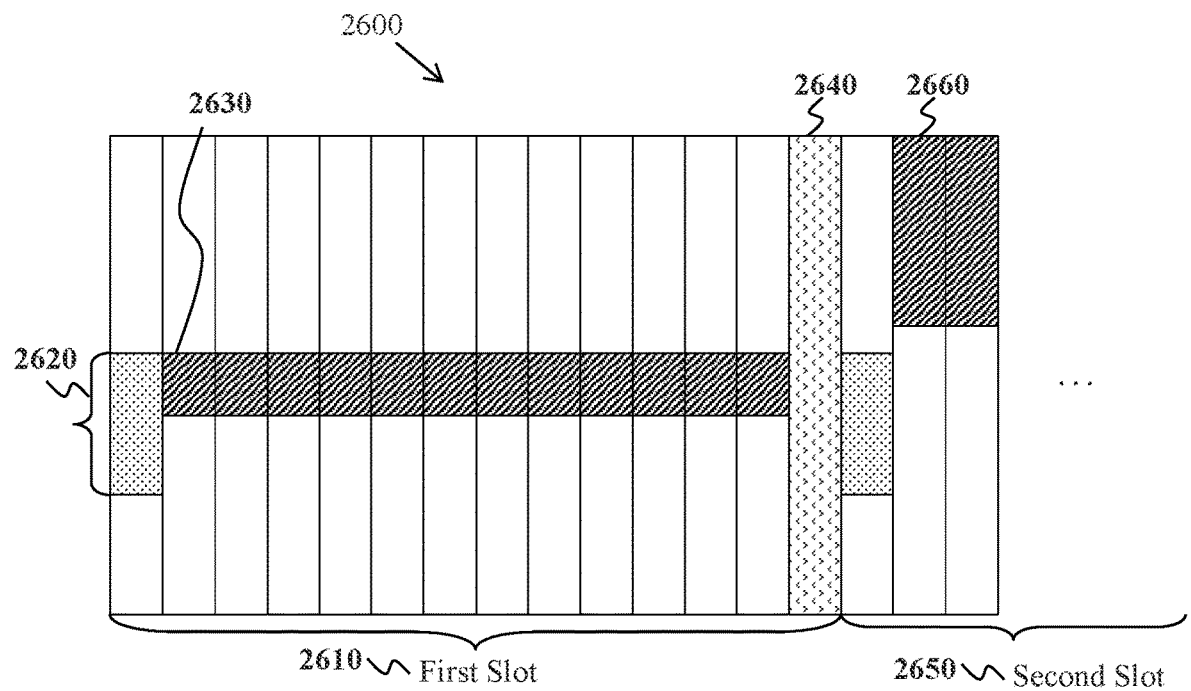
FIG. 26 illustrates an example UE to retune the UE's receiver from a first DL BW to a second DL BW when the UE receives a CSI-RS within the second DL BW according to embodiments of the present disclosure.

FIG. 26 illustrates an example UE 2600 to retune the UE's receiver from a first DL BW to a second DL BW when the UE receives a CSI-RS within the second DL BW according to embodiments of the present disclosure. An embodiment of the UE 2600 to retune the UE's receiver from the first DL BW to the second DL BW when the UE receives the CSI-RS within the second DL BW shown in FIG. 26 is for illustration only. Other embodiments may be used without departing from the scope of the present disclosure.

In a first slot that includes fourteen symbols 2610, a gNB transmits in a first slot symbol a PDCCH to a UE over a first DL BW 2620. The UE detects a first DCI format conveyed by the PDCCH that schedules a PDSCH over a DL BW within the first DL BW 2630 and the UE also has a CSI-RS transmission configured over a second DL BW 2640. For example, the CSI-RS is transmitted in a last symbol with DL transmissions in the first slot or in a next slot. The UE detects a second DCI format conveyed by a PDCCH received within the first DL BW in a second slot 2650 following the first slot where the DCI format schedules a DL data reception over a third DL BW 2660 that is within the second DL BW. The gNB expects the UE to maintain the UE's receiver tuned to the second DL BW even though the UE is configured to receive PDCCH transmissions in the first DL BW that is a subset of the second DL BW. The configuration to the UE to receive a CSI-RS with the second DL BW in the first slot or in the next slot implicitly acts as a "retune" field as described in FIG. 25.

A number of PDCCH decoding operations that a UE performs per slot in order to detect one or more DCI formats can also be a factor that materially contributes to UE power consumption as it was previously described. Mechanisms to reduce the number of decoding operations that the UE performs per slot can therefore contribute to a reduction in power consumption at the UE.

A UE can be configured a set of sub-bands and a set of symbols per slot (DL control resource sets) where the UE receives potential PDCCH transmissions. To minimize a total BW span for the DL control resource sets, the respective sub-bands can be contiguous in frequency. For example, a configuration for the set of sub-bands can be by explicit signaling of a starting position (RB index) and a size (number of RBs) of each sub-band or, when the sub-bands have a same size that can be either predetermined in a system operation or separately configured, of starting position (RB index) and a number of sub-bands.

A PDCCH transmission in a sub-band of a DL control resource set can use distributed (interleaved) RBs or localized (non-interleaved) RBs. For a sub-band size of $N_R$ RBs, DL control resource set of one symbol, and for a PDCCH transmission over $N_{RB}^{SB}$ RBs, a distributed (interleaved) PDCCH transmission starting from RB (or group of contiguous RBs) j, $0 \leq j < N_{RB}^{SB}$, can include RBs (or groups of contiguous RBs) with indexes $(j+i \cdot N_{RB}^{Ctrl}) \mod N \, N_{RB}^{SB}$ where $0 \leq i < \lfloor N_{RB}^{SB}/N_{RB}^{Ctrl} \rfloor$ while a localized (non-interleaved) PDCCH transmission starting from RB j, $0 \leq j < N_{RB}^{SB}$, can include RBs with indexes $(j+i) \mod N_{RB}^{SB}$ where $0 \leq i < N_{RB}^{Ctrl}$. When RBs used for a localized transmission of a PDCCH do not wrap around from a last RB in a sub-band with a highest index to a first RB in a sub-band with a lowest index, a localized PDCCH transmission starting from RB j, $0 \leq j < N_{RB}^{SB} - N_{RB}^{Ctrl}$, can include RBs with indexes j+i where $0 \leq i < N_{RB}^{Ctrl}$. A sub-band of a respective DL control resource set can be exclusively associated with either distributed or localized PDCCH transmissions or can be associated with both distributed and localized PDCCH transmissions.

A distributed PDCCH transmission within a sub-band of a respective DL control resource set can be associated with a transmission diversity scheme, such as SFBC or precoder cycling, and with a UE-common DMRS, without precoding or with known precoding, for demodulation of the PDCCH by a UE. A localized PDCCH transmission within a sub-band of a respective DL control resource set can be associated with a transmission scheme based on beamforming and with a DMRS with precoding that is specific to the PDCCH transmission.

Figure 27:
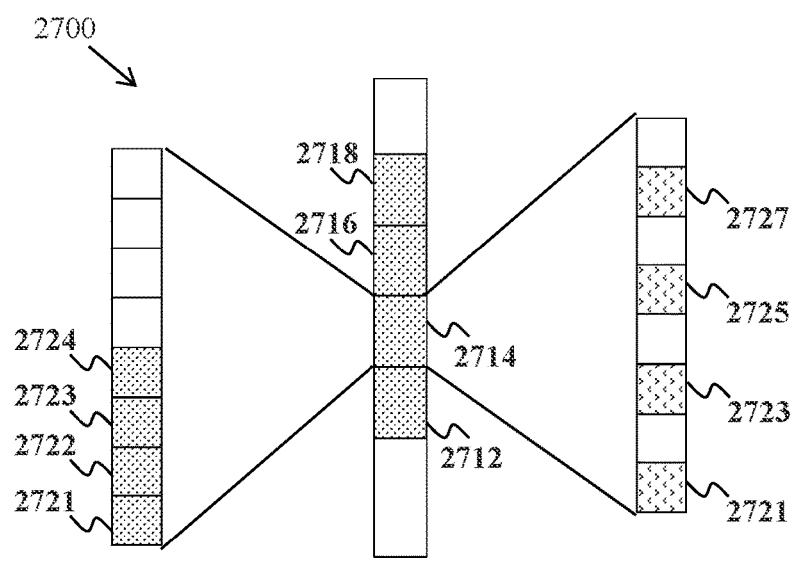
FIG. 27 illustrates an example for a distributed PDCCH transmission and for a localized PDCCH transmission according to embodiments of the present disclosure.

FIG. 27 illustrates an example for a distributed PDCCH transmission and for a localized PDCCH transmission 2700 according to embodiments of the present disclosure. An embodiment of the distributed PDCCH transmission and the localized PDCCH transmission 2700 shown in FIG. 27 is for illustration only. Other embodiments may be used without departing from the scope of the present disclosure.

A UE is configured a set of sub-bands 2712, 2714, 2716, and 2718 for receptions of PDCCH transmissions over one slot symbol. A UE is also configured a number of candidates, per CCE aggregation level, for determining respective locations for potential PDCCH transmissions per sub-band of a respective DL control resource set. For example, when a sub-band of a DL control resource set is associated with distributed PDCCH transmissions, a distributed PDCCH candidate for aggregation level of one CCE corresponding to four RBs with starting location at a first RB in the sub-band includes the first 2721, third 2723, fifth 2725, and seventh RBs 2727 in the sub-band while when the sub-band of a DL control resource set is associated with localized PDCCH transmissions, a localized PDCCH candidate for aggregation level of one CCE with starting location at a first RB in the sub-band includes the first 2721, second 2722, third 2723, and fourth 2724 RBs in the sub-band.

A UE can be configured a number of candidate PDCCH transmissions per CCE aggregation level in one or more of the sub-bands of respective one or more DL control resource sets. The configuration can be per DCI format that a UE needs to decode in a slot. The configuration can include both distributed PDCCH transmissions and localized PDCCH transmissions. For example, for a UE capable of performing $N_{decode}^{max}$ decoding operations per slot for a PDCCH conveying a given DCI format, a gNB can configure the UE with a set of $\{N_{AL,j}^{SB,j}\}$ candidates in a sub-band j for DL control resource set j and for aggregation level corresponding to i CCEs. A sub-band for a DL control resource set can also be configured to be associated either with distributed or with localized PDCCH transmissions. The configuration can be relative to a percentage of $N_{decode}^{max}$ per sub-band, or equivalently per DL control resource set, and per CCE aggregation level or, when candidates per CCE aggregation level are equally distributed across sub-bands of respective DL control resource sets, the configuration can be relative to a percentage of $N_{decode}^{max}$ per CCE aggregation level. For example, for a UE capable of $N_{decode}^{max}=16$ decoding operations for a DCI format and for CCE aggregation levels of {2, 4, 8, 16} and two sub-bands for respective two DL control resource sets, the UE can be configured with {0, 2, 2, 2} decoding operations for distributed candidates in a first sub-band for the first DL control resource set and with {2, 2, 2, 0} decoding operations for localized candidates in a second sub-band for the second DL control resource set.

When a CCE aggregation level is larger than a number of CCEs in a sub-band (DL control resource set), a respective PDCCH candidate can span multiple sub-bands of respective multiple DL control resource sets. For example, for a UE configured two sub-bands of respective two DL control resource sets that are consecutive in frequency and each includes 8 CCEs, each PDCCH candidate corresponding to an aggregation of 8 or less CCEs is located exclusively in one sub-band for a respective DL control resource set while a PDCCH candidate corresponding to an aggregation of 16 CCEs is located across all RBs of the two sub-bands of the respective two DL control resource sets. Therefore, a candidate PDCCH transmission can be exclusively located within a configured sub-band of a respective DL control resource set when the transmission is over a number of CCEs (RBs) smaller than or equal to the number of CCEs (RBs) in the sub-band of the DL control resource set and can be located over two sub-bands of two respective DL control resource sets when the transmission is over a number of CCEs (RBs) that is larger than the number of CCEs (RBs) in one sub-band of a respective DL control resource set and smaller than or equal to the number of CCEs (RBs) in two sub-bands of respective two DL control resource sets. This principle can be extended in a similar manner, when needed, to PDCCH candidates spanning more than two sub-bands in respective more than two DL control resource sets.

DL control resource sets can be in a same slot symbol or in different slot symbols. When a UE is configured DL control resource sets that are located in different slot symbols, the UE can also be configured to combine PDCCH receptions in the DL control resource sets for some candidates of some CCE aggregation levels. For example, the combining can be by summation of demodulated symbols from PDCCH receptions for candidates with same index and with same CCE aggregation level. For example, for a UE configured a first DL control resource set in a first slot symbol and a second DL control resource set in a second slot symbol, the UE can be configured a first decoding operation for a first PDCCH candidate with aggregation level of L CCEs in the first DL control resource set, a second decoding operation for a first PDCCH candidate with aggregation level of L CCEs in the second DL control resource set, and a third decoding operation for the combined demodulated symbols for the first PDCCH candidates with aggregation level of L CCEs in the first DL control resource set and the second DL control resource set. A decoding for combined demodulated symbols for PDCCH receptions in different DL control resource sets can be beneficial in enabling a gNB to apply a different precoding to each respective PDCCH transmission for example when transmitting each PDCCH from a different beam and improve a robustness of PDCCH transmissions to a UE when the gNB does not know whether the UE is best served by the first beam or the second beam.

Depending on a number of PDCCH transmissions in a slot and on a number of frequency resources (RBs), in case of frequency-first mapping of CCEs to REGs, or time/frequency resources (RBs and slot symbols), in case of time-first mapping of CCEs to REGs, required by each PDCCH transmission, it is possible that some of the sub-bands in some symbols of respective DL control resource sets are not used to convey any PDCCH transmissions in a slot. Then, as it was previously described and assuming for brevity time-first mapping, it is advantageous to use such sub-bands for PDSCH transmissions in the slot or, in general, for transmission of other DL signals in the slot. It is also advantageous for a gNB to inform a UE to not perform decoding operations for potential PDCCH transmissions in respective sub-bands that the UE is configured for potential PDCCH transmissions when the sub-bands (DL control resource sets) are not used for PDCCH transmissions in the slot as this can reduce UE power consumption. Alternatively, for PDCCH candidates in sub-bands that are not used for PDCCH transmissions in a slot, the UE can perform corresponding decoding operations in sub-bands that are used for PDCCH transmissions in the slot. For example, when a UE is configured two PDCCH decoding operations for an aggregation level of 4 CCEs for potential PDCCH transmissions per sub-band in a sub-set of sub-bands and some sub-bands from the sub-set of sub-bands are not for PDCCH transmissions in a slot, the UE can equally distribute the two PDCCH decoding operations for aggregation level of 4 CCEs to remaining sub-bands from the sub-set of sub-bands.

To enable a common understanding among all UEs for a set of sub-bands used for PDCCH transmissions in a slot, a UE-common PDCCH conveying a DCI format A can indicate the set of sub-bands. The DCI format A can additionally indicate other information as previously described. For example, the UE-common PDCCH can be transmitted in one or more predetermined sub-bands, such as in a sub-band of a first DL control resource set, and in a first slot symbol of the first DL control resource set (for frequency-first mapping) or in all slot symbols of the first DL control resource set (for time-first mapping). A configuration for a number of candidates per CCE aggregation level to a UE can be per DL control resource set. For example, a larger number of candidates can be configured in a DL control resource set that is more likely to be used for PDCCH transmissions or have a larger number of RBs as determined by the DL control resource set sub-band size and number of slot symbols. Upon detecting the DCI format A, as defined for example by an associated RNTI, a UE can determine a set of sub-bands used for PDCCH transmissions in a slot and decode for potential PDCCH transmissions only in a subset from the set of sub-bands where the UE is configured to receive PDCCH transmissions. The indication for the set of sub-bands used for PDCCH transmissions in a slot can be by a bit-map when the set of sub-bands includes arbitrary sub-bands or by enumeration when the set of sub-bands includes sub-bands in an ascending order of a sub-band index. For a total of $N_{SB}^{DL}$ sub-bands, a bit-map can include $N_{SB}^{DL}$ bits.

Figure 28:
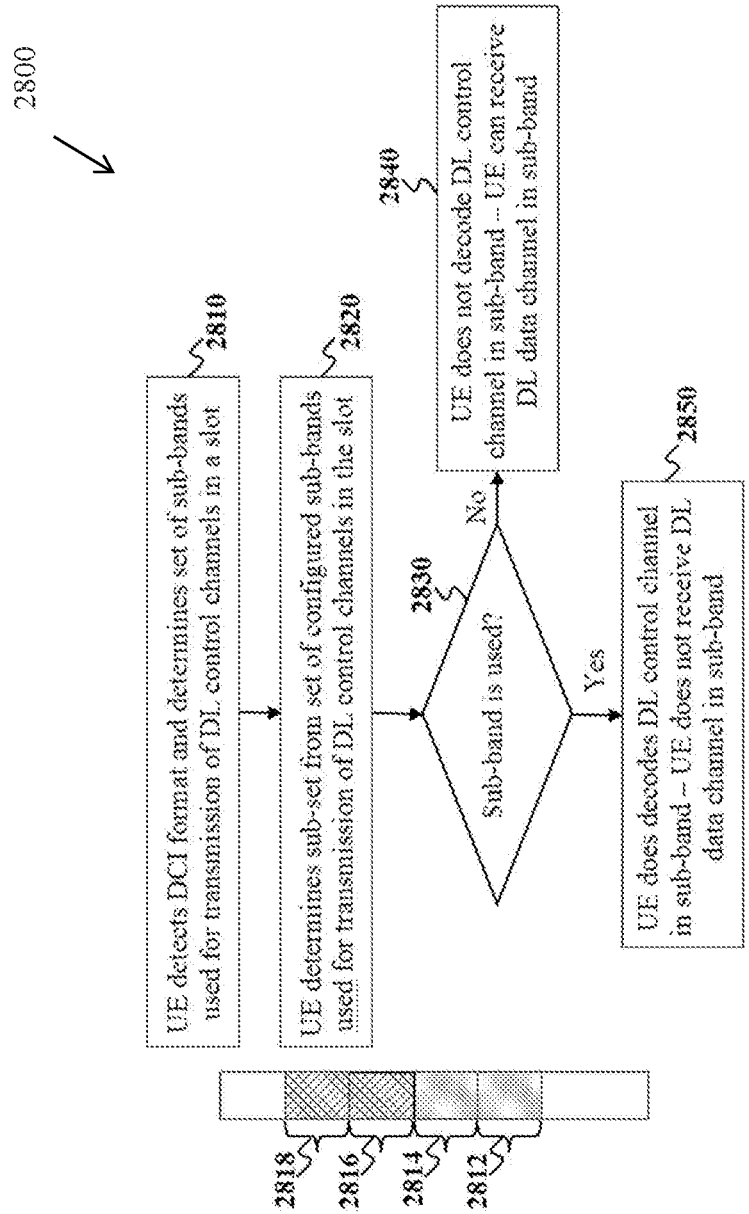
FIG. 28 illustrates an example process for a UE to determine a set of sub-bands used for PDCCH transmissions in a slot according to embodiments of the present disclosure.

FIG. 28 illustrates an example process 2800 for a UE to determine a set of sub-bands used for PDCCH transmissions in a slot according to embodiments of the present disclosure. An embodiment of the process 2800 for the UE to determine the set of sub-bands used for PDCCH transmissions in the slot shown in FIG. 28 is for illustration only. Other embodiments may be used without departing from the scope of the present disclosure.

A UE detects a DCI format, such as DCI format A, and determines a sub-set of sub-bands, from a configured set of sub-bands, used by a gNB for PDCCH transmissions in step 2810. For example, from a set of four sub-bands 2812, 2814, 2816, and 2818 that can be used for PDCCH transmissions in a slot, the DCI format can indicate that only two sub-bands, 2812 and 2814, are used and that sub-bands 2816 and 2818 are not used and can therefore be available for other DL transmissions in the slot such as for PDSCH transmissions. When the PDCCH conveying the DCI format is always transmitted in the first sub-band, the DCI format does not need to indicate whether or not the first sub-band is used for PDCCH transmissions in the slot or can indicate that only the PDCCH is transmitted in the sub-band so that UEs can considered remaining RBs as available for PDSCH transmissions. Based on the indicated sub-bands from the set of sub-bands that can be used for PDCCH transmissions in a slot, the UE can determine, in step 2820, the sub-bands in a sub-set of sub-bands the UE is configured to decode PDCCH transmissions. For example, the UE can be configured to decode PDCCH transmissions in sub-bands 2812, 2814, and 2816 and determine that sub-band 2816 is not used for PDCCH transmissions in the slot. After determining the sub-bands used for PDCCH transmissions to the UE in a slot, the UE considers, in step 2830, whether or not a particular sub-band is used in the slot. When the particular sub-band is not used, the UE does not decode, in step 2840, PDCCH transmissions in the sub-band in the slot and can assume that respective RBs are available for PDSCH transmissions in the slot. When the particular sub-band is used, the UE decodes, in step 2850, PDCCH transmissions in the sub-band in the slot and can assume that respective RBs are not available for PDSCH transmissions in the slot.

When some sub-bands configured for PDCCH transmissions are not used to transmit PDCCHs in a slot, they can be used for PDSCH transmissions. To avoid having a UE receive over a larger DL BW than the one that can be used for PDCCH transmissions in a slot, sub-bands not used for PDCCH transmissions can be used for PDSCH transmissions to one or more UEs configured to receive PDCCH transmissions in the sub-bands. Further, a resource allocation field in a DCI format scheduling a PDSCH transmission can include RBs corresponding to a sub-band configured for PDCCH transmissions. A UE can buffer receptions in all RBs the UE is configured to receive PDCCH transmissions and include in a PDSCH reception all RBs indicated by a DCI format scheduling the PDSCH that the UE determines as not being used for PDCCH transmissions in a slot.

A DCI format can also schedule a PDSCH transmission over multiple slots. Then, a UE can determine whether or not to receive the PDSCH transmission in RBs and slot symbols, such as a first slot symbol, of subsequent slots by detecting a DCI format A in each slot that indicates sub-bands/RBs and slot symbols used for PDCCH transmissions in each slot. Alternatively, when a DCI format A is not transmitted by a gNB in a slot due to the configured periodicity of DCI format A transmission, the UE can assume that all sub-bands and a maximum possible number of slot symbols per sub-band are used for PDCCH transmissions in a slot, that is, the UE can assume full utilization for a respective DL control resource set in the slot.

Figure 29:
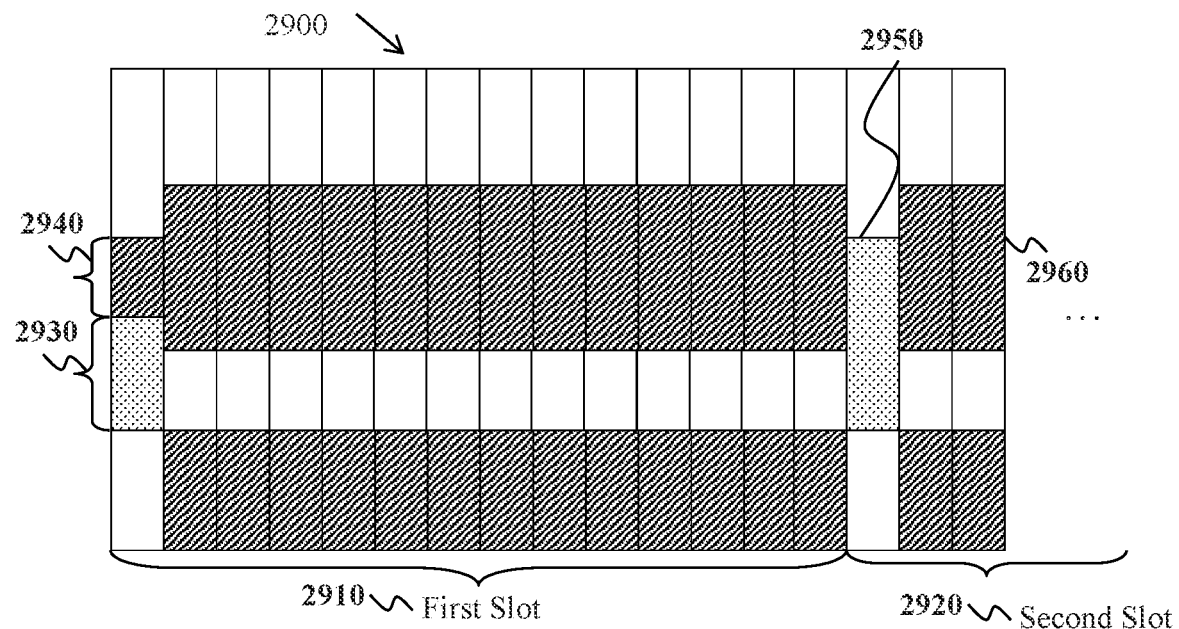
FIG. 29 illustrates an example process for a UE to receive a PDSCH in RBs of a slot that are configured for potential PDCCH transmissions of according to embodiments of the present disclosure.

FIG. 29 illustrates an example process 2900 for a UE to receive a PDSCH in RBs of a slot that are configured for potential PDCCH transmissions according to embodiments of the present disclosure. An embodiment of the process 2900 for the UE to receive a PDSCH in RBs of the slot that are configured for potential PDCCH transmissions shown in FIG. 29 is for illustration only. Other embodiments may be used without departing from the scope of the present disclosure.

A UE is configured by a DCI format to receive a PDSCH over RBs in a first slot 2910 and in a second slot 2920. The UE detects the DCI format in a PDCCH the UE receives in a sub-band from one or more sub-bands 2930. The UE also determines, for example through a detection of another DCI format in the first slot, such as a DCI format A, that other sub-bands 2940 configured for PDCCH transmissions are not used for PDCCH transmissions in the first slot. The UE then includes common RBs between the RBs the UE is scheduled for PDSCH reception and the RBs in the other sub-bands, for PDSCH reception.

In the second slot, the UE determines that all sub-bands 2950 are used for PDCCH transmissions and the UE does not include any RBs from the sub-bands in the reception of the PDSCH that, in the second slot, the UE receives only over the RBs indicated by the DCI format 2960 and are not RBs in the sub-bands. It is also possible that the PDCCH is transmitted over variable number of symbols in a slot and then the UE can receive the PDSCH also in variable number of symbols in different sub-bands per slot depending on the variable number of symbols used for PDCCH transmissions in sub-bands.

A UE typically reports CSI to enable a gNB to perform link adaptation for PDSCH transmissions. However, either a wideband CSI or a sub-band CSI report from the UE can fail to reflect a channel experienced for PDCCH transmissions to the UE. For example, a wideband CSI report can be computed over a DL BW that is materially larger than a sub-band BW for distributed PDCCH transmissions or a sub-band CSI for PDSCH transmission can be for sub-bands that do not include some or all sub-bands for localized PDCCH transmissions. For example, a wideband CSI or a sub-band CSI for PDSCH transmissions can be for a respective PDSCH transmission scheme that can be different than a distributed PDCCH or a localized PDCCH transmission scheme, respectively.

To enable link adaptation for PDCCH transmissions in a sub-band, a UE can report a CSI for each sub-band (or DL control resource set) the UE is configured for PDCCH transmissions. A CSI can include a CQI and a PMI. The UE can also provide an interference measurement report for each sub-band (or DL control resource set) the UE is configured for PDCCH transmissions. The UE can compute a CSI or an interference measurement using a UE-common DMRS or a CSI-RS. A presence of a UE-common, non-precoded or with known precoding, DMRS transmission can be configured per sub-band. For example, a UE can assume that a UE-common DMRS is transmitted in sub-bands the UE is configured for distributed PDCCH transmissions. A sub-band CSI, that can also convey precoding information, can also be based on the UE-common DMRS or on a CSI-RS or on a, possibly precoded, DMRS associated with a PDCCH transmission in a sub-band the UE is configured for localized PDCCH transmissions. A gNB can separately configure a UE to report CSI for one or more sub-bands configured for PDCCH transmissions and to report CSI for sub-bands that can be used for PDSCH transmissions.

When a gNB triggers a CSI report through a DCI format (aperiodic CSI (A-CSI) report), a triggering field in the DCI format can include states corresponding to A-CSI reports associated only with PDCCH transmissions (CSI report for one or more sub-bands for PDCCH transmissions), or with both PDCCH and PDSCH transmissions, or with only PDSCH transmissions. For example, for A-CSI report triggering through an A-CSI report field that includes 3 bits in a DCI format, a state of '001' can correspond to A-CSI reports associated only with PDCCH transmissions, a state of '010' can correspond to A-CSI reports associated with both PDCCH and PDSCH transmissions, and remaining states, other than the '000' that can correspond to no A-CSI reporting, can correspond to A-CSI reports associated only with PDCCH transmissions. In systems having DL/UL channel reciprocity, such as systems with TDD or flexible duplex operation, a UE can also be configured to transmit SRS only over some or all of the sub-bands the UE is configured for PDCCH transmissions.

When a sub-band CSI is computed based on a UE-common DMRS, it is beneficial to enable UE-common DMRS transmission over all sub-bands a UE is configured for PDCCH transmissions. This can be achieved by sub-band hopping/rotation, for example across consecutive slots or across a number of consecutive slots. Sub-band hopping can also be beneficial for interference randomization among PDCCH transmissions in different slots. It is also possible for a UE to use a UE-common DMRS transmitted over a number of sub-bands to perform measurements, such as a RS received power (RSRP) measurement to determine a path-loss, or to perform frequency error correction and, when the UE knows sub-bands in neighboring cells where a UE-common DMRS is transmitted, to perform mobility related measurements for cell reselection.

Figure 30:
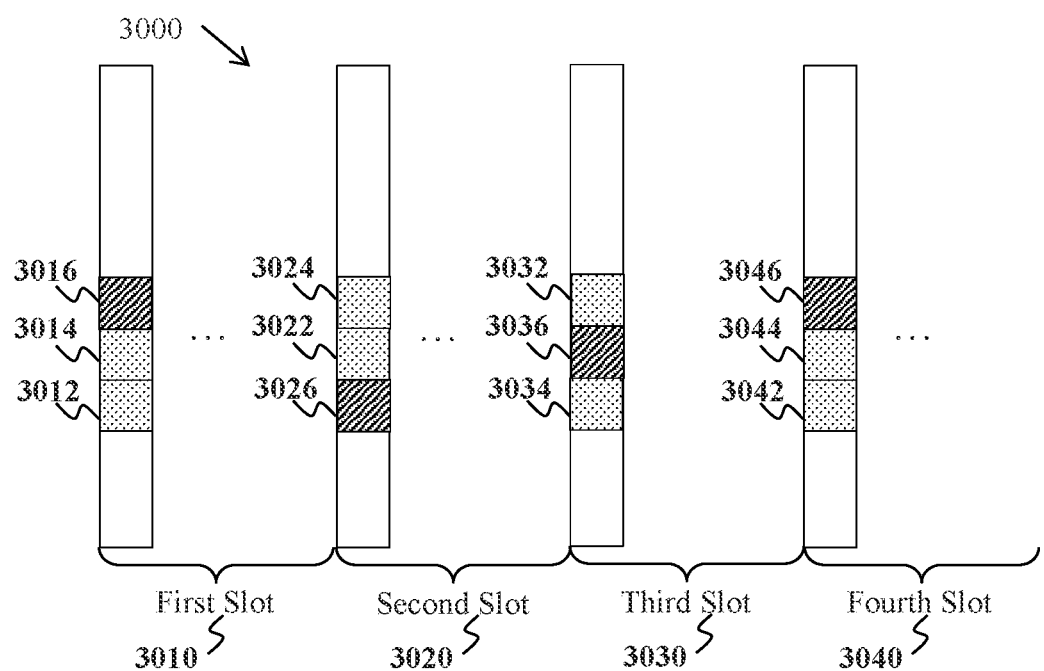
FIG. 30 illustrates an example sub-band hopping in successive slots according to embodiments of the present disclosure.

FIG. 30 illustrates an example sub-band hopping 3000 in successive slots according to embodiments of the present disclosure. An embodiment of the sub-band hopping 3000 in successive slots shown in FIG. 30 is for illustration only. Other embodiments may be used without departing from the scope of the present disclosure.

A UE is configured a set of three sub-bands for receiving potential PDCCH transmissions where, for example, two sub-bands are associated with localized PDCCH transmissions and one sub-band is associated with distributed PDCCH transmissions. In a first slot 3010, the two sub-bands associated with localized PDCCH transmissions 3012 and 3014 are placed towards a first end of a DL system BW and the one sub-band associated with distributed PDCCH transmissions 3016 is placed towards a second end of the DL system BW. In a second slot 3020, the two sub-bands associated with localized PDCCH transmissions 3022 and 3024 are placed towards the second end of the DL system BW and the one sub-band associated with distributed PDCCH transmissions 3026 is placed towards the first end of the DL system BW. In a third slot 3030, the two sub-bands associated with localized PDCCH transmissions 3032 and 3034 are placed around the one sub-band associated with distributed PDCCH transmissions 3036. After the third slot, the pattern repeats and the sub-bands are cyclically shifted according to the hopping/rotation pattern or a new set of sub-bands in a DL system BW can be used according to a previous configuration by higher layer signaling. Using the UE-common DMRS in each of the first three slots, the UE can obtain a wideband CSI for each sub-band and can also obtain a sub-band CSI for each sub-band. The UE can report each wideband CSI and each sub-band CSI to a gNB, thereby enabling the gNB to perform proper link adaptation for PDCCH transmissions to the UE or change the sub-bands used for distributed and for localized PDCCH transmissions. The hopping pattern can be configured or can be implicitly derived by a UE based for example on a cell identity.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE), comprising:
   a receiver configured to receive a first physical downlink control channel (PDCCH) that provides a first downlink control information (DCI) format, wherein:
      the first DCI format indicates a first configuration for reception of second PDCCHs, and
      a PDCCH from the second PDCCHs provides a second DCI format; and
   a processor, operably connected to the receiver, the processor configured to determine:
      parameters for reception of the second PDCCHs based on the first configuration after the reception of the first DCI format, and
      parameters for reception of the second PDCCHs based on a second configuration before the reception of the first DCI format.

2. The UE of claim 1, wherein the receiver is further configured to receive the PDCCH according to the parameters for reception of the second PDCCH based on the first configuration.

3. The UE of claim 1, wherein the first DCI format further indicates a slot structure for each slot of a number of slots, wherein:
   a slot includes a number of symbols,
   a slot structure indicates, for each symbol of a slot, one of:
      the symbol to be unavailable for both transmission and reception,
      the symbol to be available only for reception, and
      the symbol to be available only for transmission.

4. The UE of claim 1, wherein:
   the receiver is further configured to receive a set of configurations for reception of the second PDCCHs, and
   the first and second configurations are from the set of configurations.

5. The UE of claim 1, wherein:
   a PDCCH reception is over a number of control channel elements (CCEs) from a predetermined set of numbers of CCEs,
   the parameters for reception of the second PDCCHs based on the first configuration include a first number of the second PDCCHs for the number of CCEs from the predetermined set of numbers of CCEs, and
   the parameters for reception of the second PDCCHs based on the second configuration include a second number of the second PDCCHs for the number of CCEs from the predetermined set of numbers of CCEs.

6. The UE of claim 1, wherein:
   the first DCI format includes a bitmap,
   a size of the bitmap is equal to a number of frequency sub-bands,
   a bit of the bitmap has a one-to-one mapping with a frequency sub-band and indicates one of:
      a presence of the PDCCH in the frequency sub-band, and
      an absence of the PDCCH in the frequency sub-band.

7. The UE of claim 1, wherein the second DCI format schedules one of:
   a transmission of a physical uplink shared channel (PUSCH), and
   a reception of a physical downlink shared channel (PDSCH).

8. A base station, comprising:
   a transmitter configured to transmit a first physical downlink control channel (PDCCH) that provides a first downlink control information (DCI) format, wherein:
      the first DCI format indicates a first configuration for transmission of second PDCCHs, and
      a PDCCH from the second PDCCHs provides a second DCI format; and
   a processor, operably connected to the transmitter, the processor configured to determine:
      parameters for transmission of the second PDCCHs based on the first configuration after the transmission of the first DCI format, and
      parameters for transmission of the second PDCCHs based on a second configuration before the transmission of the first DCI format.

9. The base station of claim 8, wherein the transmitter is further configured to transmit the PDCCH according to the parameters for transmission of the second PDCCH based on the first configuration.

10. The base station of claim 8, wherein the first DCI format further indicates a slot structure for each slot of a number of slots, wherein:
    a slot includes a number of symbols,
    a slot structure indicates, for each symbol of a slot, one of:
       the symbol to be unavailable for both transmission and reception,
       the symbol to be available only for reception, and
       the symbol to be available only for transmission.

11. The base station of claim 8, wherein:
    the transmitter is further configured to transmit a set of configurations for transmission of the second PDCCHs, and
    the first and second configurations are from the set of configurations.

12. The base station of claim 8, wherein:
a PDCCH transmission is over a number of control channel elements (CCEs) from a predetermined set of numbers of CCEs,
the parameters for transmission of the second PDCCH based on the first configuration include a first number of the second PDCCHs for the number of CCEs from the predetermined set of numbers of CCEs, and
the parameters for transmission of the second PDCCHs based on the second configuration include a second number of the second PDCCHs for the number of CCEs from the predetermined set of numbers of CCEs.

13. The base station of claim 8, wherein:
the first DCI format includes a bitmap,
a size of the bitmap is equal to a number of frequency sub-bands,
a bit of the bitmap has a one-to-one mapping with a frequency sub-band and indicates one of:
 a presence of the PDCCH in the frequency sub-band, and
 an absence of the PDCCH in the frequency sub-band.

14. The base station of claim 8, wherein the second DCI format schedules one of:
a reception of a physical uplink shared channel (PUSCH), and
a transmission of a physical downlink shared channel (PDSCH).

15. A method, comprising:
receiving a first physical downlink control channel (PDCCH) that provides a first downlink control information (DCI) format, wherein:
 the first DCI format indicates a first configuration for reception of second PDCCHs, and
 a PDCCH from the second PDCCHs provides a second DCI format;
determining parameters for reception of the second PDCCHs based on the first configuration after the reception of the first DCI format; and
determining parameters for reception of the second PDCCHs based on a second configuration before the reception of the first DCI format.

16. The method of claim 15, further comprising:
receiving the PDCCH according to the parameters for reception of the second PDCCH based on the first configuration.

17. The method of claim 15, wherein the first DCI format further indicates a slot structure for each slot of a number of slots, wherein:
a slot includes a number of symbols,
a slot structure indicates, for each symbol of a slot, one of:
 the symbol to be unavailable for both transmission and reception,
 the symbol to be available only for reception, and
 the symbol to be available only for transmission.

18. The method of claim 15, further comprising:
receiving a set of configurations for reception of the second PDCCHs, wherein the first and second configurations are from the set of configurations.

19. The method of claim 15, wherein:
a PDCCH reception is over a number of control channel elements (CCEs) from a predetermined set of numbers of CCEs,
the parameters for reception of the second PDCCH based on the first configuration include a first number of the second PDCCHs for the number of CCEs from the predetermined set of numbers of CCEs, and
the parameters for reception of the second PDCCHs based on the second configuration include a second number of the second PDCCHs for the number of CCEs from the predetermined set of numbers of CCEs.

20. The method of claim 15, wherein:
the first DCI format includes a bitmap,
a size of the bitmap is equal to a number of frequency sub-bands,
a bit of the bitmap has a one-to-one mapping with a frequency sub-band and indicates one of:
 a presence of the PDCCH in the frequency sub-band, and
 an absence of the PDCCH in the frequency sub-band.

* * * * *